(12) United States Patent
Sato

(10) Patent No.: US 10,306,217 B2
(45) Date of Patent: May 28, 2019

(54) DISPLAY DEVICE, CONTROL METHOD FOR DISPLAY DEVICE, AND COMPUTER PROGRAM

(71) Applicant: SEIKO EPSON CORPORATION, Tokyo (JP)

(72) Inventor: Shinya Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/092,041

(22) Filed: Apr. 6, 2016

(65) Prior Publication Data

US 2016/0309143 A1    Oct. 20, 2016

(30) Foreign Application Priority Data

Apr. 17, 2015  (JP) .................................. 2015-084809
May 8, 2015    (JP) .................................. 2015-095603

(51) Int. Cl.
| | | |
|---|---|---|
| *G02B 27/01* | (2006.01) | |
| *H04N 5/225* | (2006.01) | |
| *H04N 13/239* | (2018.01) | |
| *H04N 13/344* | (2018.01) | |
| *H04N 13/398* | (2018.01) | |

(52) U.S. Cl.
CPC ....... *H04N 13/398* (2018.05); *G02B 27/0179* (2013.01); *H04N 5/2256* (2013.01); *H04N 13/239* (2018.05); *H04N 13/344* (2018.05); *G02B 2027/0138* (2013.01); *G02B 2027/0181* (2013.01); *H04N 2213/001* (2013.01); *H04N 2213/008* (2013.01)

(58) Field of Classification Search
None
See application file for complete search history.

(56) References Cited

U.S. PATENT DOCUMENTS

| | | | |
|---|---|---|---|
| 6,084,557 A | 7/2000 | Ishida et al. | |
| 2005/0062939 A1 | 3/2005 | Tamura | |
| 2013/0050833 A1* | 2/2013 | Lewis ................ | G06K 9/00604 359/630 |
| 2014/0184496 A1* | 7/2014 | Gribetz ................ | G02B 27/017 345/156 |

(Continued)

FOREIGN PATENT DOCUMENTS

| | | |
|---|---|---|
| JP | H10-327433 A | 12/1998 |
| JP | 2001-211403 A | 8/2001 |

(Continued)

OTHER PUBLICATIONS

Jun. 15, 2017 Office Action Issued in U.S Appl. No. 15/092,925.

*Primary Examiner* — Stephen T. Reed
(74) *Attorney, Agent, or Firm* — Oliff PLC

(57) ABSTRACT

A virtual image display device configuring a display device includes a display section that displays an image while enabling visual recognition of an outside scene. The virtual image display device includes an image pickup section that picks up an image in an image pickup range that overlaps with at least a range visually recognized through the display section. The virtual image display device includes a coupling section that includes at least one movable section and couples the image pickup section to the display section and a plurality of light emitting sections fixedly provided in the display section.

8 Claims, 27 Drawing Sheets

(56) References Cited

U.S. PATENT DOCUMENTS

2014/0333665 A1* 11/2014 Sylvan ............... G02B 27/0149
                                                                                                 345/633
2015/0002394 A1* 1/2015 Cho ................... G02B 27/0093
                                                                                                 345/156

FOREIGN PATENT DOCUMENTS

| JP | 2005-004165 A | 1/2005 |
| JP | 2005-038321 A | 2/2005 |
| JP | 2008-070551 A | 3/2008 |
| JP | 2009-200691 A | 9/2009 |
| JP | 2012-156930 A | 8/2012 |
| JP | 2014-110473 A | 6/2014 |
| WO | 2011/058707 A1 | 5/2011 |

* cited by examiner

DISPLAY DEVICE, CONTROL METHOD FOR DISPLAY DEVICE, AND COMPUTER PROGRAM

BACKGROUND

1. Technical Field

The present invention relates to a display device, a control method for the display device, and a computer program.

2. Related Art

There has been known a display device such as an HMD (Head Mounted Display) mounted on the head of a user (see, for example, JP-A-2005-38321 (Patent Literature 1). As the display device of this type, there has been a display device that includes an image pickup section such as a video camera and uses a picked-up image for display. For example, the HMD described in Patent Literature 1 includes a slider that moves an image pickup section in the up-down direction with respect to the HMD.

In the configuration described in Patent Literature 1, the user moves the video camera to change a visual point of a CG to be displayed. On the other hand, to prevent a display image from changing even if the image pickup section moves, it is necessary to detect the movement of the image pickup section. As a method of detecting the movement of the image pickup section, in Patent Literature 1, for example, an image output from the image pickup section is analyzed to calculate a position and a pose. However, the movement of the image pickup section cannot be accurately detected simply by analyzing the image.

SUMMARY

An advantage of some aspects of the invention is to provide a display device including an image pickup section and capable of detecting a movement of the image pickup section, a control method for the display device, and a computer program.

(1) A display device according to an aspect of the invention includes: a display section configured to display an image while enabling visual recognition of an outside scene; an image pickup section configured to pick up an image in an image pickup range that overlaps with at least a range visually recognized through the display section; a coupling section including at least one movable section and configured to couple the image pickup section to the display section; and a plurality of light emitting sections fixedly provided in the display section.

According to the aspect of the invention, it is possible to detect a movement of the image pickup section with respect to the display section on the basis of the picked-up image of the image pickup section and using lights emitted by the light emitting sections.

(2) In the display device according to the aspect of the invention, light rays emitted by the plurality of light emitting sections may cross in the image pickup range of the image pickup section.

According to the aspect of the invention with this configuration, it is possible to detect the movement of the image pickup section with respect to the display section using the picked-up image of the image pickup section and on the basis of a position where the lights emitted by the light emitting sections cross.

(3) In the display device according to the aspect of the invention, the display device may further include a control section configured to detect, from the picked-up image of the image pickup section, reflected light of the light rays emitted by the light emitting sections and reflected on a target object and calculate positions of the reflected light in the picked-up image.

According to the aspect of the invention with this configuration, it is possible to easily detect, in the picked-up image, a position where the lights emitted by the light emitting sections cross.

(4) In the display device according to the aspect of the invention, the control section may calculate a change in a positional relationship between of the image pickup section and the display section or the positional relationship on the basis of the positions of the reflected light in the picked-up image.

According to the aspect of the invention with this configuration, it is possible to control, for example, a display position of an image according to displacement of the image pickup section.

(5) In the display device according to the aspect of the invention, the control section may calculate the a change in a positional relationship between the image pickup section and the display section or the positional relationship on the basis of the positions of the reflected light in the picked-up image and a distance between the image pickup section and the target object.

According to the aspect of the invention with this configuration, it is possible to highly accurately detect the changes in the positional relationship between the image pickup section and the display section or the positional relationship.

(6) In the display device according to the aspect of the invention, the control section may calculate the distance between the image pickup section and the target object on the basis of an image of the target object in the picked-up image.

According to the aspect of the invention with this configuration, it is possible to easily calculate the distance between the image pickup section and the target object.

(7) In the display device according to the aspect of the invention, the control section may cause the light emitting sections to emit the light rays, cause the image pickup section to pick up an image of the light emitted by the light emitting sections and reflected on the target object, detect, from the picked-up image, reflected light of the light rays emitted by the light emitting sections, calculate positions of the reflected light in the picked-up image, and generate adjustment data related to adjustment of a display position of the image on the display section on the basis of the positions of the reflected light in the picked-up image.

According to the aspect of the invention with this configuration, in a configuration in which the image pickup section is movably supported on the display section, it is possible to adjust the display position on the display section according to a movement of the image pickup section.

(8) In the display device according to the aspect of the invention, the coupling section may include a plurality of the movable sections.

According to the aspect of the invention with this configuration, in a configuration in which the image pickup section is supported on the display section by the plurality of movable sections, it is possible to easily detect, with a simple configuration, the movement of the image pickup section.

(9) In the display device according to the aspect of the invention, the light emitting sections may emit light rays include a predetermined pattern. When the light rays of the light emitting sections are projected on the target object located in the image pickup range of the image pickup section, the image pickup section may be capable of picking up an image of the light on the target object.

According to the aspect of the invention with this configuration, when the lights emitted by the light emitting sections are projected on the target object, it is possible to pick up an image of the lights on the target object with the image pickup section and detect a relative position, a relative direction, and the like of the image pickup section with respect to the display section using the picked-up image.

In the display device, in at least a part of a range in which an image pickup direction of the image pickup section is changed by the movable section, the image pickup range of the image pickup section may include directions in which the light emitting sections emit lights. The predetermined pattern may be a pattern for position detection.

(10) In the display device according to the aspect of the invention, the light emitting sections may include a plurality of light sources. The predetermined pattern may be formed by light rays emitted by the plurality of light sources.

According to the aspect of the invention with this configuration, it is possible to obtain, with the image pickup section, a picked-up image in which the relative position, the relative direction, and the like of the image pickup section with respect to the display section can be highly accurately detected.

(11) In the display device according to the aspect of the invention, the light emitting section may include a light source and a modulating section configured to modulate, on the basis of the predetermined pattern, light emitted by the light source.

According to the aspect of the invention with this configuration, it is possible to easily obtain a pattern for detecting the relative position, the relative direction, and the like of the image pickup section with respect to the display section.

(12) In the display device according to the aspect of the invention, the light source may be configured by a solid-state light source.

(13) A display device according to another aspect of the invention includes: a display section configured to display an image while enabling visual recognition of an outside scene; a first image pickup section configured to pick up an image in an image pickup range that overlaps with a range visually recognized through the display section; a coupling section including at least one movable section and configured to couple the first image pickup section to the display section; a second image pickup section fixedly provided in the display section; and a control section configured to detect a positional relationship between the first image pickup section and the display section on the basis of the picked-up image of the first image pickup section and a picked-up image of the second image pickup section.

According to the aspect of the invention, it is possible to detect relative positional relations of the image pickup sections with respect to the display section using the picked-up images of the plurality of image pickup sections.

In the display device according to the aspect of the invention, in at least a part of a range in which relative directions of an image pickup direction of the first image pickup section and an image pickup direction of the second image pickup section are changed by the movable section, at least a part of the image pickup range of the first image pickup section and at least a part of an image pickup range of the second image pickup section may overlap. The control section may cause the display section to display an image on the basis of the picked-up image of the first image pickup section and may detect the positional relationship between the first image pickup section and the display section on the basis of the picked-up image of the first image pickup section and the picked-up image of the second image pickup section.

(14) A control method for a display device according to still another aspect of the invention includes: controlling a display device including a display section configured to display an image while enabling visual recognition of an outside scene, an image pickup section configured to pick up an image in an image pickup range that overlaps with at least a range visually recognized through the display section, a coupling section including at least one movable section and configured to couple the image pickup section to the display section, and a plurality of light emitting sections fixedly provided in the display section; causing the light emitting sections to emit light rays; causing the image pickup section to pickup an image including reflected light of the light rays emitted by the light emitting sections and reflected on a target object; detecting the reflected light from the picked-up image of the image pickup section and calculating positions of the reflected light in the picked-up image; and calculating changes in a positional relationship between the image pickup section and the display section or the positional relationship on the basis of the positions of the reflected light in the picked-up image.

According to the aspect of the invention, it is possible to detect a movement of the image pickup section with respect to the display section using the picked-up image of the image pickup section and on the basis of a position where the lights emitted by the light emitting sections cross.

(15) A control method for a display device according to yet another aspect of the invention includes: controlling a display device including a display section configured to display an image while enabling visual recognition of an outside scene, an image pickup section configured to pick up an image in an image pickup range that overlaps with a range visually recognized through the display section, a coupling section including at least one movable section and configured to couple the image pickup section to the display section, and a light emitting section fixedly provided in the display section; picking up, when light emitted by the light emitting section is projected on a target object, an image of the light on the target object with the image pickup section; detecting the light from the picked-up image of the image pickup section and calculating a position of the light in the picked-up image; and calculating a change in a positional relationship between the image pickup section and the display section or the positional relationship on the basis of the position of the light in the picked-up image.

According to the aspect of the invention, when the light emitted by the light emitting section is projected on the target object, it is possible to pick up an image of the light on the target object with the image pickup section and detect a change in a relative positional relation of the image pickup section with respect to the display section or the relative positional relation using the picked-up image.

(16) A control method for a display device according to still yet another aspect of the invention includes: controlling a display device including a display section configured to display an image while enabling visual recognition of an outside scene, a first image pickup section configured to pick up an image in an image pickup range that overlaps with a range visually recognized through the display section, a coupling section including at least one movable section and configured to couple the first image pickup section to the display section, and a second image pickup section fixedly provided in the display section; and detecting a positional relationship between the first image pickup section and the display section on the basis of the picked-up image of the first image pickup section and a picked-up image of the second image pickup section.

According to the aspect of the invention, it is possible to detect relative positional relations of the image pickup sections with respect to the display section using the picked-up images of the plurality of image pickup sections.

(17) A computer program according to further another aspect of the invention is executable by a computer for controlling a display device including a display section configured to display an image while enabling visual recognition of an outside scene, an image pickup section configured to pick up an image in an image pickup range that overlaps with at least a range visually recognized through the display section, a coupling section including at least one movable section and configured to couple the image pickup section to the display section, and a plurality of light emitting sections fixedly provided in the display section. The computer program causes the computer to function as a control section configured to cause the light emitting sections to emit light rays, cause the image pickup section to pick up an image including reflected light of the light rays emitted by the light emitting sections and reflected on a target object, detect the reflected light of the light rays emitted by the light emitting sections from the picked-up image of the image pickup section and calculate positions of the reflected light in the picked-up image, and calculate a change in a positional relationship between the image pickup section and the display section or the positional relationship on the basis of the positions of the reflected light in the picked-up image.

According to the aspect of the invention, it is possible to detect a movement of the image pickup section with respect to the display section using the picked-up image of the image pickup section and on the basis of a position where the lights emitted by the light emitting sections cross.

(18) A computer program according to still further another aspect of the invention is executable by a computer for controlling a display device including a display section configured to display an image while enabling visual recognition of an outside scene, an image pickup section configured to pick up an image in an image pickup range that overlaps with a range visually recognized through the display section, a coupling section including at least one movable section and configured to couple the image pickup section to the display section, and a light emitting section fixedly provided in the display section. The computer program causes the computer to function as a control section configured to pick up, when light emitted by the light emitting section is projected on a target object, an image of the light on the target object with the image pickup section, detect the light from the picked-up image of the image pickup section and calculate a position of the light in the picked-up image, and calculate a change in a positional relationship between the image pickup section and the display section or the positional relationship on the basis of the position of the light in the picked-up image.

According to the aspect of the invention, when the light emitted by the light emitting section is projected on the target object, it is possible to pick up an image of the light on the target object with the image pickup section and detect a change in a relative positional relation of the image pickup section with respect to the display section or the relative positional relation using the picked-up image.

(19) A computer program according to yet further another aspect of the invention is executable by a computer for controlling a display device including a display section configured to display an image while enabling visual recognition of an outside scene, a first image pickup section configured to pick up an image in an image pickup range that overlaps with a range visually recognized through the display section, a coupling section including at least one movable section and configured to couple the first image pickup section to the display section, and a second image pickup section fixedly provided in the display section. The computer program causes the computer to function as a control section configured to detect a positional relationship between the first image pickup section and the display section on the basis of the picked-up image of the first image pickup section and a picked-up image of the second image pickup section.

According to the aspect of the invention, it is possible to detect relative positional relations of the image pickup sections with respect to the display section using the picked-up images of the plurality of image pickup sections.

BRIEF DESCRIPTION OF THE DRAWINGS

The invention will be described with reference to the accompanying drawings, wherein like numbers reference like elements.

FIGS. 10A to 10D are explanatory diagrams of control of the HMD according to the first embodiment, wherein FIG. 10A shows an example of AR display, FIG. 10B shows a state of position detection, FIG. 10C shows an example of a picked-up image in the position detection, and FIG. 10D schematically shows a track of a crossing point of lights in the picked-up image.

FIGS. 18A and 18B are explanatory diagrams of control of the HMD according to the second embodiment, wherein FIG. 18A shows an example of AR display and FIG. 18B shows a state of position detection.

FIGS. 21A and 21B are explanatory diagrams of an HMD according to a third embodiment, wherein FIG. 21A shows a state of position detection and FIG. 21B shows the configuration of a projector.

DESCRIPTION OF EXEMPLARY EMBODIMENTS

First Embodiment

A first embodiment of the invention is explained below with reference to the drawings.

Schematic Configuration of a Virtual Image Display Device

Figure 1:
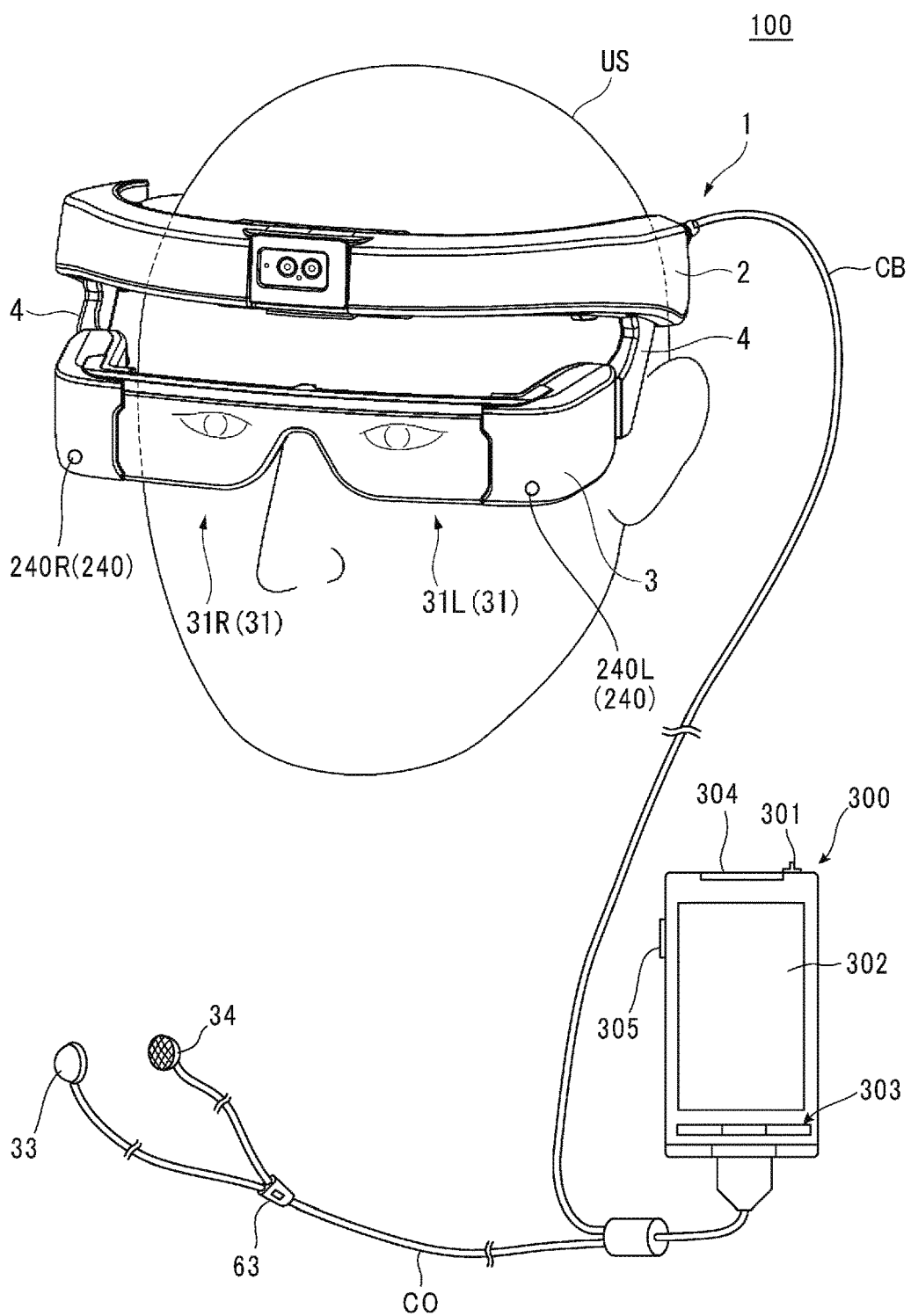
FIG. 1 is a perspective view showing an HMD in a first embodiment of the invention.
Figure 2:
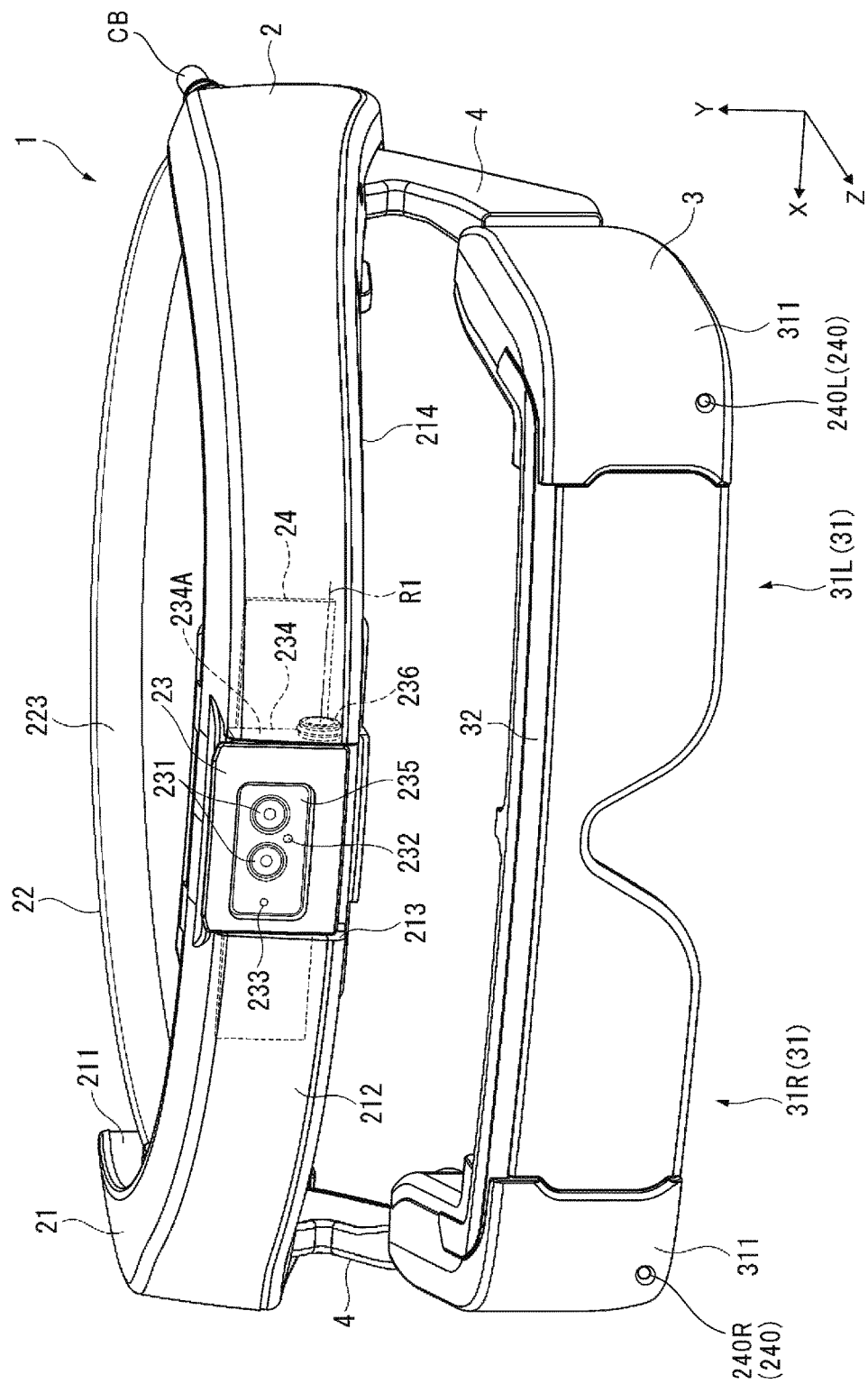
FIG. 2 is a perspective view showing a virtual image display device in the first embodiment.
Figure 3:
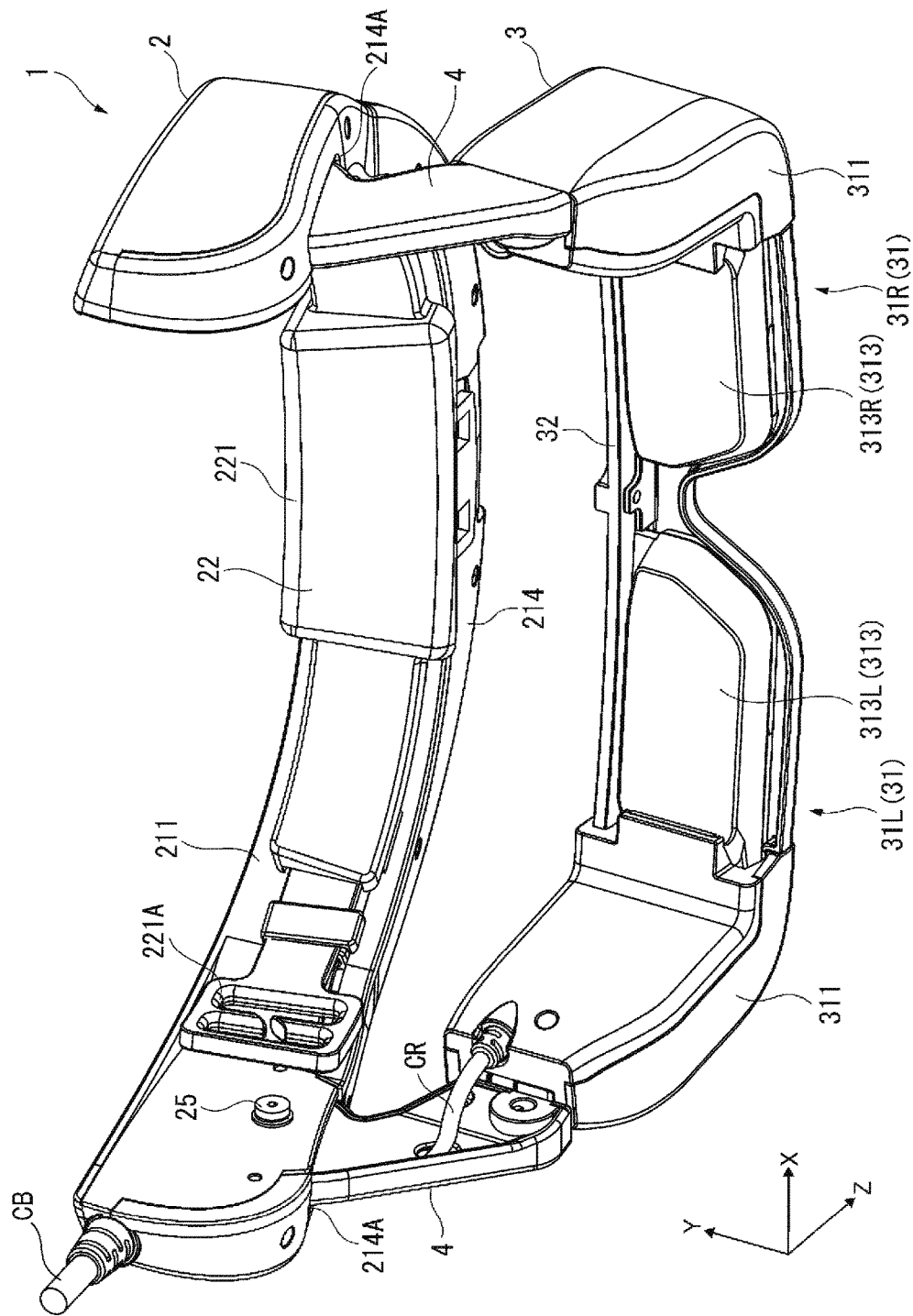
FIG. 3 is a perspective view showing the virtual image display device in the first embodiment.

FIG. 1 is a perspective view showing the configuration of an HMD (Head Mounted Display: a head-mounted display device) 100 according to the first embodiment. FIG. 1 shows a state in which a virtual image display device 1 is worn by a user. FIGS. 2 and 3 are perspective views of the virtual image display device 1 viewed from the front side and the rear side. In other words, FIG. 2 is a perspective view of the virtual image display device 1 viewed from the opposite side of the user side and FIG. 3 is a perspective view of the virtual image display device 1 viewed from the user side.

The HMD 100 (a display device) includes the virtual image display device 1 that causes a user (an observer) US to visually recognize a virtual image in a state in which the virtual image display device 1 is worn on the head of the user US and a control device 300 that controls the virtual image display device 1. The control device 300 also functions as a controller with which the user US operates the HMD 100. In this specification, the virtual image visually recognized by the user US with the HMD 100 is referred to as "display image" for convenience. The virtual image display device 1 emitting image light generated on the basis of image data is referred to as "display an image" as well.

The virtual image display device 1 is connected to the control device 300 by a cable CB. A cable CB incorporates a power supply cable (not shown in the figure) for supplying electric power from the control device 300 to the virtual image display device 1 and a data communication cable (not shown in the figure) through which the virtual image display device 1 and the control device 300 transmit and receive various data.

Figure 9:
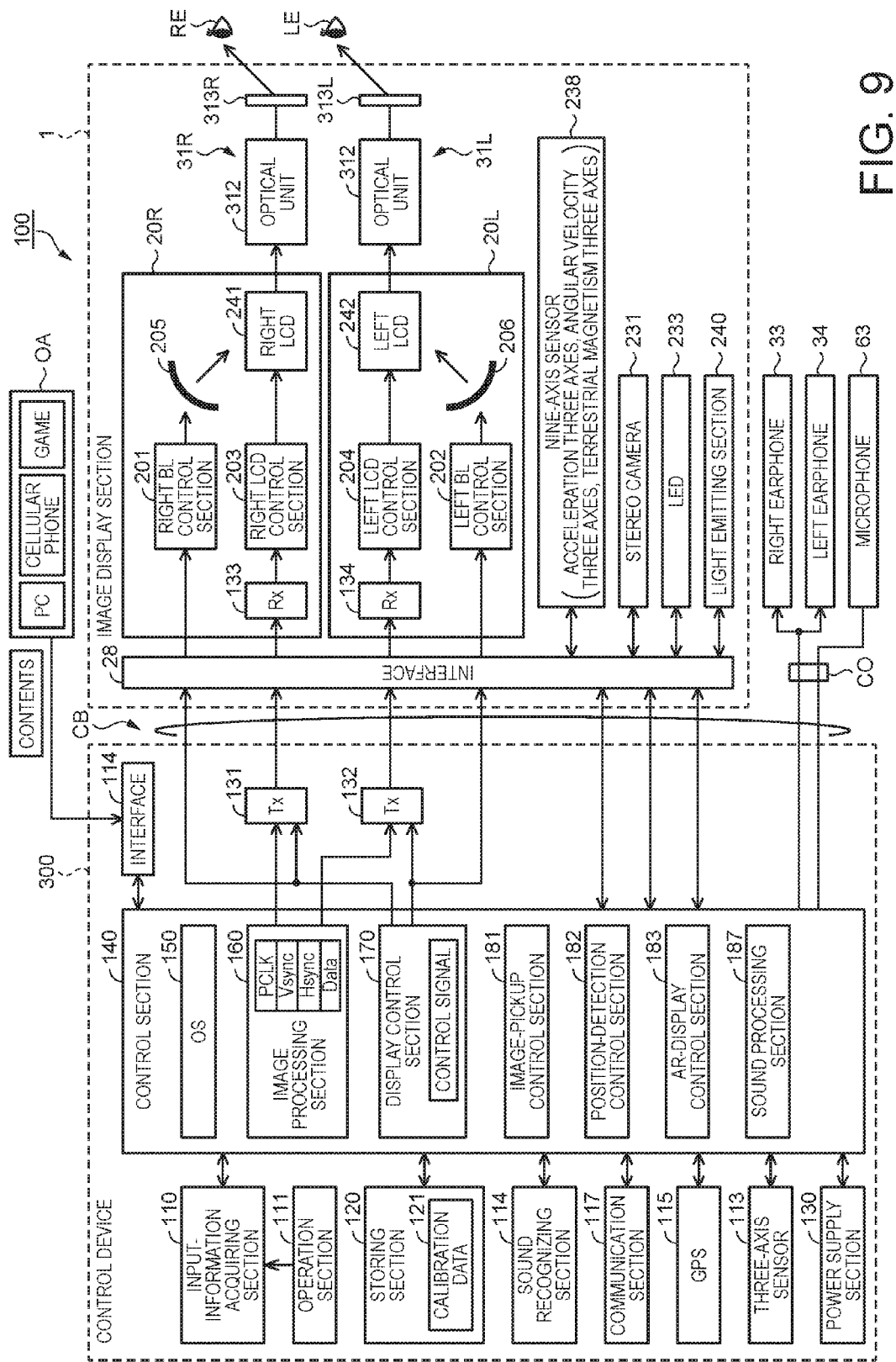
FIG. 9 is a functional block diagram of the HMD according to the first embodiment.

An audio cable CO branching from the cable CB is connected to the control device 300. A right earphone 33 and a left earphone 34 and a microphone 63 are connected to the audio cable CO. The right earphone 33 and the left earphone 34 output sound on the basis of a sound signal output by a sound processing section 187 (FIG. 9).

The microphone 63 collects sound and outputs a sound signal to the sound processing section 187 (FIG. 9) explained below. The microphone 63 may be, for example, a monaural microphone or a stereo microphone, may be a microphone having directivity, or may be a nondirectional microphone.

When the virtual image display device 1 includes a power supply such as a battery, it is also possible to connect the virtual image display device 1 and the control device 300 by wireless communication.

Specifically, the virtual image display device 1 is a see-through type display device that displays a virtual image to be visually recognizable by the observer and transmits external light to enable observation of an outside world (an outside scene). The virtual image display device 1 includes, as shown in FIGS. 1 to 3, a headband section 2 functioning as a main body section worn on the head of the user US or a helmet or the like worn on the head, a display section 3 that displays a virtual image, a pair of arm sections 4 turnably attached to the headband section 2 to connect the headband section 2 and the display section 3, and moving mechanisms 5 (see FIG. 6) for moving the display section 3 with respect to the arm sections 4.

Note that in the following explanation, a Z direction is a viewing direction at the time when the user US wearing the virtual image display device 1 faces the front and an X direction and a Y direction are directions orthogonal to the Z direction and orthogonal to each other. Among the directions, the X direction is a direction from the left to the right viewed from the user US wearing the virtual image display device 1 and the Y direction is a direction from the bottom to the top viewed from the user US. Further, a Z-direction side indicates a downstream side in the Z direction (a Z-direction distal end side). The opposite side of the Z direction indicates an upstream side in the Z direction (a Z-direction proximal end side). The same applies to the other directions.

Configuration of the Headband Section

One ends of the arm sections 4 explained below are attached to the headband section 2. The headband section 2 controls a part of functions in the virtual image display device 1.

The headband section 2 has an arcuate external shape conforming to the shape of the head of the user US. As shown in FIG. 2, the headband section 2 includes a main body case 21 disposed along the head of the user US, a band 22 functioning as a fixing section for fixing the headband section 2 to a fixed part such as the head of the user US or the helmet, an image pickup section 23, and a control board 24. Note that the fixed part is a position corresponding to the head of the user US (specifically, a part further on the upper side than an outer peripheral line of the head passing the eyebrows and the ears). The helmet or the like may be interposed between the head and the headband section 2.

The control board 24 is connected to the control device 300 by the cable CB. The control board 24 is mounted with the image pickup section 23 and a circuit (not shown in the figure) incidental to the image pickup section 23 and a nine-axis sensor 238 (FIG. 9). The control board 24 connects light emitting sections 240 explained below and the cable CB. The control board 24 transmits and receives a picked-up image of the image pickup section 23, a detection value of the nine-axis sensor 238, and the like to and from the control device 300 and delivers a signal, with which the control device 300 controls lighting of the light emitting sections 240, to the light emitting sections 240.

Figure 4:
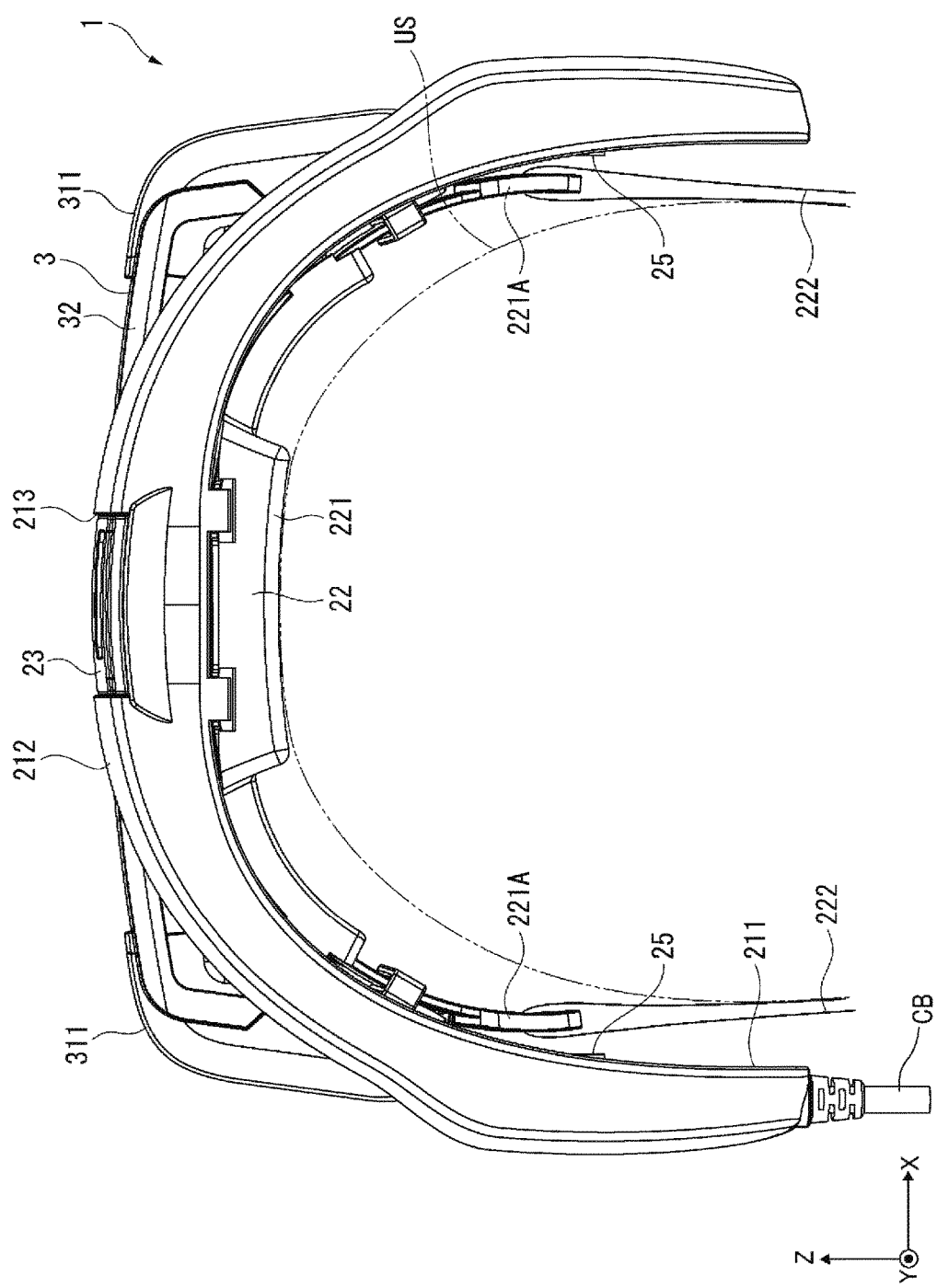
FIG. 4 is a top view showing the virtual image display device in the first embodiment.
Figure 5:
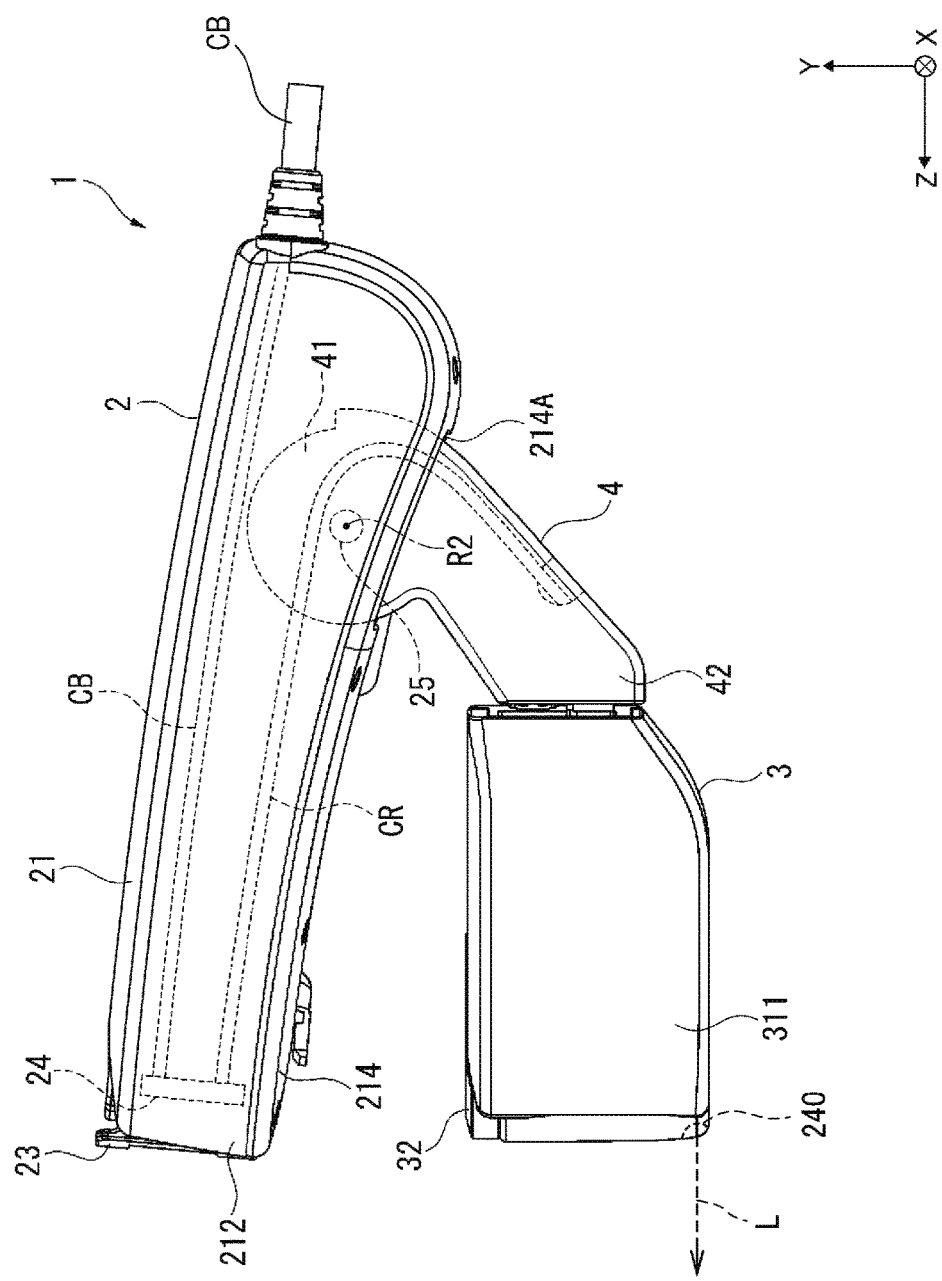
FIG. 5 is a side view showing the virtual image display device in the first embodiment.

FIG. 4 is a plan view of the virtual image display device 1 viewed from the opposite direction of the Y direction. FIG. 5 is a side view of the virtual image display device 1 viewed from the X direction.

As shown in FIG. 4, the main body case 21 is disposed along the forehead of the user US (the user US whose contour is indicated by a dotted line in FIG. 4) and fixed to the head by the band 22. The main body case 21 is a housing that houses the control board 24 (see FIG. 2), the cable CB, and the like on the inside and supports the image pickup section 23 and the arm sections 4.

The main body case 21 has an external shape of a substantially semicircular shape (a substantially U shape) conforming to the shapes of the forehead and the temporal regions of the user US. That is, in the main body case 21, an inner surface 211 opposed to the forehead to the temporal regions of the user US is curved along the head of the user US when viewed from the Y-direction side.

As shown in FIG. 5, turning shaft sections 25 that turnably axially support one ends of the respective arm sections 4 are provided near both arcuate ends of the main body case 21. Note that, as explained in detail below, the one ends in the arm sections 4 are disposed on the inside of the main body case 21.

The band 22 fixes the main body case 21 to the head of the user US. The band 22 includes, as shown in FIG. 4, a band main body 221 attached to the inner surface 211 of the main body case 21 and band sections 222 attached to the band main body 221.

As shown in FIGS. 3 and 4, the band main body 221 includes, at both ends, annular sections 221A to which the band sections 222 are attached.

As shown in FIG. 4, the band sections 222 are attached to the annular sections 221A at both the ends of the band main body 221 to configure the annular band 22 in conjunction with the band main body 221. The band sections 222 are formed of, for example, a belt-like member having flexibility. The belt sections 222 press a wearing target such as the head of the user US or the helmet toward the band main body 221 side, whereby the band 22 and the headband section 2 are fixed to the head of the user US.

As shown in FIGS. 2 and 4, the image pickup section 23 is disposed substantially in the center on an outer surface 212 located on the opposite side of the inner surface 211 in the main body case 21. The image pickup section 23 picks up an image of a part of a region in the front of the user US, that is, in the visual field of the user US. The image pickup section 23 includes, as shown in FIG. 2, a stereo camera 231, an illuminance sensor 232 that detects the illuminance of external light, an LED 233, and a module housing 234 that houses the stereo camera 231, the illuminance sensor 232, and the LED 233 on the inside. Note that the LED 233 functions as, for example, a power indicator that is lit during driving of the virtual image display device 1 and extinguished during non-driving of the virtual image display device 1.

As shown in FIG. 2, the module housing 234 includes, on a surface on the Z-direction side, a window section 235 covered by a light transmitting member. The stereo camera 231 picks up an image of the outside via the window section 235. The illuminance sensor 232 detects the illuminance of external light made incident via the window section 235.

On a side surface 234A crossing the X direction of the module housing 234, a turning shaft section 236 projecting along the X direction from the side surface 234A is provided. Specifically, the turning shaft section 236 is protrudingly provided in a position on the opposite side of the Y direction on the side surface 234A. The turning shaft section 236 is supported by a bearing section (not shown in the figure) provided in a recessed section 213 of the main body case 21 in which the module housing 234 is disposed. An adjusting mechanism according to the invention is configured by the turning shaft section 236, the bearing section, and the like. Note that, in FIG. 2, only the turning shaft section 236 on the proximal end side in the X direction of the two side surfaces 234A is shown. However, a turning shaft section is also provided in a corresponding position on a side surface on the distal end side in the X direction.

The module housing 234 is capable of turning within a predetermined range about a turning shaft R1 parallel to the X direction defined by the turning shaft section 236. Therefore, it is possible to adjust an image pickup direction of the stereo camera 231 (i.e., an image pickup direction by the image pickup section 23) by adjusting a posture of the module housing 234 with respect to the main body case 21.

Configuration of the Display Section

The display section 3 forms an image corresponding to image information input thereto and causes the user US to visually recognize the image as a virtual image. The display section 3 includes a pair of optical devices 31 respectively disposed with respect to the right eye and the left eye of the user US (the optical devices for left eye and right eye are respectively represented as 31L and 31R) and a substantially U-shaped frame section 32 that holds the pair of optical devices 31. The optical device for left eye 31L of the pair of optical devices 31 includes a light guide member 313L including a half mirror. The optical device for right eye 31R of the pair of optical devices 31 includes a light guide member 313R including a half mirror. Note that the optical device for left eye 31L and the optical device for right eye 31R have a mirror symmetrical relation each other.

Figure 6:
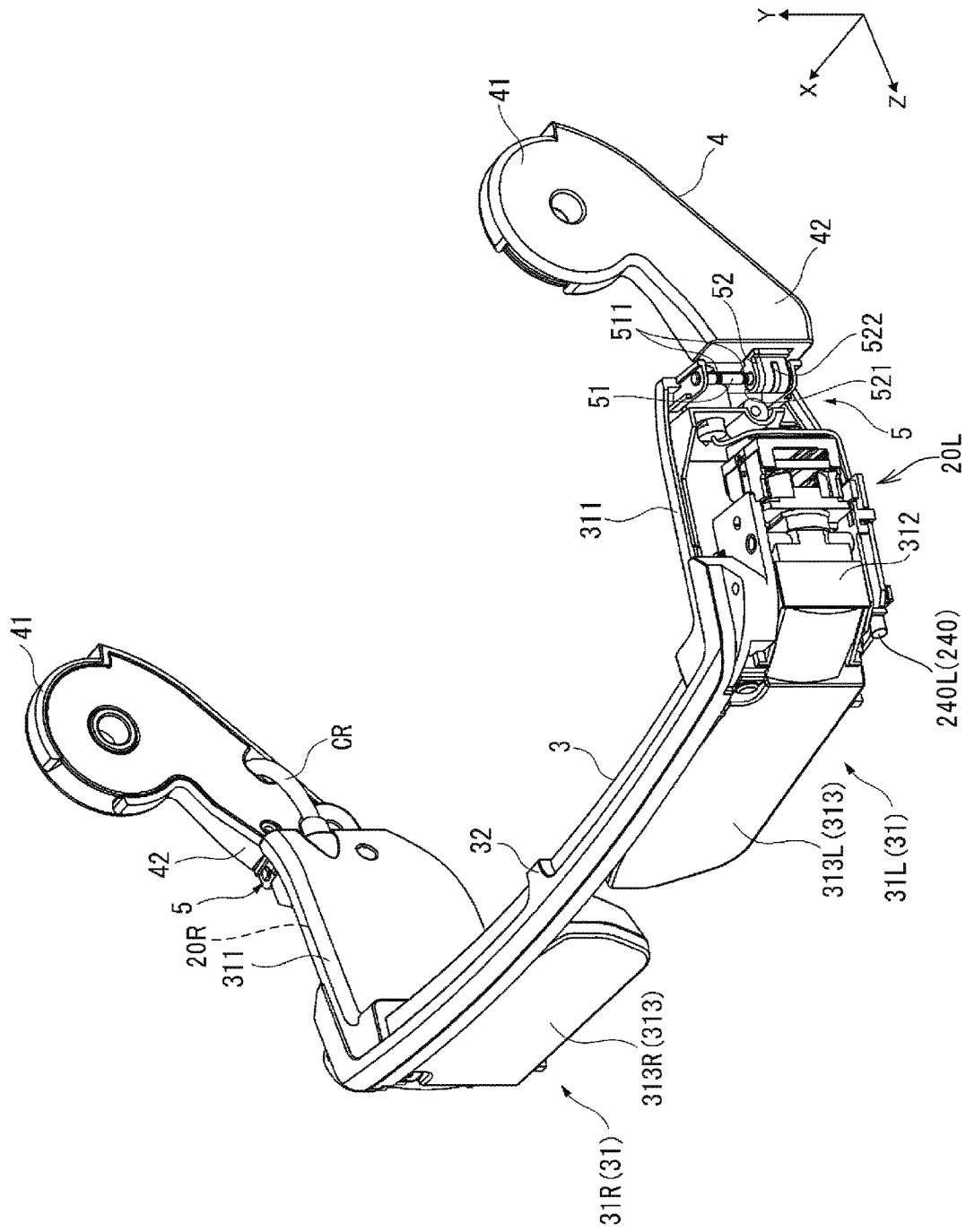
FIG. 6 is a perspective view showing arm sections and a display section in the first embodiment.

FIG. 6 is a diagram showing the inside of the optical device 31 excluding a part of a cover member 311.

The pair of optical devices 31 respectively includes cover members 311, optical units 312 (see FIG. 6), and the light guide members 313 (see FIG. 3).

The cover members 311 are housings that house the optical units 312 on the insides.

The optical units 312 are disposed on the insides of the cover members 311. The optical units 312 emit image lights generated by image generating sections 20 explained below to the light guide members 313 corresponding to the optical units 312.

The light guide members 313 (the light guide members for right eye and left eye are respectively represented as 313R and 313L) are disposed in positions corresponding to the eyes of the user US. Semi-transparent layers (semi-reflective layers) having a form of a half mirror are formed on the insides of the light guide members 313. An outside world can be observed via the semi-transparent layers. Besides, image lights emitted from the optical units 312 and reflected on the semi-transparent layers are made incident on the eyes, whereby a virtual image is visually recognized. The light guide members 313 are mainly formed of resin (e.g., cycloolefin polymer) indicating high light transmissivity in a visible light region.

In the optical devices 31R and 31L, image generating sections 20R and 20L that deliver image lights to the optical units 312 are respectively disposed. Cables CR for outputting image information (image signals) are connected to the image generating sections 20R and 20L. As shown in FIGS.

3 and 6, the cables CR are extended to the outside of the cover members 311. Thereafter, as shown in FIG. 5, the cables CR are inserted into the arm sections 4. As explained below with reference to FIG. 9, the image generating sections 20 (the image generating sections 20R and 20L) include backlights functioning as light sources that emit lights according to control by the control device 300 (FIG. 1) and LCDs that generate image lights on the basis of image signals output by the control device 300. The image lights generated by the image generating sections 20 are made incident on the optical units 312 and radiated on the eyeballs of the user US from the optical units 312 through the light guide members 313.

The frame section 32 holds the pair of optical devices 31 on the distal end side in the Y direction. The optical device for left eye 31L is fixed to the proximal end side in the X direction of the frame section 32. The optical device for right eye 31R is fixed to the distal end side in the X direction of the frame section 32.

Configuration of the Arm Sections

As shown in FIGS. 2 and 3, the pair of arm sections 4 connects the main body case 21 of the headband section 2 and the cover members 311 of the display section 3. The pair of arm sections 4 is configured to be capable of turning with respect to the main body case 21. As shown in FIG. 5, end portions on the main body case 21 side in the arm sections 4 are turnably supported in the main body case 21 via openings 214A formed on a lower surface 214 (a surface 214 on the opposite side of the Y direction) of the main body case 21. The arm sections 4 respectively include first end portions 41 and second end portions 42.

The first end portions 41 are end portions on the opposite side of the Z direction in the arm sections 4. When viewed from the X-direction side, the first end portions 41 are formed in a substantially circular shape. The first end portions 41 are inserted through the openings 214A and axially supported by the turning shaft sections 25 in the main body case 21. Therefore, the arm sections 4 are capable of turning within predetermined ranges centering on turning shafts R2 that pass axial supporting positions of the first end portions 41 and are parallel to the X direction.

The second end portions 42 are end portions on the Z-direction side in the arm sections 4. Slide members 52 configuring the moving mechanisms 5 explained below are provided at the second end portions 42. The slide members 52 engage with guiderails 51 configuring the moving mechanisms 5 and disposed in the cover members 311 of the display section 3. Consequently, the second end portions 42 and the display section 3 are connected.

Figure 7:
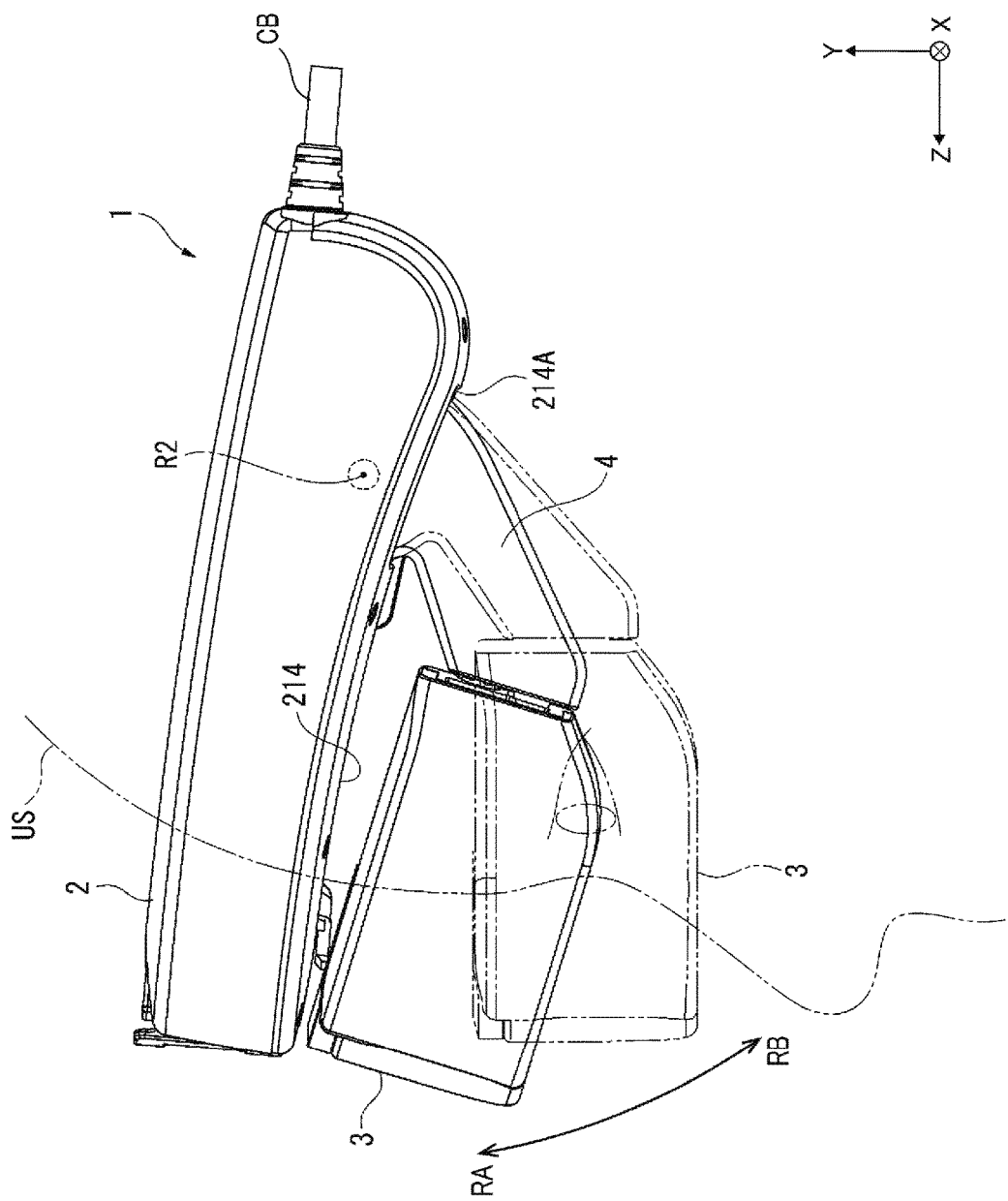
FIG. 7 is a side view showing the virtual image display device in the first embodiment.

FIG. 7 is a diagram showing a state in which the display section 3 and the arm section 4 turn. In FIG. 7, the arm section 4 is turned clockwise about the turning shaft R2 parallel to the X axis, that is, substantially orthogonal to a viewing direction from the state shown in FIG. 5.

In this embodiment, as shown in FIG. 7, the arm section 4 is capable of turning about the turning shaft R2 in a direction indicated by an arrow RA in the figure to the headband section 2 side until the display section 3 or the arm section 4 comes into contact with the headband section 2. On the other hand, the arm section 4 is capable of turning in the opposite direction of the direction explained above, that is, a direction indicated by an arrow RB in the figure until an end portion on the opposite side of the Z direction of the opening 214A and the arm section 4 come into contact with each other.

By turning the arm section 4 in this way, it is possible to adjust the position and the angle of the display section 3. As shown in FIG. 7, it is possible to move the display section 3 to a position where it is hard to visually recognize a virtual image, that is, a position where it is easy to observe an outside world (the periphery of the user US). For example, when the user US does not have to visually recognize an image displayed on the display section 3, by turning the arm section 4 and moving the display section 3 in the RA direction, it is possible to retract the display section 3 from the visual field of the user US.

The virtual image display device 1 has a configuration in which the headband section 2 and the display section 3 are separated and coupled by the arm sections 4. A burden on the user US due to the load of the virtual image display device 1 is reduced by this configuration. That is, the virtual image display device 1 is worn on the head of the user US by the headband section 2. Therefore, the user US only has to support the load of the virtual image display device 1 in the head and does not have to receive the load in the nose and the ears. Therefore, a sense of burden is light. Despite such a configuration, the virtual image display device 1 can locate the display section 3 in front of the eyes of the user US and perform AR (Augmented Reality) display explained below. The headband section 2 does not need to be set in direct contact with the head of the user US. For example, the user US can wear the virtual image display device 1 over a protective cap.

Note that the cable CR (see FIG. 6) inserted into the arm section 4 from the display section 3 intrudes into the main body case 21 from the first end portion 41 through the arm section 4 as shown in FIG. 5. As shown in FIGS. 1 to 7, the cable CR extends to the outside from one end (an end portion on the opposite side of the X direction) of the main body case 21 together with the cable CB extending from the control board 24 in the main body case 21.

Configuration of the Moving Mechanisms

The moving mechanisms 5 connect the display section 3 and the arm sections 4. The moving mechanisms 5 are configured to be capable of moving the display section 3 with respect to the arm sections 4 in directions in which the display section 3 moves close to and away from the headband section 2 (i.e., the Y direction and the opposite direction of the Y direction). The moving mechanisms 5 include, as shown in FIG. 6, two sets of guiderails 51 and slide members 52.

The guiderails 51 guide movement in the Y direction and the opposite direction of the Y direction of the slide members 52 provided at the second end portions 42. The guiderails 51 are fixed on the insides of the respective cover members 311. The guiderails 51 are columnar members. When a traveling direction of image lights traveling from the light guide members 313 toward the eyes of the user US is parallel to the Z direction, the guiderails 51 are disposed such that the axial direction thereof extends along the Y direction. On the outer circumferential surfaces of the guiderails 51, grooves 511 extending along the circumferential direction for determining stop positions of the slide members 52 are formed in a plurality of positions along the axial direction to make it possible to move the slide members 52 stepwise along the guiderails 51 and generate a sense of click during a slide of the slide members 52.

Figure 8:
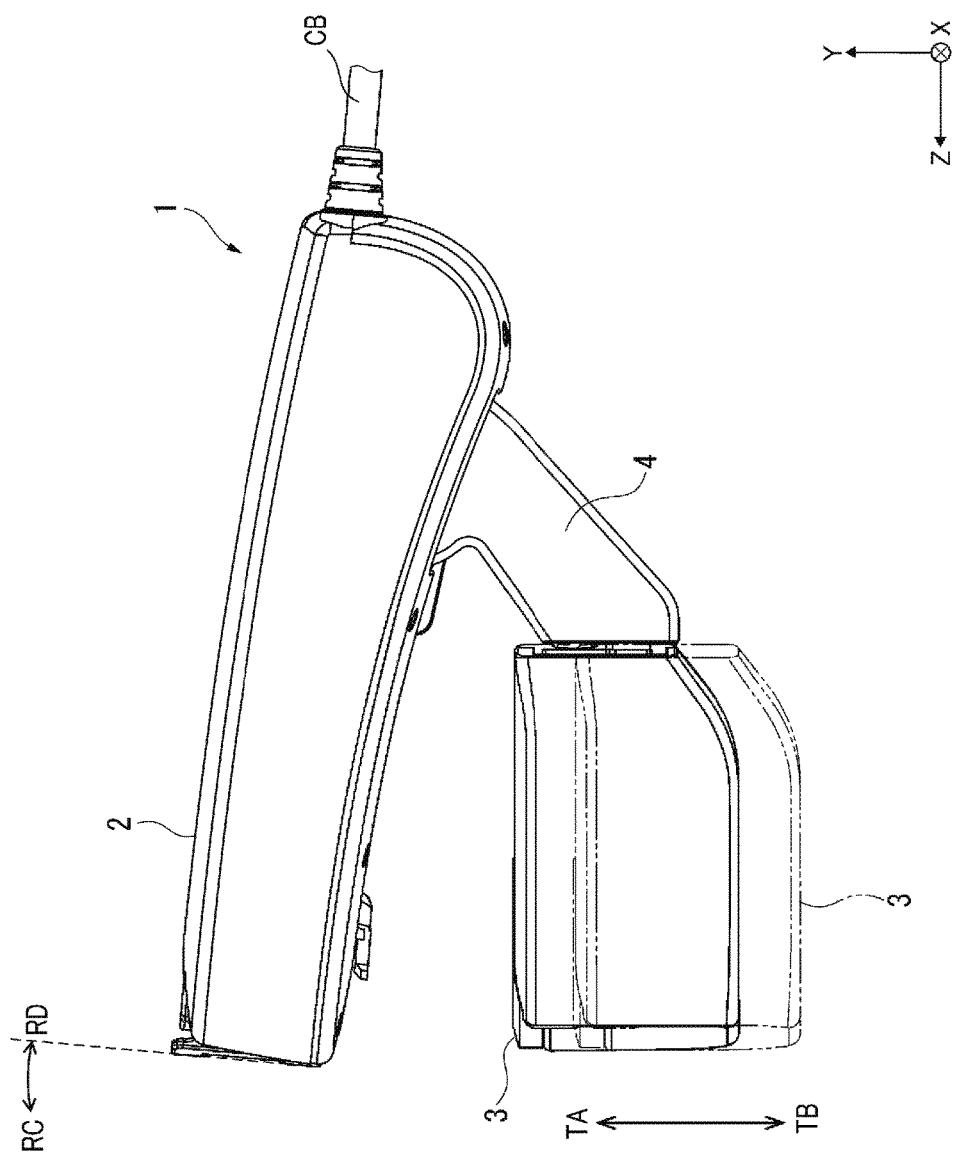
FIG. 8 is a side view showing the virtual image display device in the first embodiment.

FIG. 8 is a diagram showing a state in which the display section 3 is moved by the moving mechanism 5. Note that, in FIG. 8, a state is shown in which the arm section 4 is positioned such that a moving direction by the moving mechanism 5 is along the Y direction.

As explained above, the slide members 52 are protrudingly provided from surfaces on the Z-direction side at the second end portions 42 of the arm sections 4. The slide members 52 are engaged slidably along the axial direction of the guiderails 51. Consequently, as shown in FIG. 8, the display section 3 is moved in the Y direction. The distance between the headband section 2 and the display section 3 can be adjusted. That is, the display section 3 can be moved to rise along the Y direction as indicated by an arrow TA and fall along the Y direction as indicated by an arrow TB.

In this way, the display section 3 is supported slidably up and down. Consequently, the user US can freely adjust the position of a display image of the display section 3 according to, for example, a situation of work. For example, when work support is performed by AR display, the user US only has to lower the display section 3 in the TB direction when performing work while looking at the hands and lift the display section 3 in the TA direction during work for an upper part such as a shelf. In this case, the user US can slide the display section 3 and change the position of the display section 3 to easily see the outside (the hands or the upward direction) for the work. Concerning a direction in which the display direction 3 is moved, ideally, it is desirable to turn the display section 3 around an axis passing the rotation center of the eyeball of the user US. However, it is possible to slide the display section 3 up and down (in the TA and TB directions) near the eyes instead of ideally turning the display section 3.

As explained above, the display section 3 can be turned about the turning shafts R2 of the first end portions 41. The turning about the turning shafts R2 is useful as a motion for retraction for retracting the display section 3 from the visual filed of the user US. However, since the distance between the display section 3 and the eyeball of the user US changes according to the turning, if the display section 3 is moved around the turning shafts R2, it is sometimes hard to see the display section 3 even if a movement amount (turning angle) is small. On the other hand, a motion for sliding the display section 3 up and down using the moving mechanisms 5 and a motion for turning the display section 3 about the axis passing the rotation center of the eyeballs displace the display section 3 while keeping the distance between the display section 3 and the eyes constant. Therefore, visibility is satisfactorily maintained.

The virtual image display device 1 includes both of a mechanism for turning the display section 3 about the turning shafts R2 and a mechanism for sliding the display section 3 up and down with the moving mechanisms 5. Therefore, it is possible to retract the display section 3 from the visual field of the user US and change a position for viewing display of the display section 3. Note that a mechanism for turning the display section 3 about an imaginary line that passes the rotation center of the eyeballs may be adopted. A configuration may be adopted in which the display section 3 does not come into contact with the face of the user US in a turning range of the display section 3 in the structure (e.g., a long turning radius or a small display section 3). In such a mechanism, it is possible to realize, with one movable section, appropriate retraction of the display section 3 and an appropriate change of a position where the user US views display of the display section 3.

In the headband section 2, an image pickup direction of the stereo camera 231 can be moved by turning the image pickup section 23 about the turning shaft R1 in a direction indicated by an arrow RC in FIG. 8 and the opposite direction (an arrow RD) of the direction. Consequently, it is possible to adjust an image pickup range A of the stereo camera 231 up and down.

In the virtual image display device 1, the headband section 2 and the display section 3 are coupled to be capable of turning in the RA and RB directions and sliding in the TA and TB directions via the arm sections 4. Consequently, positions of an image pickup range of the image pickup section 23 and the position of the display section 3 relative to each other changes. This configuration is advantageous in that the display section 3 can be reduced in weight by providing the image pickup section 23 in the headband section 2. By reducing the display section 3 in weight, it is possible to make a structure for supporting the display section 3, for example, the moving mechanisms 5 and a supporting structure for the first end portions 41 simple and light in weight. There is also an advantage in that the user US can move the display section 3 with weak force according to an intention of the user US. The image pickup range of the image pickup section 23 overlaps with at least a range visually recognized by the user US through the display section 3, in other words, a range visually recognized by the user US. The image pickup range of the image pickup section 23 may include the range visually recognized by the user US through the display section 3.

Note that the slide member 52 includes, as shown in FIG. 6, a hole section 521 through which the guiderail 51 is inserted, a slit 522 formed to traverse the hole section 521 in an intermediate position in the Y direction, and a not-shown O-ring formed of an elastic body such as Anan rubber. The O-ring is disposed in the slit 522. The guiderail 51 is inserted through the O-ring. The O-ring tightens the guiderail 51 in the inner diameter direction, whereby it is possible to slide the sliding member 52 along the guiderail 51 while giving moderate resistance to the sliding member 52. Then, the O-ring fits in the groove 511 of the guiderail 51, whereby positions of the slide member 52 and the guiderail 51 relative to each other are maintained. However, the configuration of the moving mechanism 5 is not limited to this. The slide member 52 may be capable of continuously relatively moving along the height direction of the guiderail 51. In this case, the groove 511 does not have to be provided.

The virtual image display device 1 has a configuration in which lights are emitted from both side end portions of the display section 3.

As shown in FIG. 2 and the other figures, the display section 3 includes light emitting sections 240 at left and right both end portions. The light emitting sections 240 include light sources such as LEDs or laser diodes and radiate lights forward. Light L (see FIG. 5) emitted by the light emitting section 240 is radiated toward a substantial visual line direction of the user US. The light L is light within a visible region and is desirably light having high rectilinearity. Lights L emitted by a light emitting section 240R embedded and set in the cover member 311 at the end portion of the right side of the display section 3 and a light emitting section 240L embedded and set in the cover member 311 at the end portion on the left side of the display section 3 are radiated toward the width direction center of the display section 3. These two lights L cross within the image pickup range of the image pickup section 23 as explained below.

The virtual image display device 1 configured as explained above has advantages explained below.

The headband section 2 functioning as the main body section extending along the head of the user US is fixed in a position where a virtual image displayed by the display section 3 connected to the headband section 2 via the arm sections 4 can be visually recognized by the user US. Consequently, since the headband section 2 is fixed to a fixed part such as the forehead of the user US in a state in which the headband section 2 is disposed along the forehead, it is possible to suppress the load of the virtual image display device 1 from being applied to the nose of the user US. Therefore, it is possible to reduce a burden on the user US during use of the virtual image display device 1 and improve a sense of use.

The arm sections 4 are capable of turning about connecting parts to the headband section 2. Therefore, it is possible to adjust the position and the angle of the display section 3 with respect to the headband section 2 by turning the arm sections 4. Consequently, it is possible to locate the display section 3 in a position corresponding to a visual line direction of the user US during the wearing of the virtual image display device 1 and improve visibility of a virtual image displayed by the display section 3. When the virtual image is not visually recognized, it is possible to retract the display section 3 from the front of the eyes of the user US. Therefore, it is possible to improve convenience of the virtual image display device 1.

The arm sections 4 are connected to the headband section 2 to be capable of turning about the turning shafts R2. Consequently, it is possible to easily adjust the position of the display section 3 according to turning operation for the arm sections 4. Besides, when the virtual image is not visually recognized, it is possible to surely retract the display section 3 from the front of the eyes of the user US. Therefore, it is possible to surely improve the convenience of the virtual image display device 1.

The moving mechanisms 5 move the display section 3 in directions in which the display section 3 moves close to and away from the headband section 2. Consequently, it is possible to make it easy to adjust the position of the display section 3 to overlap in a viewing direction according to the positions of the eyes of the user US. Therefore, it is possible to adjust the position of the display section 3 according to the user US and improve the convenience and versatility of the virtual image display device 1.

It is possible to pick up an image of a part of a region in the visual field of the user US with the image pickup section 23 included in the headband section 2. Therefore, for example, by displaying a picked-up image picked up by the image pickup section 23 on the display section 3 or outputting the picked-up image to the outside, the user US or others can grasp a situation around the user US.

When the image pickup section 23 is located in the display section 3, it is conceivable that a weight balance of the virtual image display device 1 is lost because of the load of the image pickup section 23. On the other hand, since the image pickup section 23 is located in the headband section 2 fixed to the fixed part, it is possible to reduce the weight of the display section 3 and easily make the weight balance of the virtual image display device 1 appropriate. Therefore, it is possible to further reduce the burden on the user US.

The image pickup section 23 is configured to be capable of turning about the turning shafts R2. Consequently, it is possible to adjust an image pickup direction of the image pickup section 23 to a position corresponding to a visual line direction of the user US. Therefore, it is possible to surely pick up an image of at least a part of a region in a visual field of the user US.

The control board 24 that controls at least a part of functions of the virtual image display device 1 is disposed in the headband section 2. Consequently, as in the image pickup section 23, compared with when the control board 24 is provided in the display section 3, it is possible to reduce the weight of the display section 3 and easily make the weigh balance of the virtual image display device 1 appropriate. Therefore, it is possible to further reduce the burden on the user US.

When cables are directly extended to the outside from the display section 3, it is necessary to increase, taking into account movement of the cables, the strength of the cover members 311 and the frame section 32 functioning as the housing configuring the exterior of the display section 3. If the cable extends to the outside from the display section 3, appearance is deteriorated.

On the other hand, the cables CR extending from the display section 3 are connected to the control board 24 through the arm sections 4 and the headband section 2. The cable CB extending from the control board 24 extends to the outside through the headband section 2. Consequently, it is unnecessary to increase the strength of the cover members 311, the frame section 32, and the like. Besides, it is possible to improve the appearance of the virtual image display device 1.

The headband section 2 has an arcuate external shape conforming to the shape of the head of the user US. Consequently, it is possible to more surely dispose the headband section 2 along the head. Therefore, it is possible to improve a wearing feeling. Besides, it is possible to improve the appearance during the wearing of the virtual image display device 1.

With the optical device for left eye 31L and the optical device for right eye 31R, the display section 3 can cause the user US to visually recognize the same virtual image with the left eye and the right eye of the user US and cause the user US to visually recognize different images respectively with the left eye and the right eye. Therefore, it is possible to improve the convenience and the versatility of the virtual image display device 1.

The virtual image display device 1 adopts a see-through type configuration including the light guide members 313 that guide lights for forming a virtual image to the eyes of the user US and transmit external light. Consequently, it is possible to observe the virtual image and the periphery of the user US via the light guide members 313. Therefore, it is possible to give a sense of security to the user US during the visual recognition of the virtual image. Besides, it is possible to realize augmented reality by causing the user US to visually recognize the virtual image superimposed on a scene around the user US. Therefore, it is possible to further improve the convenience and the versatility of the virtual image display device 1.

Configuration of a Control System

FIG. 9 is a functional block diagram of sections configuring the HMD 100.

As shown in FIG. 9, the HMD 100 is connected to an external apparatus OA via an interface 125. The interface 125 connects various external apparatuses OA, which function as supply sources of contents, to the control device 300. As the interface 125, for example, interfaces adapted to wired connection such as an USB interface, a micro USB interface, and an interface for a memory card can be used.

The external apparatus OA is used as an image supply device that supplies an image to the HMD 100. As the external apparatus OA, for example, a personal computer (PC), a cellular phone terminal, or a game terminal is used.

The control device 300 includes a control section 140, an operation section 111, an input-information acquiring section 110, a storing section 120, and a transmitting section (Tx) 131 and a transmitting section (Tx) 132. The control device 300 transmits various signals to receiving sections 133 and 134 included in the image generating sections 20 provided in the display section 3.

The operation section 111 detects operation by the user US. The operation section 111 includes a power switch 301, a track pad 302, a key switch section 303, and an up-down key 305 shown in FIG. 1. The input-information acquiring section 110 acquires an operation signal or operation data output by the operation section 111 according to an operation input by the user US.

The control device 300 includes a power supply section 130 and supplies electric power to the sections of the control device 300 and the virtual image display device 1.

The storing section 120 is a nonvolatile storage device and has stored therein various computer programs. In the storing section 120, image data to be displayed on the virtual image display device 1 of the HMD 100 may be stored. The control section 140 may execute a computer program stored in the storing section 120 to thereby generate display data displayed by the virtual image display device 1.

A three-axis sensor 113, a GPS 115, and a communication section 117 are connected to the control section 140. The three-axis sensor 113 is a three-axis acceleration sensor. The control section 140 is capable of acquiring a detection value of the three-axis sensor 113. The GPS 115 includes an antenna (not shown in the figure), receives a GPS (Global Positioning System) signal, and calculates the present position of the control device 300. The GPS 115 outputs the present position and the present time calculated on the basis of the GPS signal to the control section 140. The GPS 115 may include a function of acquiring the present time on the basis of information included in the GPS signal and correcting time clocked by the control section 140 of the control device 300.

The communication section 117 executes wireless data communication conforming to a standard of wireless communication such as a wireless LAN (WiFi (registered trademark)) or a Miracast (registered trademark). The communication section 117 is also capable of executing wireless data communication conforming to a standard of short-range wireless communication such as Bluetooth (registered trademark), Bluetooth Low Energy, RFID, or Felica (registered trademark).

When the external apparatus OA is connected to the communication section 117 by radio, the control section 140 acquires content data with the communication section 117 and performs control for displaying an image on the virtual image display device 1. On the other hand, when the external apparatus OA is connected to the interface 125 by wire, the control section 140 acquires content data from the interface 125 and performs control for displaying an image on the virtual image display device 1. Therefore, the communication section 117 and the interface 125 are hereinafter collectively referred to as data acquiring section. The data acquiring section acquires content data from the external apparatus OA. The content data may be stored in, for example, the storing section 120.

The control section 140 includes a CPU, a ROM, and a RAM (all of which are not shown in the figure). The control section 140 reads out and executes a computer program stored in the storing section 120 or the ROM to thereby control the sections of the HMD 100. The control section 140 executes the computer program to function as an operating system (OS) 150, an image processing section 160, a display control section 170, an image-pickup control section 181, a position-detection control section 182, an AR-display control section 183, and the sound processing section 187.

The image processing section 160 acquires an image signal included in contents. The image processing section 160 transmits, with the transmitting section 131, synchronization signals such as a vertical synchronization signal VSync and a horizontal synchronization signal HSync, a clock signal PCLK, and digital image data (in the figure, Data) for displaying an image included in the contents to each of the image generating sections 20R and 20L. The image processing section 160 may execute, according to necessity, image processing such as resolution conversion processing, various kinds of color tone correction processing such as adjustment of luminance and chroma, and keystone correction processing on image data. The transmitting sections 131 and 132 function as a transceiver for serial transmission between the control device 300 and the virtual-image display device 1.

The image generating sections 20R and 20L modulate lights emitted by a right backlight 205 and a left backlight 206 and generate image lights on the basis of signals input from the image processing section 160 via the receiving sections 133 and 134.

The image generating section 20R includes the right backlight 205 including a light source such as an LED and a diffusion plate and a right backlight control section 201 that drives the right backlight 205. The image generating section 20R includes a transmissive right LCD 241 disposed on an optical path of the light emitted by the right backlight 205 and a right LCD control section 203 that drives the right LCD 241.

The image light transmitted through the right LCD 241 is made incident on the optical unit 312. The right LCD 241 is a transmissive liquid crystal panel on which a plurality of pixels are arranged in a matrix shape.

Similarly, the image generating section 20L includes the left backlight 206 including a light source such as an LED and a diffusion plate and a left backlight control section 202 that controls the left backlight 206. The image generating section 20L includes a transmissive left LCD 242 disposed on an optical path of the light emitted by the left backlight 206 and a left LCD control section 204 that drives the left LCD 242. The image light transmitted through the left LCD 242 is made incident on the optical unit 312. The left LCD 242 is a transmissive liquid crystal panel on which a plurality of pixels are arranged in a matrix shape.

The display control section 170 transmits control signals to the image generating sections 20R and 20L included in the virtual image display device 1. The display control section 170 transmits control signals to the right backlight control section 201 and the left backlight control section 202 that control lighting of the right backlight 205 and the left backlight 206 included in the image generating sections 20R and 20L.

The right backlight control section 201 and the left backlight control section 202 perform control of lighting and extinction and control of light emission luminance on the respective right backlight 205 and left backlight 206 according to the control signals received from the display control section 170. The right backlight 205 and the left backlight 206 are light emitting bodies such as LEDs or electroluminescence (EL) elements and may be configured using laser light sources or lamps.

The image generating sections 20R and 20L respectively switch ON/OFF of driving of the right backlight 205, the left backlight 206, the right LCD 241, and the left LCD 242 according to the control signals received from the display control section 170. Therefore, lighting and extinction of the backlights and display of an image in the image generating sections 20 are controlled according to the control by the display control section 170.

The sound processing section 187 acquires sound signals included in the contents, amplifies the acquired sound signals, and outputs the amplified sound signals to the right earphone 33 and the left earphone 34 through the audio cable CO.

The sound processing section 187 converts sound collected by the microphone 63 into digital data. The sound processing section 187 extracts characteristics from the digital sound data and models the characteristics to thereby execute, for example, talker recognition processing and sound recognition processing. In the talker recognition processing, the sound processing section 187 detects human voice from the sound collected by the microphone 63, identifies the detected human voice for each person, and specifies a talking human for each kind of voice. In the sound recognition processing, the sound processing section 187 performs, for example, text conversion for converting the sound collected by the microphone 63 into a text.

The sections of the virtual image display device 1 are connected to the control section 140 via an interface 28. The interface 28 is configured by the cable CB, a connector for connecting the cable CB, and the like. The interface 28 may be configured by a wireless communication line instead of the cable CB. The interface 28 outputs the clock signal PCLK, the vertical synchronization signal VSync, the horizontal synchronization signal HSync, and the image data Data transmitted by the transmitting section 131 to the receiving section (Rx) 133 or 134 corresponding to the transmitting section 131. The interface 28 outputs control signals transmitted by the display control section 170 to the receiving sections 133 and 134.

The interface 28 outputs a picked-up image of the stereo camera 231 to the control section 140 and outputs driving signals for the LED 233 and the light emitting sections 240 delivered by the control section 140 respectively to the LED 233 and the light emitting sections 240. Consequently, the LED 233 and the light emitting sections 240 are lit and extinguished according to control by the control section 140.

The virtual image display device 1 includes the nine-axis sensor 238. The nine-axis sensor 238 is a motion sensor (an inertial sensor) that detects acceleration (three axes), angular velocity (three axes), and terrestrial magnetism (three axes). The nine-axis sensor 238 is connected to the control section 140 via the interface 28. When the virtual image display device 1 is worn on the head of the user US, the control section 140 can detect a movement of the head of the user US on the basis of a detection value of the nine-axis sensor 238. The nine-axis sensor 238 is fixed to the rear surface of the stereo camera 231 by bonding or the like. When the image pickup section 23 turns around the turning shaft R1, the nine-axis sensor 238 turns together with the image pickup section 23.

The receiving sections 133 and 134 function as receivers for serial transmission between the control device 300 and the virtual image display device 1.

The HMD 100 has a function of adjusting, according to a visual line direction of the user US wearing the virtual image display device 1, a display form of an image displayed on the virtual image display device 1.

Figure 10A:
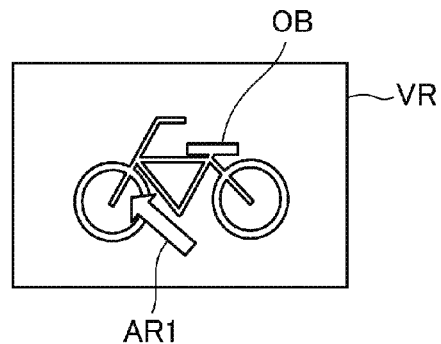
Figure 10B:
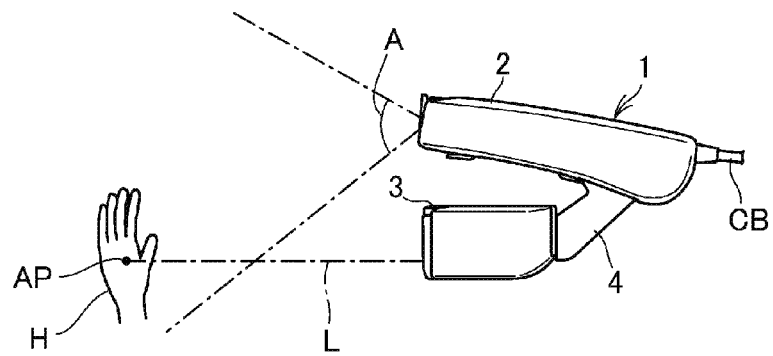
Figure 10C:
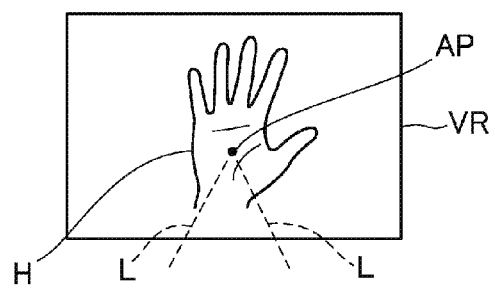
Figure 10D:
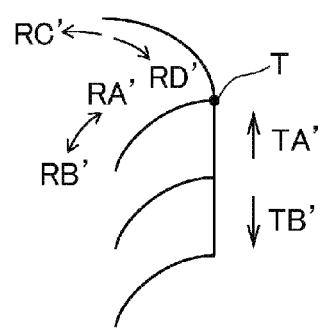

FIGS. 10A to 10D are explanatory diagrams of control related to display of the HMD 100. FIG. 10A shows an example of AR display. FIG. 10B shows a state of position detection. FIG. 10C shows an example of a picked-up image in the position detection. FIG. 10D schematically shows a track of a crossing point AP of lights L in the picked-up image.

The display section 3 included in the virtual image display device 1 is a see-through type display device with which the user US can visually recognize an outside scene and visually recognizes an image through the light guide members 313. When the user US visually recognizes the outside scene through the display section 3, the HMD 100 displays an image visually recognized over the outside scene. As a form of the display, the HMD 100 displays an image that achieves a so-called AR effect (hereinafter referred to as AR image) for providing information concerning the outside scene, which is a real space. The AR image is displayed such that information concerning a target object present in the real space is displayed over the target object or side by side with the target object. By viewing the AR image, the user US can simultaneously view the target object and various kinds of information concerning the target object. The AR image is characterized by being displayed according to a position where the target object is seen for the user US.

In FIG. 10A, an example is shown in which an image AR1 is displayed to overlap with a target object OB present in the real space, that is, the outside scene. VR in the figure indicates the visual field of the user US. In this example, the HMD 100 detects a bicycle, which is the target object OB, determines a display position of the image AR1 according to a position where the user US views the target object OB, and displays the image AR1 having an arrow shape. In order to determine the display position of the image AR1, the HMD 100 executes image pickup with the image pickup section 23 and detects an image of the target object OB from a picked-up image. The HMD 100 specifies a position of the target object OB in the picked-up image and determines the display position of the image AR1 on the basis of a correspondence relation between the position in the picked-up image and a position in a display region where the display section 3 displays an image.

That is, when performing the AR display, the HMD 100 executes image pickup with the image pickup section 23 and detects an image of the target object OB from a picked-up image. The HMD 100 specifies a position of the target object OB in the picked-up image and determines a display position of the AR image on the basis of a correspondence relation between the position in the picked-up image and a position in the display region where the display section 3 displays an image. Alternatively, the HMD 100 estimates a pose and a distance (rotation and translation) of the target object OB with respect to the image pickup section 23 on the basis of the picked-up image. The HMD 100 renders a virtual object using an estimation result and on the basis of calibration data 121 explained below such that the user US can visually recognize the virtual object in a state in which the virtual object is superimposed on or aligned with the target object OB. In this embodiment, the rendered virtual object is the AR image.

In this way, when the AR image is displayed, control related to the display position of the image is necessary. Therefore, the control section 140 includes the image-pickup control section 181, the position-detection control section 182, and the AR-display control section 183.

The image-pickup control section 181 controls the image pickup section 23 included in the virtual image display device 1 to execute image pickup and acquires picked-up image data.

The AR-display control section 183 analyzes a picked-up image acquired by a function of the image-pickup control section 181 and detects an image of the target object OB from the picked-up image. In the HMD 100, data concerning feature values such as a shape and a color is stored in the storing section 120 concerning the detected image of the target object OB. The AR-display control section 183 detects the image of the target object OB from the picked-up image using the data stored in the storing section 120 and specifies a position of the image of the target object OB in the picked-up image. Note that the data concerning the feature values used by the AR-display control section 183 may be acquired from an external apparatus via the interface 114 or the communication section 117. The external apparatus may be the external apparatus OA or may be a storage device, a computer, or the like connected by the communication section 117. The data may be acquired from a device capable of transmitting and receiving the data through a communication line connected to the communication section 117 or a storage region on a cloud.

Further, the AR-display control section 183 specifies a position of the image AR1 with respect to the display region of the display section 3, that is, regions where image lights are reflected toward the eyes of the user US in the light guide members 313R and 313L and causes the display control section 170 to display the image AR1. Image data of the image AR1 is content data acquired via the interface 125, content data stored in the storing section 120, image data generated by the AR-display control section 183 through data processing, or the like.

In the HMD 100, initial calibration is executed in order to associate the display position on the display section 3 and the position in the picked-up image of the image pickup section 23. After the user US wears the virtual image display device 1 on the head and adjusts a wearing position of the virtual image display device 1, a fastened state of the band sections 222, and the like and positions of the headband section 2 and the eyes of the user US relative to each other are fixed, the initial calibration is performed to match the positions.

There are various methods for the initial calibration. For example, in this embodiment, steps explained below are executed.

(I) Interocular Distance

The control section 140 causes the two optical devices in the display section 3 to display the same images for calibration. Then, the user US wearing the display section 3 visually recognizes the images for calibration via the left and right eyes. Therefore, the user US gives an instruction to the control section 140 via a user interface (a track pad, etc.) to relatively move at least one of the displayed two images for calibration with respect to the other such that the user US can visually recognize the two images for calibration as coinciding with each other. At timing when the user US visually recognizes the two images for calibration as coinciding with each other, the user US notifies the control section 140 to that effect via the user interface. The control section 140 causes, according to the notification, the image processing section 160 to adjust display positions of images on the optical devices on the basis of the positions of the two images for calibration with respect to the optical devices at the timing. Consequently, calibration of the display section 3 corresponding to the interocular distance can be performed.

(II) Positioning of an AR Object and a Real Object

After the calibration concerning the interocular distance is performed by (I) explained above, the control section 140 fixes and displays an image for calibration (e.g., a virtual 2D marker) in the center of the display section 3. The control section 140 picks up an image of a reference real object corresponding to the image for calibration (e.g., a 2D marker similar to the virtual 2D marker and having known size) via the image pickup section 23 and detects rotation or translation of the reference real object with respect to the image pickup section 23 on the basis of a feature point of the reference real object. The user US moves the head, aligns the image for calibration with the reference real object (matches the position, the size, and the direction of the image for calibration with those of the reference real object), and notifies the control section 140 to that effect at timing when the image for calibration is aligned with the reference real object. At this point, the rotation or the translation between the display section 3 and the reference real object is in a default relation. The control section 140 acquires position information in a picked-up image of the reference real object at the timing of the notification and customizes, for the user US, parameters (calibration data 121) for displaying the AR object and the real object one on top of the other. The calibration data 121 includes parameters representing rotation and translation of the image pickup section 23 with respect to the display section 3.

As a result, in the HMD 100, association of the visual field VR of the user US and the display region of the display section 3 and association of the display region of the display section 3 and the picked-up image of the image pickup section are performed. Therefore, thereafter, the AR-display control section 183 performs the AR display using the picked-up image of the image pickup section 23. That is, by adjusting the display position using the calibration data 121, for example, as shown in FIG. 10A, the position-detection control section 182 can cause the user US to visually recognize the image AR1 according to the position of the target object OB.

Incidentally, as explained above, the image pickup section 23 is provided in the headband section 2 to be capable of turning about the turning shaft R1. The display section 3 is attached to the headband section 2 via the turning shaft R2 and the moving mechanism 5. Therefore, the image pickup section 23 and the display section 3 are coupled and supported by the turning shaft section 236, the turning shaft section 25, and the moving mechanism 5, which are three movable sections, such that the positions of the image pickup section 23 and the display section 3 relative to each other change. The turning shaft section 236, the turning shaft section 25, and the moving mechanism 5 are equivalent to the coupling section according to the invention. These coupling sections function as supporting sections that support one of the image pickup section 23 and the display section 3 on the other.

When displacement in the turning shaft section 236, the turning shaft section 25, and the moving mechanism 5, which are the three movable sections, occurs, positions of the image pickup section 23 and the display section 3 relative to each other change. This type of movement occurs, for example, when the user US moves the display section 3 around the turning shaft R2 in order to readjust the view of the display section 3. When the user US moves the display section 3 in the RA direction in order to retract the display section 3 from the visual field (the visual field VR) and thereafter returns the display section 3 in the RB direction, the display section 3 is not always returned to a position completely the same as the position before the retraction. Further, it is also likely that the user US moves the image pickup section 23 for adjustment of the image pickup range of the image pickup section 23.

When the positions of the image pickup section 23 and the display section 3 relative to each other change according to the movements in the movable sections, the image pickup section 23 and the display section 3 deviate from the positional relationship associated by the initial calibration. Therefore, when the AR display is performed, it is likely that an image for AR (e.g., the image AR1) cannot be displayed in an appropriate display position. In such a case, the display position of the image can be set in the appropriate position by executing the initial calibration again. However, it is a burden for the user US to suspend work, viewing of a video, or the like performed by using the HMD 100 and perform operation.

Therefore, the HMD 100 detects a change in the positional relationship between the image pickup section 23 and the display section 3 using the light emitting sections 240 and corrects the calibration data 121 to thereby properly maintain the display position of the image on the display section 3. Consequently, it is possible to set the display position of the image of the HMD 100 in an appropriate position with a method simpler in operation than the initial calibration and executable in a shorter time. Therefore, it is possible reduce the burden on the user US.

Figure 11:
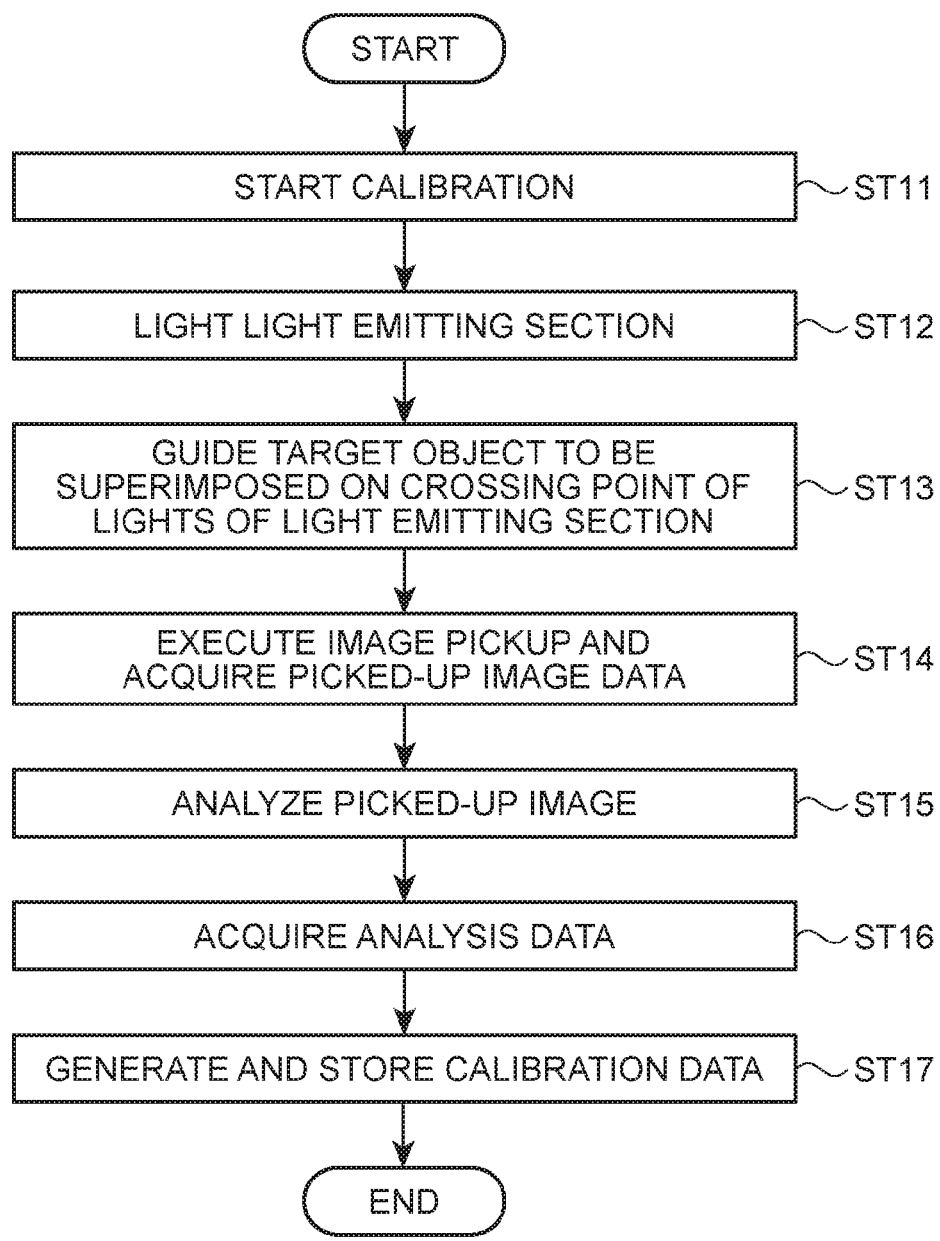
FIG. 11 is a flowchart for explaining the operation of the HMD according to the first embodiment.

FIG. 11 is a flowchart for explaining the operation of the HMD 100. FIG. 11 shows an operation related to calibration performed using the light emitting sections 240.

The control section 140 starts calibration according to operation on the track pad 302 and the like (step ST11) and lights the light emitting sections 240 (step ST12). Further, the control section 140 causes the display control section 170 to display an image for guidance and guides a target object to be superimposed on a crossing point of lights of the light emitting sections 240 (step ST13). When determining according to operation by the user US on the control device 300 or a picked-up image of the image pickup section 23 that the target object overlaps with a crossing position of the lights of the light emitting sections 240, the control section 140 acquires picked-up image data picked up by the image pickup section 23 (step ST14).

As explained above, on the display section 3, the pair of light emitting sections 240 is disposed at both the end portions of the display section 3. Lights emitted by the respective light emitting sections 240 cross in a predetermined position in the front of the display section 3, that is, in a gazing direction of the user US. The crossing position is desirably within an image pickup range of the image pickup section 23 in an entire turning range around the turning shaft R1 of the image pickup section 23. The crossing position is more desirably within the image pickup range of the image pickup section 23 in an entire range in which the display section 3 is slid by the moving mechanisms 5. The crossing position is still more desirably within the image pickup range of the image pickup section 23 wherever in the turning range around the turning shafts R2 of the display section 3.

FIG. 10B is a side view showing a state in which the light emitting sections 240 emit lights and a hand H of the user US serving as the target object OB is placed in the crossing position. FIG. 10C shows the visual field VR of the user US in the state. The lights L emitted by the light emitting sections 240 are radiated toward the front direction of the display section 3. The target object OB may be any object as long as the object reflects the lights L. The target object OB may be an immovable object such as a wall or a building. As shown in FIG. 10B, the crossing point AP of the lights L is included in the image pickup range A of the image pickup section 23.

As shown in FIG. 10C, the lights L reflected on the hand H are visually recognized by the user US. Note that, actually, optical paths of the lights L indicated by broken lines in the figure do not have to be visually recognized.

When the hand H, which is the target object OB, does not overlap with the crossing point AP, two points appear on the hand H. The user US only has to adjust the position of the hand H such that the lights L reflected on the target object OB gather at one point. When the target object OB cannot be moved, the user US himself or herself only has to move.

When image pickup is executed in the state shown in FIG. 10C, an image of the crossing point AP appears in a picked-up image.

The control section 140 analyzes the picked-up image (step ST15) and acquires analysis data (step ST16).

The control section 140 detects the distance between the hand H and an image pickup surface of the image pickup section 23 on the basis of the size of the hand H in the picked-up image. The control section 140 detects the position of the image of the crossing point AP in the picked-up image.

As a method of detecting the distance, besides a method of detecting the distance using the size of the image of the hand H in the picked-up image, a TOF (Time Of Flight) method for detecting the distance using lights emitted by the light emitting sections 240 or another light source (not shown in the figure) may be adopted. In this case, it is possible to detect, with the image pickup section 23 or another light detecting section (not shown in the figure), reflected lights of the lights emitted by the light emitting sections 240 or the other light source and detect the distance on the basis of a phase difference. If the image pickup section 23 is configured by a stereo camera, it is possible to detect the distance from the image pickup section 23 to the hand H using a picked-up image having a parallax picked up by the stereo camera.

In FIG. 10D, a relation between displacement in the turning shafts R1 and R2 and the moving mechanisms 5, which are the movable sections, and a track of the crossing point AP in the picked-up image is schematically shown.

When the display section 3 is moved up and down with respect to the moving mechanisms 5, the crossing point AP in the picked-up image moves in directions indicated by arrows TA' and TB'. More specifically, when the display section 3 is lifted in the TA direction, the image of the crossing point AP projected on the picked-up image rises in the TA' direction. When the display section 3 is lowered in the TB direction, the image of the crossing point AP projected on the picked-up image falls in the TB' direction.

When the display section 3 is turned with respect to the turning shaft R2, the crossing point AP in the picked-up image moves in directions indicated by arrows RA' and RB'. Presence of a plurality of tracks in the RA' and RB' directions in FIG. 10D indicates that a track changes according to a height position in the moving mechanism 5.

When the display section 3 rises in the RA direction, the image of the crossing point AP projected on the picked-up image rises in the RA' direction. At this point, the distance between the light emitting sections 240 and the target object OB (the hand H) increases according to the turning of the display section 3. The user US moves the hand H to align the position of the target object OB (the hand H) with the crossing point AP. Therefore, the distance between the image pickup section 23 and the crossing point AP reflected on the hand H increases. Therefore, the track of the crossing point AP draws a curve. When the display section 3 is lowered in the RB direction, the image of the crossing point AP projected on the picked-up image falls in the RB' direction. The movement of the crossing point AP in this case also draws a curve.

When the image pickup section 23 is turned with respect to the turning shaft R1, the crossing point AP in the picked-up image moves in directions indicated by arrows RC' and RD'. When the image pickup section 23 moves in the RC direction, the image pickup section 23 is displaced downward. Therefore, the image of the crossing point AP projected on the picked-up image rises in the RC' direction. At this point, the distance between the image pickup surface of the image pickup section 23 and the target object OB (the hand H) increases according to the turning of the image pickup section 23. When viewed from the image pickup section 23, in a far-near direction, the crossing point AP in the picked-up image moves away from the image pickup section 23. Therefore, the track of the crossing point AP draws a curve. When the image pickup section 23 is moved upward in the RD direction, the image of the crossing point AP projected on the picked-up image falls in the RD' direction. The movement of the crossing point AP in this case also draws a curve.

Therefore, the control section 140 can calculate the size and the direction of movements in the movable sections on the basis of the distance from the image pickup section 23 to the target object OB (the hand H) and the position of the image of the crossing point AP in the picked-up image. The control section 140 acquires data of a result of this analysis in step ST16. The analysis data is data corresponding to the pose and the position (rotations and translations) of the image pickup section 23 with respect to the crossing point AP. The pose and the position of the display section 3 with respect to the crossing point AP are known. Therefore, it is possible to correct the pose and the position of the image pickup section 23 with respect to (the display region of) the display section 3 on the basis of the analysis data.

The control section 140 generates calibration data on the basis of the analysis data, stores the calibration data in the storing section 120, and ends the processing. The control section 140 may generate data same as the calibration data 121 generated in the initial calibration and stored in the storing section 120 and update the calibration data 121 of the storing section 120. The control section 140 may generate data for correction for correcting the calibration data 121 stored in the storing section 120 and store the data for correction in the storing section 120. The control section 140 may add the data for correction to the calibration data 121 and update the calibration data 121. In the updated calibration data 121, parameters representing rotation and translation of the image pickup section 23 with respect to (the display region of) the display section 3 are corrected.

According to the operation shown in FIG. 11, the picked-up image of the image pickup section 23 and the position of the display region of the display section 3 are associated. Therefore, it is possible to set, in an appropriate position, the display position where the virtual image display device 1 displays the image. For example, the operation shown in FIG. 11 can be performed after the initial calibration, for example, during a start of use of the virtual image display device 1. In this case, the picked-up image of the image pickup section 23 and the position of the display region of the display section 3 are associated in the initial calibration. Further, states of the movable sections of the virtual image display device 1 are analyzed. The calibration data 121 including these data is stored. Therefore, it is possible to accurately control the display position of the image AR1. Further, it is possible to cope with movements in the movable sections thereafter.

Execution timing of the operation shown in FIG. 11 is optional. However, for example, by executing the operation as explained below, it is possible to appropriately keep a display position in the HMD 100.

1. The turning shaft section 236, the turning shaft section 25, and the moving mechanism 5, which are the three movable sections, in the HMD 100 are set in known states (positions). The light emitting sections 240 are lit to execute image pickup with the image pickup section 23. The positions of the movable sections at this point can be considered, for example, reference positions.

2. An image of reflected light in a picked-up image of the image pickup section 23 is detected. Data corresponding to the detected position is stored. The procedure of 1 and 2 can be executed in a factory or the like before shipment of the HMD 100.

3. When the user US uses the HMD 100, the user US performs the initial calibration and generates the calibration data 121 with the HMD 100.

4. The user US uses the HMD 100 and causes the HMD 100 to execute the AR display for a target object. The HMD 100 recognizes the target object on the basis of the picked-up image of the image pickup section 23 and displays an image for AR.

5. A display position of an image of the virtual image display device 1 shifts because of some reason (e.g., a wearing position of the virtual image display device 1 shifts or the movable sections move).

6. The user US operates the control device 300 and executes the calibration shown in FIG. 11.

7. In the operation shown in FIG. 11, the control section 140 detects the image of the reflected light in the picked-up image of the image pickup section 23 and compares the position of the detected image with the position detected in 1 and 2 above to thereby calculate differences in states of the movable sections of the HMD 100. Consequently, the control section 140 can calculate changes in the positions of the movable sections with respect to the reference positions.

8. The control section 140 corrects the calibration data 121 on the basis of the changes in the positions of the movable sections with respect to the reference positions.

9. The control section 140 corrects the calibration data 121 and determines a display position of the image. Consequently, the shift of the display position of the image in the virtual image display device 1 is corrected.

Figure 12:
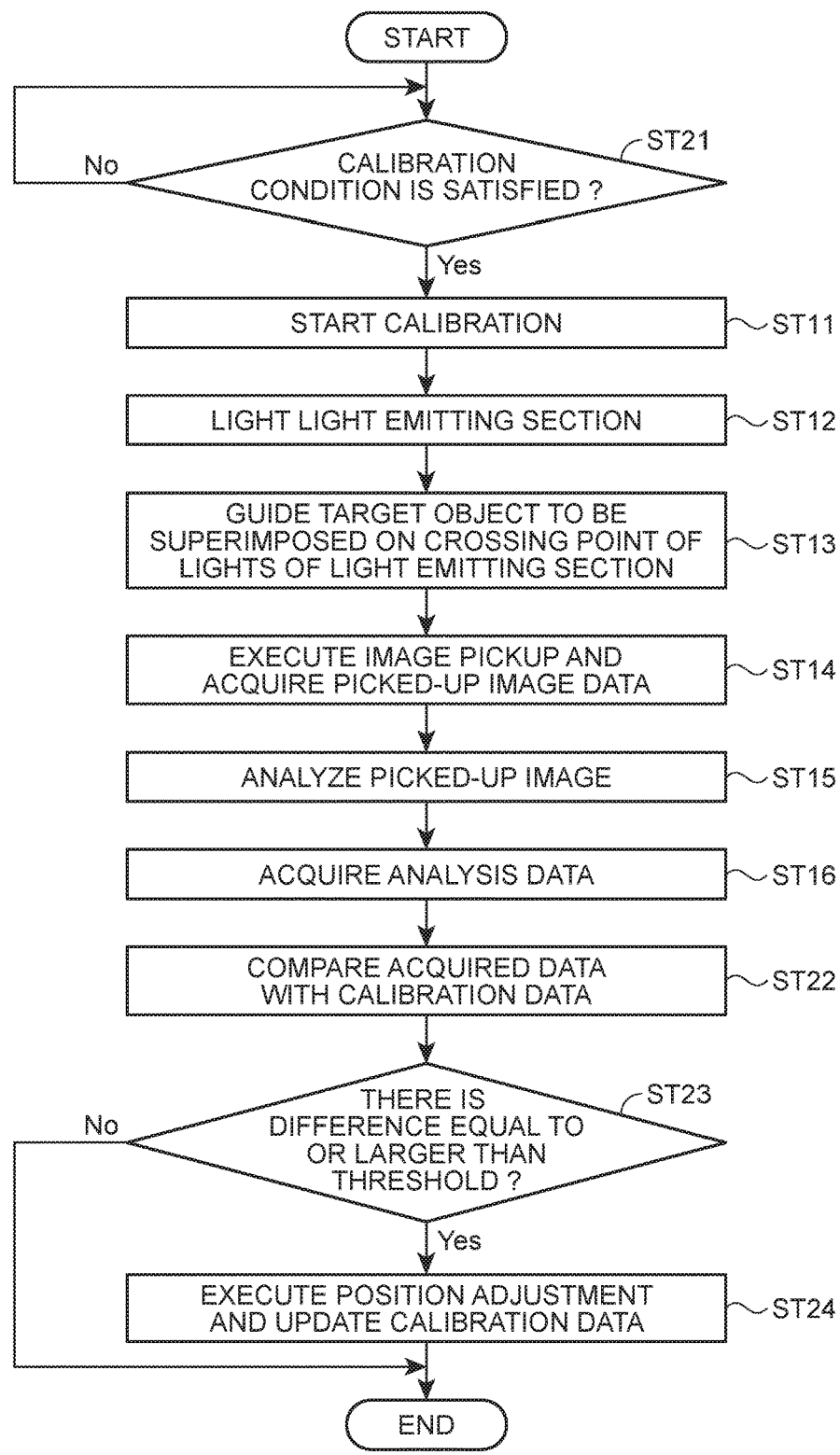
FIG. 12 is a flowchart for explaining the operation of the HMD according to the first embodiment.

FIG. 12 shows an operation for performing calibration during use of the virtual image display device 1, for example, during execution of display.

The control section 140 of the HMD 100 stays on standby for display or the like until an execution condition for the calibration is satisfied (step ST21). If the execution condition is satisfied (Yes in step ST21), the control section 140 executes the operation explained in steps ST11 to ST16.

Examples of the execution condition for the calibration include operation on the track pad 302. However, the execution condition may be detection of a movement of the headband section 2 exceeding a threshold by the nine-axis sensor 238. Specifically, detection of attachment and detachment of the headband section 2, a shock on the headband section 2, and the like by the nine-axis sensor 238 may be the execution condition.

After acquiring the analysis data in step ST6, the control section 140 compares the acquired data with the calibration data 121 already stored in the storing section 120 (step ST22). The control section 140 determines a result of the comparison (step ST23). If there is a difference equal to or larger than a threshold (Yes in step ST23), the control section 140 updates the calibration data 121. If there is an image currently displayed, the control section 140 adjusts a display position of the image (step ST24). If a positional relation between the image pickup section 23 and the display section 3 indicated by the data acquired in step ST16 does not have a difference equal to or larger than the threshold from the positional relation in the calibration data 121 already stored (No in step ST23), the control section 140 ends the processing.

Note that, after ending the processing, the control section 140 only has to monitor the satisfaction of the execution condition in step ST21 again.

As explained above, the HMD 100 applied with the invention includes the display section 3 that displays an image while enabling visual recognition of an outside scene. The HMD 100 includes the image pickup section 23 that picks up an image in the image pickup range that overlaps with at least the range visually recognized through the display section 3. The HMD 100 includes the coupling section that includes at least one movable section and couples the image pickup section 23 to the display section 3 and the plurality of light emitting sections 240 fixedly provided in the display section 3. Lights emitted by the plurality of light emitting sections 240 cross in the image pickup range of the image pickup section 23. Therefore, it is possible to detect a movement of the image pickup section 23 with respect to the display section 3 using a picked-up image of the image pickup section 23 and on the basis of a position where the lights emitted by the light emitting sections 240 cross.

The control section 140 detects, from the picked-up image of the image pickup section 23, reflected lights of the lights emitted by the light emitting sections 240 and reflected on a target object and calculates positions of the reflected lights in the picked-up image. Therefore, the control section 140 can easily detect, in the picked-up image, the position where the lights emitted by the light emitting sections 240 cross.

The control section 140 can calculate changes in positions of the image pickup section 23 and the display section 3 relative to each other or the relative positions on the basis of the positions of the reflected lights in the picked-up image and control, for example, a display position of an image according to displacement of the image pickup section 23.

The control section 140 can more highly accurately detect the changes in the positional relationship between the image pickup section 23 and the display section 3 or the positional relationship on the basis of the positions of the reflected lights in the picked-up image and the distance between the image pickup section 23 and the target object.

The control section 140 can calculate the distance between the image pickup section 23 and the target object on the basis of an image of the target object in the picked-up image.

The control section 140 causes the light emitting sections 240 to emit lights, causes the image pickup section 23 to pick up an image of the lights emitted by the light emitting sections 240 and reflected on the target object and detects reflected lights from the picked-up image. The control section 140 calculates positions of the reflected lights in the picked-up image and generates, on the basis of the positions of the reflected lights in the picked-up image, the calibration data 121 serving as adjustment data related to adjustment of the display position of the image on the display section 3. Therefore, in a configuration in which the image pickup section 23 is movably supported on the display section 3, it is possible to adjust the display position on the display section 3 according to a movement of the image pickup section 23.

The virtual image display device 1 includes, as the coupling section that couples the image pickup section 23 to the display section 3, the turning shafts R1 and R2 and the moving mechanisms 5, which are the plurality of movable sections. Therefore, in a configuration in which the image pickup section 23 is supported on the display section 3 by the plurality of movable sections, it is possible to easily detect, with a simple configuration, a movement of the image pickup section 23.

As explained above, in the HMD 100, the control section 140 causes the light emitting sections 240 to emit lights, causes the image pickup section 23 to pick up an image including reflected lights of the lights emitted by the light emitting sections 240 and reflected on the target object, detects the reflected lights from the picked-up image, and calculates positions of the reflected lights in the picked-up image. Further, the control section 140 calculates changes in the positional relationship between the image pickup section 23 and the display section 3 or the positional relationship on the basis of the positions of the reflected lights in the picked-up image. Therefore, it is possible to detect a movement of the image pickup section 23 with respect to the display section 3 using the picked-up image of the image pickup section 23 and on the basis of positions where the lights emitted by the light emitting sections 240 cross.

Second Embodiment

Figure 13:
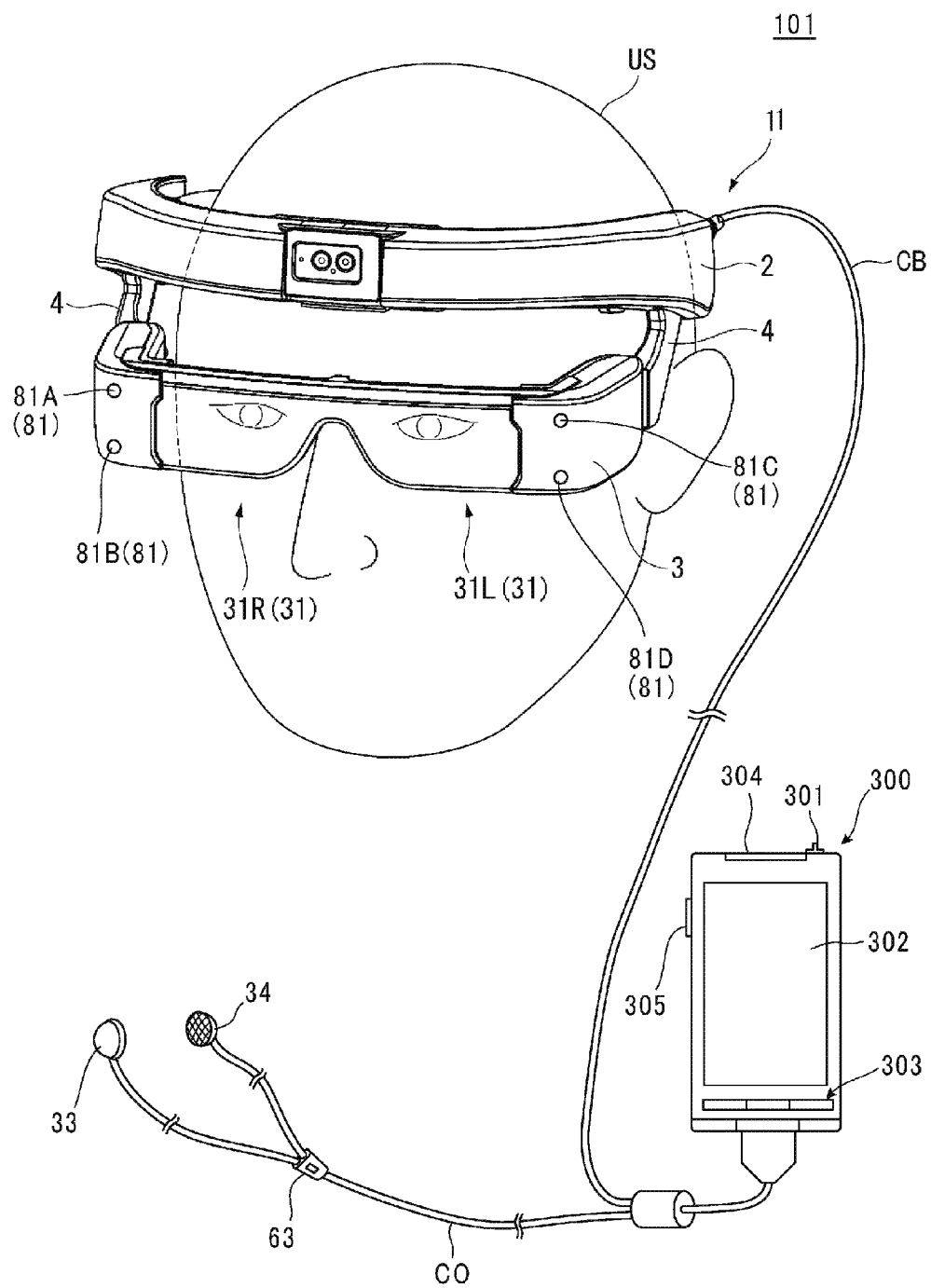
FIG. 13 is a perspective view showing an HMD according to a second embodiment.
Figure 14:
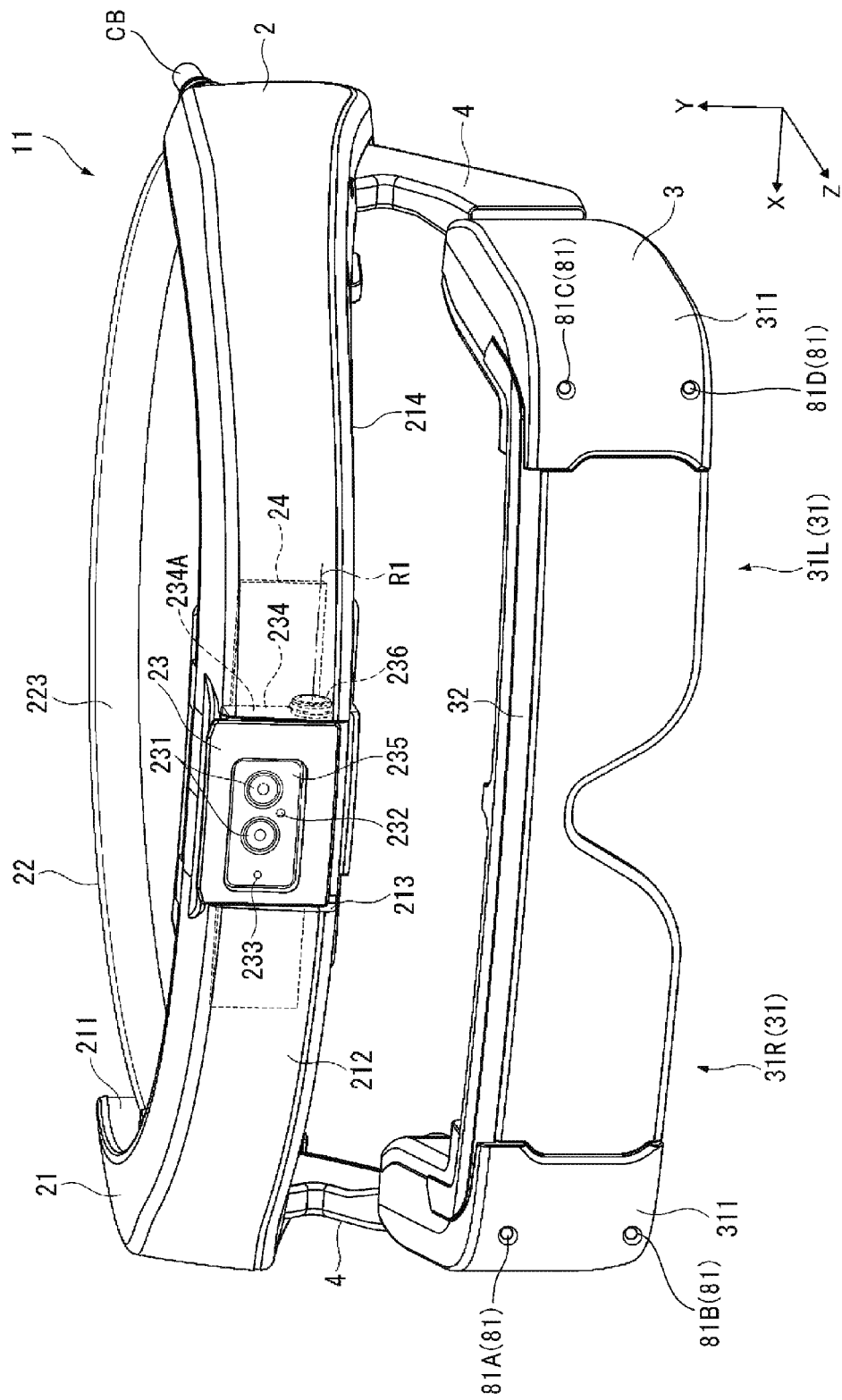
FIG. 14 is a perspective view showing a virtual image display device in the second embodiment.

FIG. 13 is a perspective view showing the configuration of an HMD 101 (a display device) according to a second embodiment applied with the invention. FIG. 13 shows a state in which a virtual image display device 11 is worn by a user. FIG. 14 is a perspective view of the virtual image display device 11 viewed from the front side and the rear side. FIG. 14 is considered a perspective view of the virtual image display device 11 viewed from the opposite side of the user side. FIG. 13 corresponds to FIG. 1 explained in the first embodiment. FIG. 14 corresponds to FIG. 2.

Figure 15:
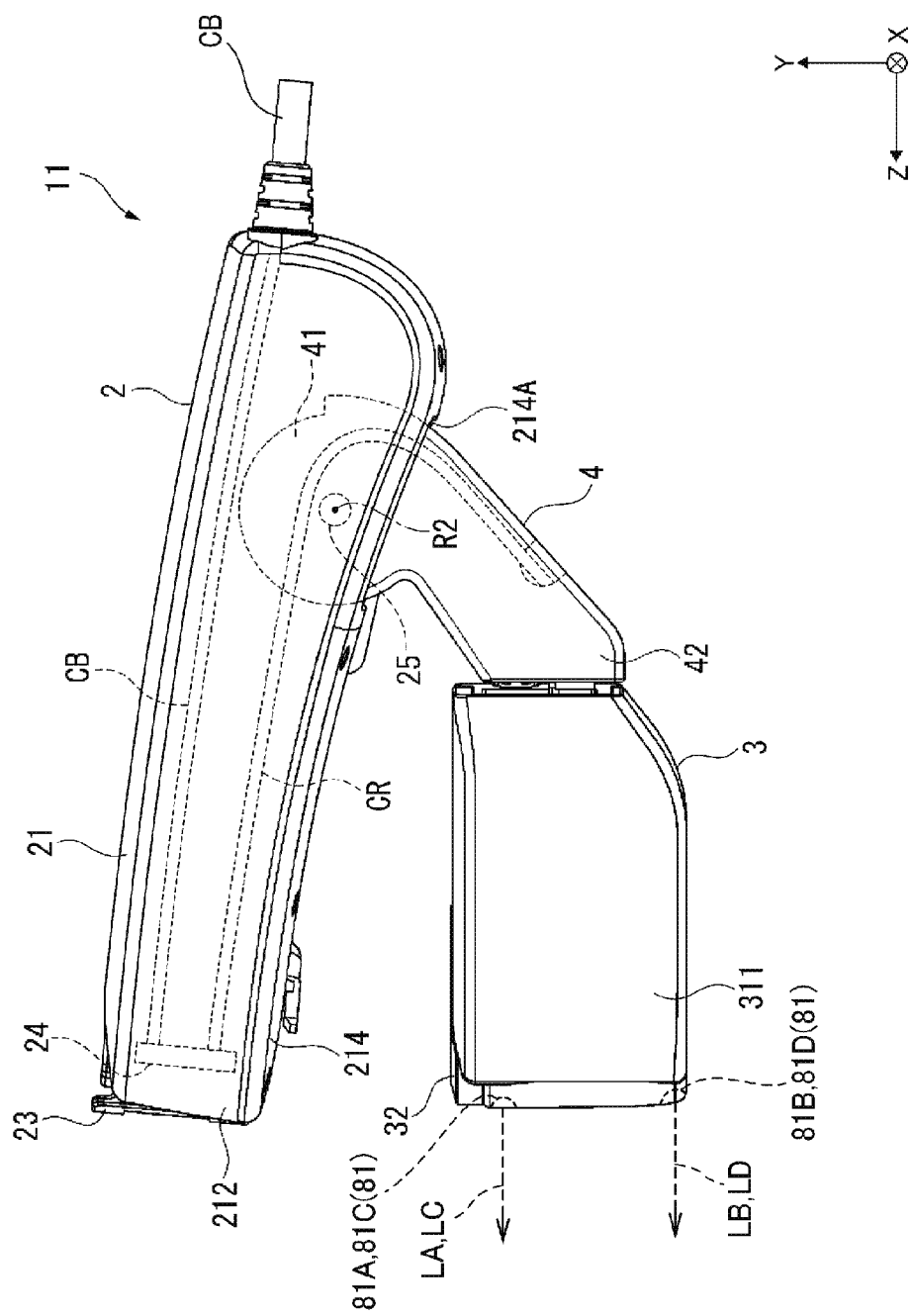
FIG. 15 is a side view showing the virtual image display device in the second embodiment.
Figure 16:
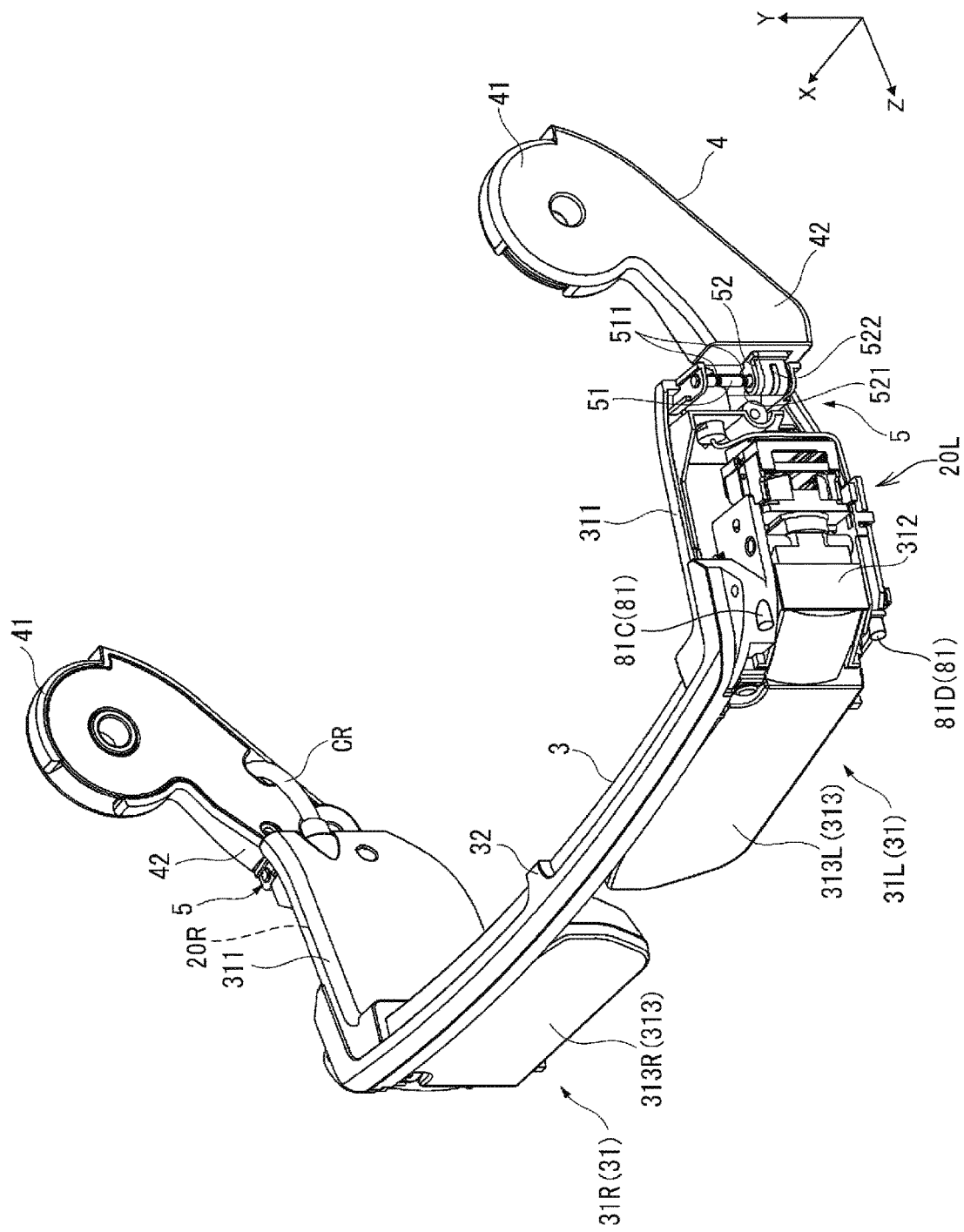
FIG. 16 is a perspective view showing arm sections and a display section in the second embodiment.

FIG. 15 is a side view of the virtual image display device 11 viewed from a direction equivalent to the X direction in FIG. 3. FIG. 16 is a diagram showing the inside of the optical device 31 excluding a part of the cover member 311. FIG. 15 corresponds to FIG. 5 explained in the first embodiment. FIG. 16 corresponds to FIG. 6.

Like the HMD 100 explained in the first embodiment, the HMD 101 functions as a display device. The HMD 101 includes the virtual image display device 11 that causes the user US to visually recognize a virtual image in a state in which the virtual image display device 11 is worn on the head of the user US. The virtual image display device 11 corresponds to the virtual image display device 1 explained in the first embodiment. That is, the HMD 101 can be considered to have a configuration in which the virtual image display device 1 is replaced with the virtual image display device 11 in the HMD 100. Like the HMD 100, the HMD 101 includes the control device 300.

In the second embodiment, components common to the first embodiment are denoted by the same reference numerals and signs. Explanation of the components is omitted.

The virtual image visually recognized by the user US with the HMD 101 is referred to as "display image" for convenience. The same applies to HMDs 101A, 101B, and 101C explained below. The virtual image display device 11 emitting image light generated on the basis of image data is referred to as "display an image" as well. The same applied to virtual image display devices 11A, 11B, and 11C explained below.

The virtual image display device 11 is connected to the control device 300 by the cable CB. The cable CB incorporates a power supply cable (not shown in the figure) for supplying electric power from the control device 300 to the virtual image display device 11 and a data communication cable (not shown in the figure) through which the virtual image display device 11 and the control device 300 transmit and receive various data. The virtual image display device 11 is the same as the virtual image display device 1 in this point as well.

Like the virtual image display device 1, the virtual image display device 11 is a see-through type display device that displays a virtual image to be visually recognizable by an observer and transmits external light to enable observation of an outside world (an outside scene). The virtual image display device 11 includes, as shown in FIG. 13 and the like, the headband section 2 functioning as a main body section worn on the head of the user US or a helmet or the like worn on the head, the display section 3 that displays a virtual image, the pair of arm sections 4 turnably attached to the headband section 2 to connect the headband section 2 and the display section 3, and the moving mechanisms 5 for moving the display section 3 with respect to the arm sections 4.

The virtual image display device 11 is different from the virtual image display device 1 in that the virtual image display device 11 includes light emitting sections 81 instead of the light emitting sections 240. The virtual image display device 11 has a configuration in which lights are emitted from both the side end portions of the display section 3.

As shown in FIGS. 13, 14, 15, and 16, the virtual image display device 11 includes four light emitting sections 81 at the left and right both end portions of the display section 3. The light emitting sections 81 include solid-state light sources such as LEDs or laser diodes or lamps and radiate lights forward. The light emitting sections 81 in this embodiment include the LEDs as light sources. More specifically, the light emitting sections 81 are configured by LEDs 81A and 81B embedded and set in the cover member 311 at the end portion on the right side of the display section 3 and LEDs 81C and 81D embedded and set in the cover member 311 at the end portion on the left side of the display section 3. Lights LA, LB, LC, and LD (see FIG. 15) emitted by the four LEDs 81A, 81B, 81C, and 81D are radiated toward a substantial visual line direction of the user US. The lights LA, LB, LC, and LD are lights in a wavelength band, images of which can be picked up by the stereo camera 231 and may be lights in a visible region or may be lights outside the visible region such as infrared lights. The lights emitted by the LEDs 81A, 81B, 81C, and 81D are desirably lights having high rectilinearity. For example, optical components such as lenses that limit a radiating direction of the lights may be provided in the LEDs 81A, 81B, 81C, and 81D.

The LED 81A is disposed in an upper part of the right end portion of the display section 3. The LED 81B is disposed in a lower part of the right end portion. The LED 81C is disposed in an upper part of the left end portion of the display section 3. The LED 81D is disposed in a lower part of the left end portion. The lights LA, LB, LC, and LD emitted by the four LEDs 81A, 81B, 81C, and 81D travel substantially straight. The lights LA, LB, LC, and LD are radiated toward the visual line direction of the user US while slightly tilting to face the width direction center of the display section 3.

Figure 17:
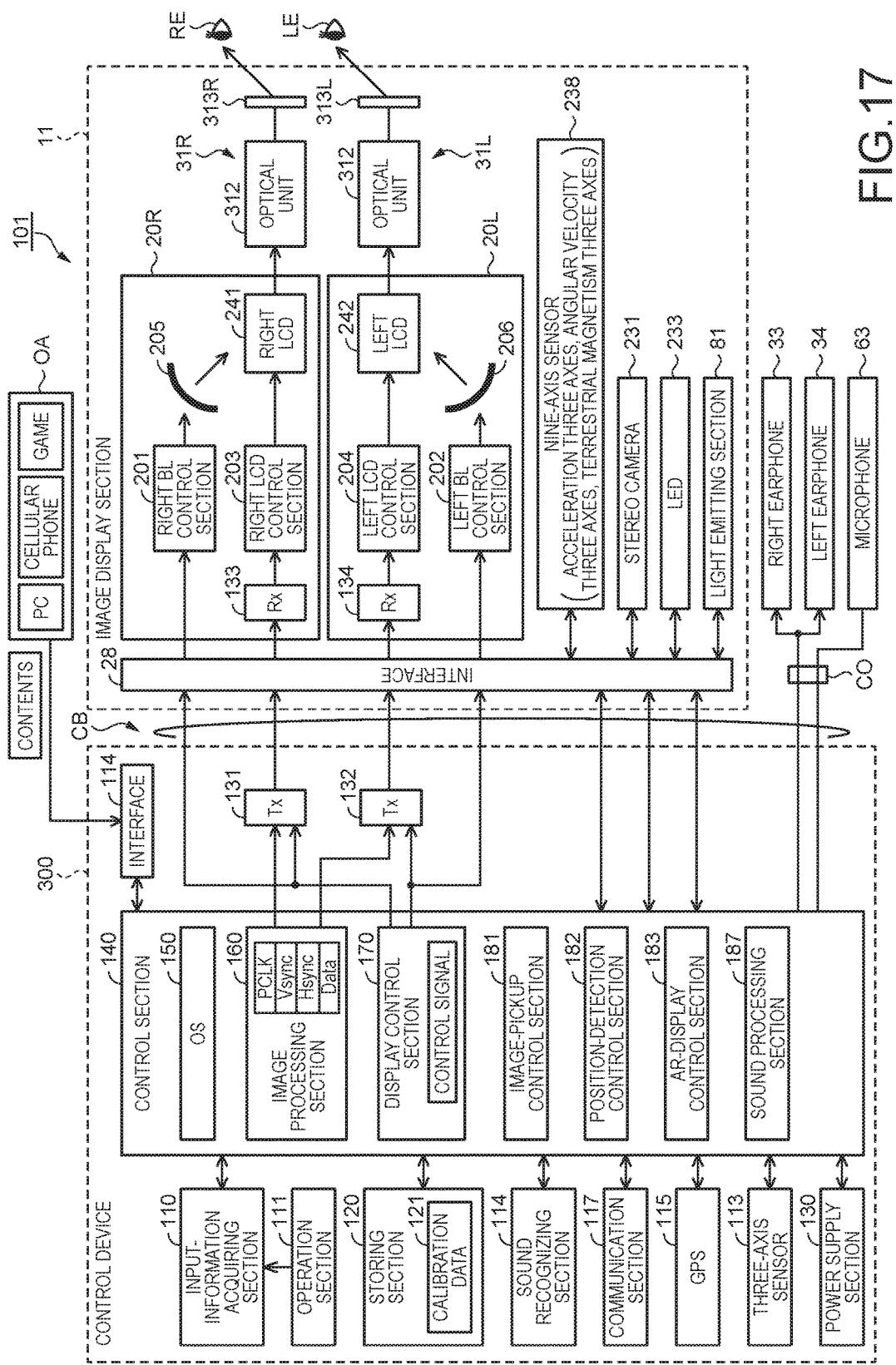
FIG. 17 is a functional block diagram of the HMD according to the second embodiment.

FIG. 17 is a functional block diagram of the HMD according to the second embodiment.

As shown in FIG. 17, the virtual image display device 11 includes the light emitting sections 81 instead of the light emitting sections 240 (FIG. 9). The light emitting sections 81 are connected to the interface 28. The interface 28 outputs a picked-up image of the stereo camera 231 to the control section 140. The interface 28 outputs, respectively to the LED 233 and the light emitting sections 240, driving signals for the LED 233 and the light emitting sections 81 delivered by the control section 140. Consequently, the LED 233 and the light emitting sections 81 are lit and extinguished according to control by the control section 140.

More specifically, the interface 28 connects the LEDs 81A, 81B, 81C, and 81D (FIG. 2) configuring the light emitting sections 81 to the control section 140. When the control section 140 outputs driving signals for the light emitting sections 81, the driving signals are respectively input to the LEDs 81A, 81B, 81C, and 81D via the interface 28. The LEDs 81A, 81B, 81C, and 81D are lit and extinguished according to the control by the control section 140.

Note that the virtual image display device 11 is not limited to the configuration in which the LED 233 and the LEDs 81A, 81B, 81C, and 81D are connected to the interface 28. For example, the virtual image display device 11 may include a driver circuit (not shown in the figure) that outputs driving currents, driving pulses, and the like respectively to the LED 233 and the LEDs 81A, 81B, 81C, and 81D according to the control by the control section 140.

The light emitting sections 81 in this embodiment only have to be capable of simultaneously lighting and extinguishing the four LEDs 81A, 81B, 81C, and 81D. A configuration capable of individually lighting and extinguishing the respective LEDs 81A, 81B, 81C, and 81D is not essential.

Figure 18A:
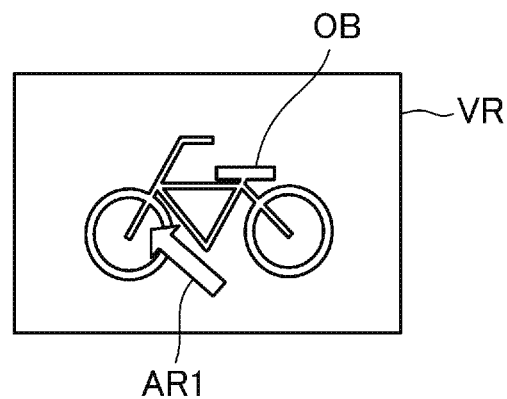
Figure 18B:
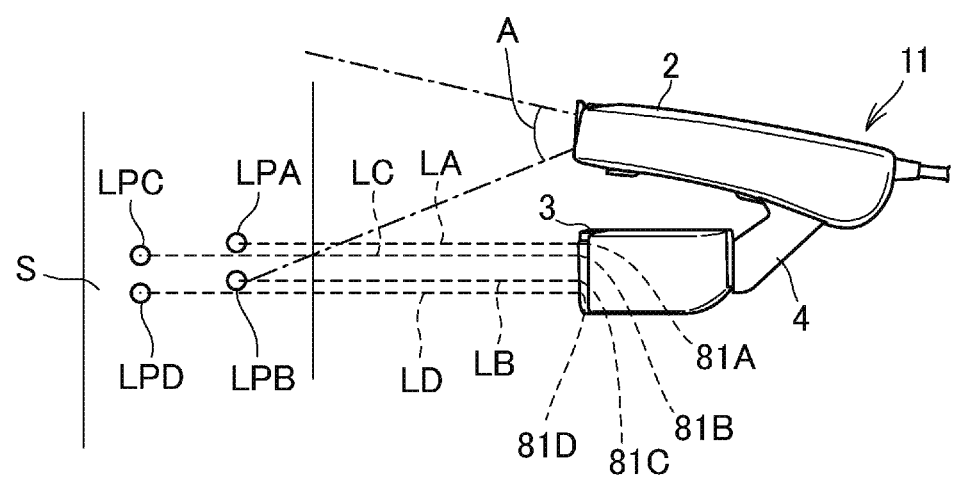

FIGS. 18A and 18B are explanatory diagrams of control of the HMD according to the second embodiment. FIG. 18A shows an example of AR display. FIG. 18B shows a state of position detection. FIG. 18A is the same as FIG. 10A. When the user US visually recognizes an outside scene through the display section 3, like the HMD 100, the HMD 101 displays an image visually recognized over the outside scene. As a form of the display, the HMD 101 displays an AR image for providing information concerning the outside scene, which is a real space.

When performing the AR display, the HMD 101 executes image pickup with the image pickup section 23 and detects an image of a target object from a picked-up image. The HMD 101 specifies a position of the target object in the picked-up image and determines a display position of the AR image on the basis of a correspondence relation between the position in the picked-up image and a position in a display region where the display section 3 displays an image. The HMD 101 estimates a pose and a distance (rotations and translations) of the target object with respect to the image pickup section 23 on the basis of the picked-up image. The HMD 101 renders a virtual object on the basis of the calibration data 121 explained below such that the user US visually recognizes the virtual object in a state in which the virtual object is superimposed on or aligned with the target object. The rendered virtual object is the AR image.

The operations of the image-pickup control section 181, the position-detection control section 182, and the AR-display control section 183 related to the display of the AR image are the same as the operations in the first embodiment.

The virtual image display device 11 according to the second embodiment detects changes in relative positions or the positional relationship between the image pickup section 23 and the display section 3 using the light emitting sections 81 and corrects the calibration data 121 to thereby properly maintain the display position of the image on the display section 3.

Figure 19:
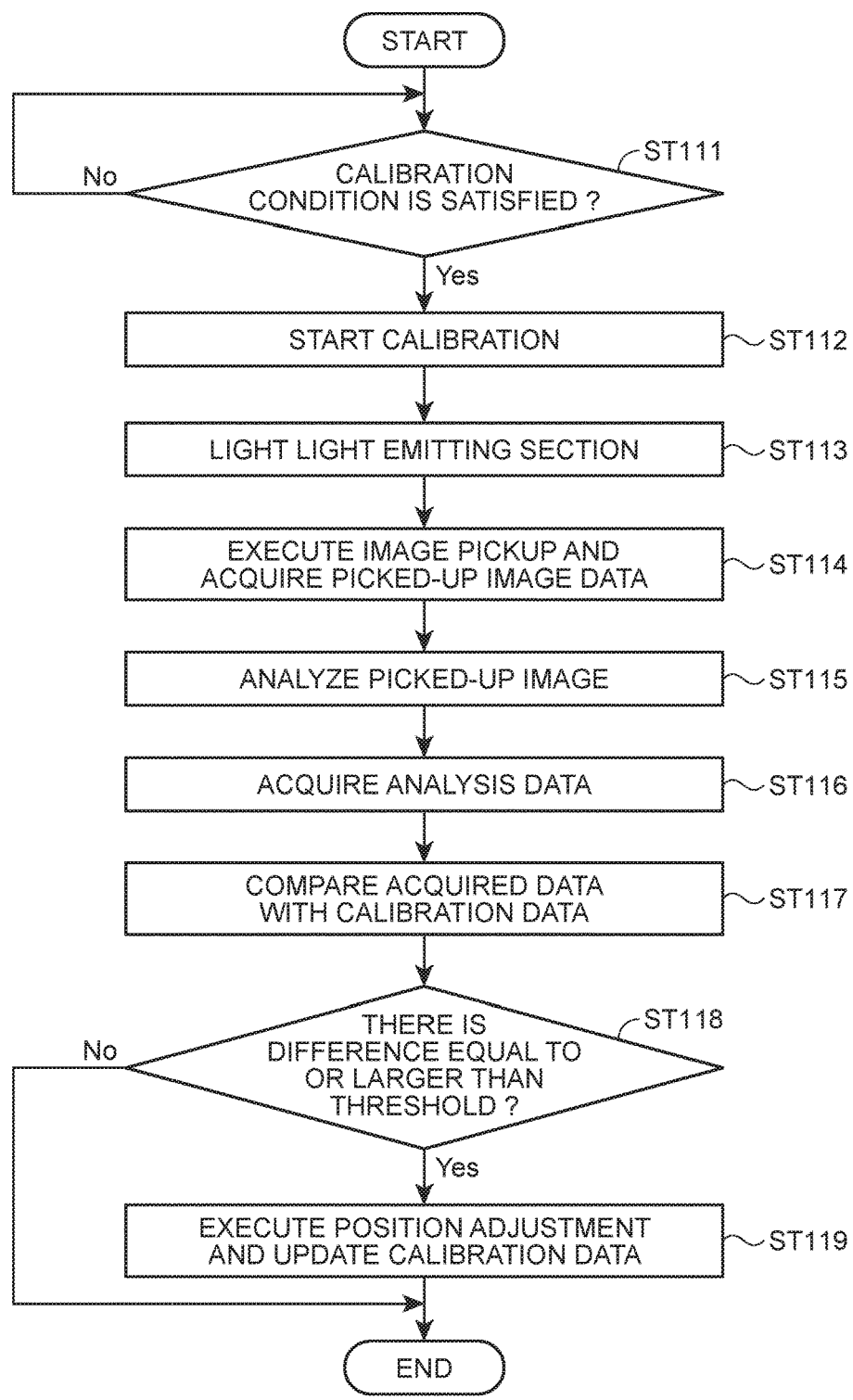
FIG. 19 is a flowchart for explaining the operation of the HMD according to the second embodiment.

FIG. 19 is a flowchart for explaining the operation of the HMD 101. FIG. 19 shows an operation related to calibration performed using the light emitting sections 81.

The control section 140 stands by for satisfaction of an execution condition for the calibration (step ST111). Examples of the execution condition for the calibration include operation on the track pad 302. However, the execution condition may be detection of a movement of the headband section 2 exceeding a threshold by the nine-axis sensor 238. Specifically, detection of attachment and detachment of the headband section 2, a shock on the headband section 2, and the like by the nine-axis sensor 238 may be the execution condition. The control section 140 stays on standby unless the execution condition for the calibration is satisfied while a power supply of the HMD 101 is on or while the AR image is displayed by the HMD 101 (step ST111; No).

If the execution condition is satisfied (Yes in step ST111), the control section 140 starts the calibration according to operation on the track pad 302 or the like (step ST112) and lights the light emitting sections 81 (step ST113). The control section 140 causes the image pickup section 23 to execute image pickup and acquires picked-up image data picked up by the image pickup section 23 (step ST114).

As explained above, in the display section 3, the light emitting sections 81 including the four LEDs 81A, 81B, 81C, and 81D are disposed. Lights emitted by the respective LEDs 81A, 81B, 81C, and 81D travel substantially straight.

A state in which the light emitting sections 81 are lit to perform the calibration is shown in FIG. 18B.

In the calibration of the HMD 101, the user US sets the HMD 101 to be right opposed to a fixed plane S (a target object). The fixed plane S may be a wall surface or may have a slight tilt with respect to the front surface of the virtual image display device 11. The fixed plane S does not have to be a rigid plane and may be a curtain. The target object used for the calibration only has to be an object including a plane that can reflect at least the lights LA, LB, LC, and LD emitted by the LEDs 81A, 81B, 81C, and 81D. Therefore, the target object is not limited to a large plane such as the fixed plane S. For example, one side surface of a box-like target object can also be used in the same manner as the fixed plane S. As explained below, the HMD 101 projects light on the fixed plane S. However, the fixed plane S is not limited to a surface that reflects light like a mirror surface. The projected light only has to be able to be detected from a picked-up image of the image pickup section 23 on the fixed plane S. When the light projected by the HMD 101 on the target object such as the fixed plane S can be visually recognized on the target object or can be detected in the picked-up image, the light on the target object is referred to as reflected light.

In order to realize the state shown in FIG. 18B, when lighting the light emitting sections 81 in step ST113, the control section 140 may cause the display control section 170 to display an image for guidance and may guide lights of the light emitting sections 81 to be directed to the plane used for the calibration. In this case, after determining according to operation on the control device 300 by the user US or on the basis of the picked-up image of image pickup section 23 that an image of the reflected lights of the light emitting sections 81 can be picked up by the image pickup section 23, the control section 140 only has to acquire picked-up image data picked up by the image pickup section 23.

As shown in FIG. 18B, the lights LA, LB, LC, and LD emitted by the LEDs 81A, 81B, 81C, and 81D are reflected on the fixed plane S to form images LPA, LPB, LPC, and LPD by four reflected lights. In this embodiment, the images LPA, LPB, LPC, and LPD can be regarded as one kind of figure (pattern) formed by four light points. The figure functions as a pattern for position detection.

The image pickup section 23 can pick up an image in a direction in which the LEDs 81A, 81B, 81C, and 81D radiate the lights LA, LB, LC, and LD.

The image pickup section 23 is provided turnably around the turning shaft R1 with respect to the headband section 2. The LEDs 81A, 81B, 81C, and 81D are fixedly provided in the display section 3. Therefore, the image pickup range A of the image pickup section 23 changes with respect to the radiating direction of the lights of the LEDs 81A, 81B, 81C, and 81D according to movements of the movable sections such as the turning shafts R1 and R2 and the moving mechanisms 5. The image pickup section 23 includes the direction in which the LEDs 81A, 81B, 81C, and 81D radiate the lights LA, LB, LC, and LD in the image pickup range A at least in a part of a range that changes according to the movements of the movable sections. In other words, the direction in which the LEDs 81A, 81B, 81C, and 81D radiate the lights LA, LB, LC, and LD may deviate from the image pickup range A of the image pickup section 23 according to the movement of the movable sections. In this case, the calibration cannot be executed. However, the control section 140 only has to inform, with, for example, display of the display section 3, the user US that the direction of the image pickup section 23 is not proper.

The control section 140 causes the image pickup section 23 to pick up an image in a range in which the images LPA, LPB, LPC, and LPD are formed and analyzes picked-up image data. The control section 140 detects the images LPA, LPB, LPC, and LPD from the picked-up image and detects relative positions or the positional relationship between the display section 3 and the image pickup section 23 on the basis of the positions of the respective images LPA, LPB, LPC, and LPD. Specifically, the control section 140 calculates distances between the images LPA and LPC, between the images LPB and LPD, between the images LPA and LPB, and between the images LPC and LPD. The control section 140 may calculate distances between the images LPA and LPD and between the images LPB and LPC. The distances calculated by the control section 140 are, for example, distances in the picked-up image. The control section 140 calculates a distance from the image pickup section 23 to the fixed plane S on the basis of the sizes of the calculated distances. The control section 140 calculates a relative tilt of the fixed plane S with respect to the image pickup section 23 from ratios of the calculated distances. The control section 140 can calculate, on the basis of these kinds of information, at least one of a relative position and a relative tilt of the image pickup section 23 with respect to the display section 3.

As explained above, the control section 140 detects, from the picked-up image, the images LPA, LPB, LPC, and LPD by the reflected lights of the lights LA, LB, LC, and LD and performs the analysis (step ST115) and acquires analysis data (step ST116). The analysis data includes at least one of a relative position and a relative tilt of the image pickup section 23 with respect to the display section 3.

After acquiring the analysis data in step ST116, the control section 140 compares the acquired data with the calibration data 121 already stored in the storing section 120 (step ST117). The control section 140 determines a result of the comparison (step ST118). If there is a difference equal to or larger than a threshold (Yes in step ST118), the control section 140 updates the calibration data 121 and, if there is a currently displayed image, adjusts a display position of the image (step ST119). Alternatively, in this embodiment, the control section 140 corrects, on the basis of the difference, a parameter representing at least one of rotation and translation between the image pickup section 23 and a screen in the optical device for left eye and a parameter representing at least one of rotation and translation between the image pickup section 23 and a screen in the optical device for right eye to correct the calibration data 121. In this case, in this embodiment, the centers of the respective left and right screens are located on curved surfaces or planes of the respective half mirrors included in the optical devices for left eye and right eye and coincide with the centers of the curved surfaces or the planes. The screens are defined by respective XY planes having respective optical axes of the optical devices for left eye and right eye as normals. The control section 140 updates the calibration data 121 stored in the storing section 120 with the calibration data 121 after the correction. If a positional relation between the image pickup section 23 and the display section 3 indicated by the data acquired in step ST116 does not have difference equal to or larger than the threshold from the positional relation in the calibration data 121 already stored (No in step ST118), the control section 140 ends the processing.

Note that, after ending the processing, the control section 140 only has to monitor the satisfaction of the execution condition in step ST111 again.

When executing the processing in steps ST112 to ST116 in FIG. 19, the HMD 101 stores, in advance, in the storing section 120, data concerning internal coordinates of a plane figure formed by the light emission of the light emitting sections 81, that is, arrangement of the lights emitted by the LEDs 81A, 81B, 81C, and 81D. The data is data for defining the respective positions of the LEDs 81A, 81B, 81C, and 81D or the positions of the lights emitted by the LEDs as coordinates in a plane coordinate system set in advance. Alternatively, the HMD 101 stores data for defining, concerning a plane figure formed by the images LPA, LPB, LPC, and LPD at the time when the lights emitted by the LEDs 81A, 81B, 81C, and 81D are reflected on the fixed plane S opposed to the front of the light emitting section, positions of feature points included in the plane figure as coordinates in the plane coordinate system. The virtual image display device 11 stores data including camera parameters of the stereo camera 231 in the storing section 120. The camera parameters include, for example, a focal length, the position of a sensor (an image pickup device), and respective pixel densities in the horizontal and vertical directions of the sensor.

By using the data concerning the arrangement of the feature points of the plane figure, it is possible to detect, from the picked-up image of the fixed plane S, the positions of the images LPA, LPB, LPC, and LPD (the feature points) reflected on the fixed plane S. Further, it is possible to derive, using the coordinates of the images LPA, LPB, LPC, and LPD serving as the feature points, with a homography method, a parameter (a rotation matrix and a translation vector) representing rotation and translation of the image pickup section 23 with respect to a figure formed by the images LPA, LPB, LPC, and LPD. The parameter is represented as a parameter PA1.

The HMD 101 acquires a parameter PA2 concerning rotation and translation of the display section 3 with respect to the plane figure. The HMD 101 can derive (correct) rotation and translation, that is, a relative positional relation of the image pickup section 23 with respect to the display section 3 using the parameters PA1 and PA2.

A method of acquiring the parameter PA2 is, for example, as explained below.

A component concerning the rotation of the parameter PA2 can be regarded as zero when the HMD 101 urges, with display of the display section 3, the user US to stand in front of a plane (e.g., the fixed plane S shown in FIG. 18B), on which the plane figure is projected, such that the plane and the display section 3 are parallel to each other. Since a plane such as a wall stands in parallel to the gravity direction and a human also stands vertically, the display section 3 worn by the user US may be considered to be right opposed to the front of the plane. Therefore, the rotation component is regarded as absent.

If the distance between a plane (e.g., the fixed plane S shown in FIG. 18B) and the display section 3 own by the user US is a distance set in advance, a component concerning the translation (a distance) of the parameter PA2 can be calculated on the basis of the distance.

The above description is an example of an operation for calculating parameters for correcting the calibration data 121. However, as explained above, the HMD 101 can appropriately correct the calibration data 121.

As explained above, the HMD 101 applied with the invention includes the display section 3 that displays an image while enabling visual recognition of an outside scene. The HMD 101 includes the image pickup section 23 that picks up an image in the image pickup range that overlaps with the range visually recognized through the display section 3. The HMD 101 includes the coupling section that includes at least the one movable section and couples the image pickup section 23 to the display section 3 and the plurality of light emitting sections 81 (the LEDs 81A, 81B, 81C, and 81D) fixedly provided in the display section 3. The LEDs 81A, 81B, 81C, and 81D emit the lights including the predetermined pattern. When the lights of the LEDs 81A, 81B, 81C, and 81D are projected on a target object located in the image pickup range of the image pickup section 23, it is possible to pick up an image of the lights on the target object with the image pickup section 23. Therefore, when the lights LA, LB, LC, and LD emitted by the light emitting sections 81 are projected on the target object as shown in FIG. 18B, it is possible to pick up an image of the lights on the target object with the image pickup section 23 and detect a relative position, a relative direction, and the like of the image pickup section 23 with respect to the display section 3 using the picked-up image.

In the HMD 101, in at least a part of the range in which the image pickup direction of the image pickup section 23 is changed by to the movable section, a direction in which the light emitting sections 81 emit lights is included in the image pickup range A of the image pickup section 23.

The light emitting sections 81 form a predetermined pattern with the lights LA, LB, LC, and LD emitted by the LEDs 81A, 81B, 81C, and 81D. The predetermined pattern is, for example, a pattern for position detection or position adjustment. When the lights LA, LB, LC, and LD are projected on the fixed plane S serving as the target object located in the image pickup range A of the image pickup section 23, it is possible to pick up, with the image pickup section 23, an image formed by the lights on the fixed plane S. The lights are, for example, reflected lights reflected on the fixed plane S. The control section 140 can detect a relative positional relation of the image pickup section 23 with respect to the display section 3 or a change in the relative positional relation by detecting the image of the lights from the picked-up image and performing an analysis.

The light emitting sections 81 include the LEDS 81A, 81B, 81C, and 81D functioning as a plurality of light sources. The pattern for position detection is formed by the lights emitted by the LEDs 81A, 81B, 81C, and 81D. Therefore, it is possible to obtain, with the image pickup section 23, the picked-up image in which a relative position, the relative direction, and the like of the image pickup section 23 with respect to the display section 3 can be highly accurately detected.

Note that the number of light sources included in the light emitting sections 81 is not limited to four. The light emitting sections 81 may include two or three light sources or may include five or more light sources. Further, the light emitting sections 81 are not limited to the configuration in which the pattern for position detection is formed by the lights respectively emitted by the plurality of LEDs 81A, 81B, 81C, and 81D. For example, a configuration may be adopted in which the pattern for position detection can be radiated by modulating the lights emitted by the light sources. This example is explained as third and fourth embodiments.

Third Embodiment

Figure 20:
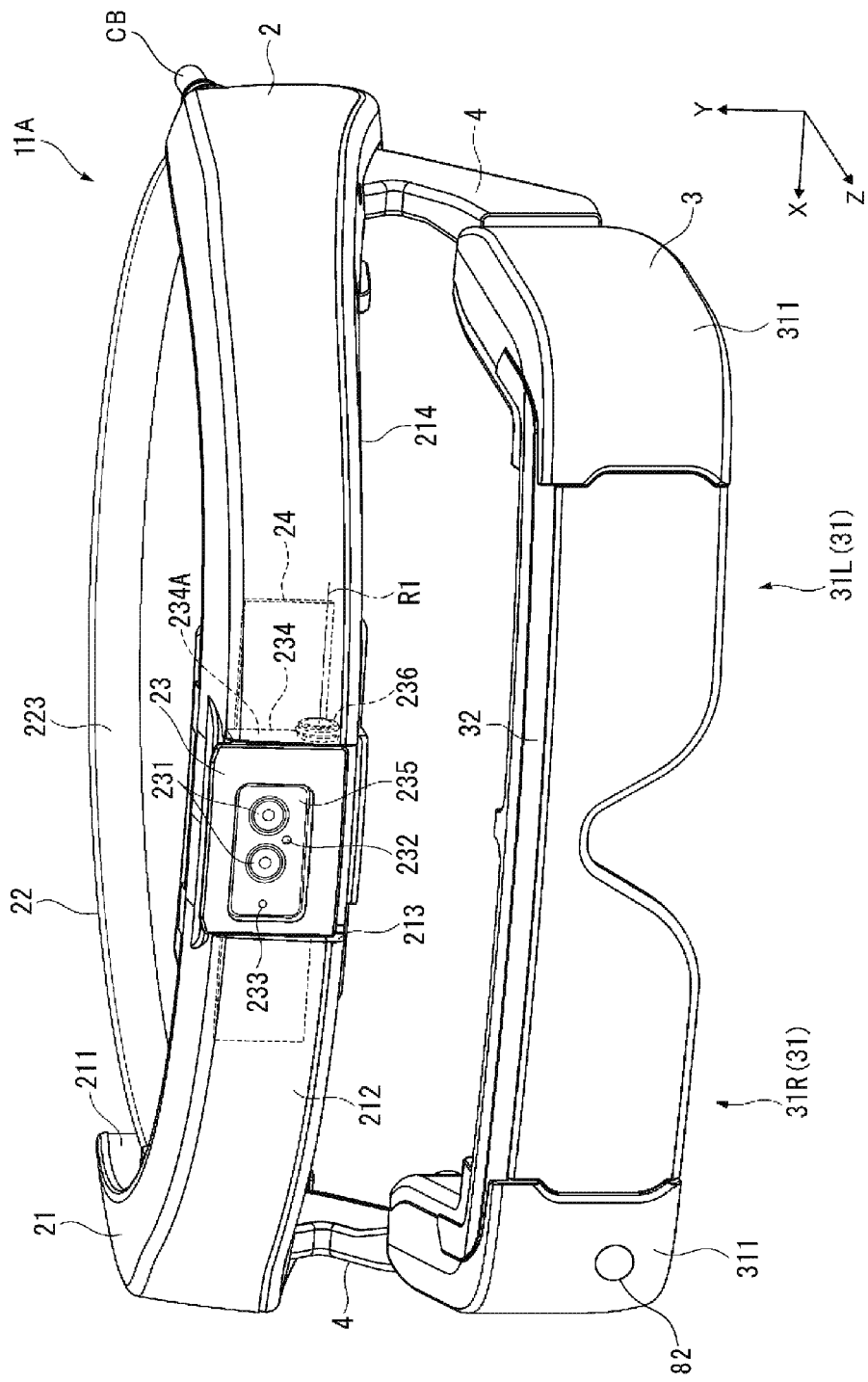
FIG. 20 is a perspective view of a virtual image display device in a third embodiment.
Figure 21A:
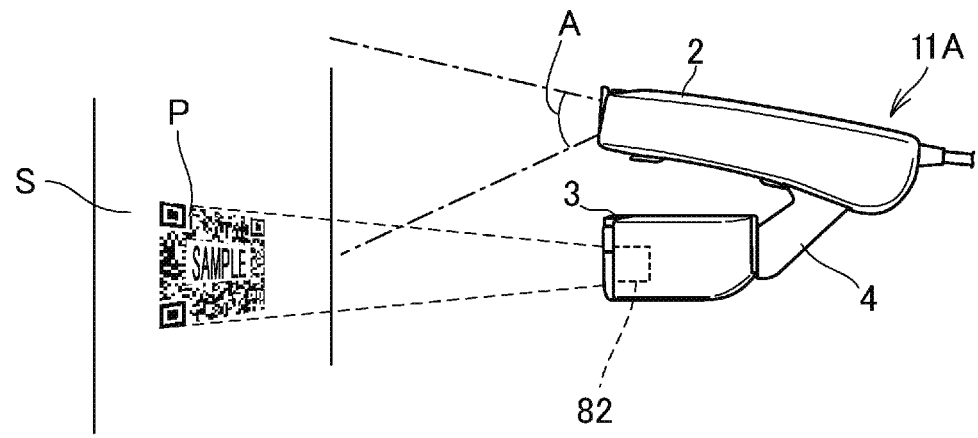
Figure 21B:
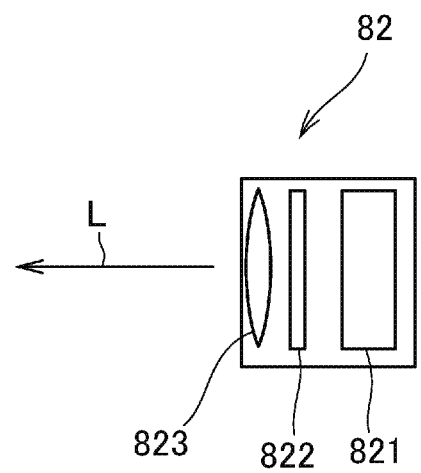

FIG. 20 is a perspective view showing the configuration of a virtual image display device 11A in a third embodiment applied with the invention. FIGS. 21A and 21B are explanatory diagrams of an HMD 101A. FIG. 21A shows a state of position detection. FIG. 21B shows the configuration of a projector 82 (a light emitting section) included in the virtual image display device 11A.

The virtual image display device 11A in the third embodiment includes configurations and functions same as the configurations and the functions of the virtual image display device 11 in the second embodiment except a configuration related to the projector 82 and the operation of the control section 140 explained below. Therefore, in the explanation of the third embodiment, sections having configurations same as the configurations in the second embodiment are denoted by the same reference numerals and signs. Explanation concerning the same configurations and the same operations is omitted.

The virtual image display device 11A has a configuration in which the light emitting sections 81 included in the virtual image display device 11 explained in the second embodiment are removed and the projector 82 is provided.

In FIG. 20, the configuration of the virtual image display device 11A is shown. As shown in FIG. 20, the virtual image display device 11A includes the projector 82 in the display section 3. The projector 82 is fixedly provided in the display section 3. The projector 82 projects image light in a direction of an outside scene visually recognized by the user US through the optical device 31. The projector 82 only has to be disposed on the front surface side in the display section 3. In FIG. 20, an example is shown in which the projector 82 is embedded in the cover member 311 at the right side end portion of the display section 3. For example, the projector 82 may be provided at the left side end portion of the display section 3.

In FIG. 21A, a state is shown in which the virtual image display device 11A projects image light with a light-emission driving section 83. In an example shown in FIG. 21A, the virtual image display device 11A is present in a position opposed to the fixed plane S. A pattern for position adjustment P (a predetermined pattern) converted into a two-dimensional code is projected on the fixed plane S by the projector 82. The pattern for position adjustment P is not limited to the two-dimensional code. At least a plurality of points only have to be detected in a picked-up image of the pattern for position adjustment P picked up by the image pickup section 23. Therefore, for example, the pattern formed by the four points illustrated in the second embodiment may be adopted.

A relation between a direction in which the projector 82 projects image light forming the pattern for position adjustment P and the image pickup range A of the image pickup section 23 is as explained in the second embodiment. That is, in at least a part of a range in which the image pickup range A of the image pickup section 23 changes according to movement of the movable section of the virtual image display device 11A, the fixed plane S only has to be included in the image pickup range A. In other words, the pattern for position adjustment P may deviate from the image pickup range A of the image pickup section 23 according to the movement of the movable section. In this case, calibration cannot be executed. However, the control section 140 only has to inform, with, for example, display of the display section 3, the user US that the direction of the image pickup section 23 is not proper.

The configuration of the projector 82 is schematically shown in FIG. 21B.

The projector 82 includes a light source 821, a light modulating section 822 (a modulating section), and a projection optical system 823. The light source 821 includes, for example, a solid-state light source such as an LED, a laser diode, or an organic EL (Electro-Luminescence) element or a lamp. The light source 821 radiates light toward the light modulating section 822. The light modulating section 822 includes a liquid crystal display panel of a transmission type, a liquid crystal display panel of a reflection type, or a DMD (digital mirror device). The light modulating section 822 modulates the light emitted by the light source 821 and generates image light. The projection optical system 823 includes, for example, a lens group. The projection optical system 823 projects image light L generated by the light modulating section 822 toward the front of the display section 3. In the projector 82, optical elements (not shown in the figure) such as a prism and a mirror forming an optical path may be provided between the light source 821 and the light modulating section 822 and between the light modulating section 822 and the projection optical system 823. The light modulating section 822 modulates the light and generates the image light, for example, in units of pixels arranged in a matrix shape. Therefore, the shape of the pattern for position adjustment P is not limited. That is, the configuration of the pattern for position adjustment P can be freely changed in the light modulating section 822.

Figure 22:
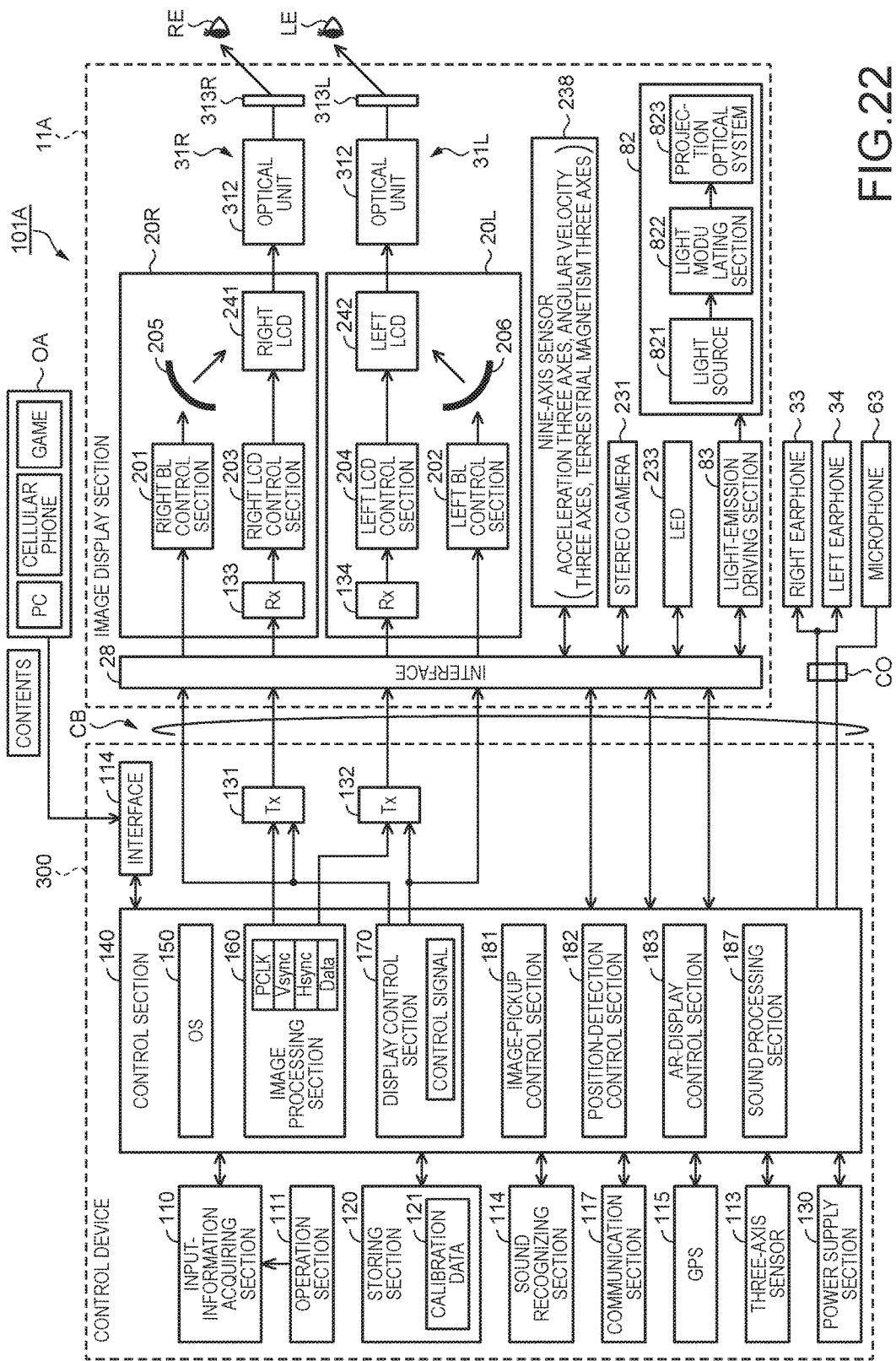
FIG. 22 is a functional block diagram of the HMD according to the third embodiment.

FIG. 22 is a functional block diagram of the HMD 101A.

The HMD 101A according to the third embodiment has a configuration in which the virtual image display device 11 is replaced with the virtual image display device 11A in the HMD 101 in the second embodiment. That is, the HMD 101A includes the projector 82 and the light-emission driving section 83 instead of the light emitting sections 81 included in the HMD 101.

The light-emission driving section 83 is connected to the control section 140 via the interface 28. The light-emission driving section 83 drives the sections of the projector 82 according to control by the control section 140. The light-emission driving section 83 lights and extinguishes the light source 821 included in the projector 82. The projector 82 drives a liquid crystal panel or the like of the light modulating section 822 and controls, for example, display of the pixels. For example, the control section 140 outputs a control signal for instructing lighting of the light source 821 and an image signal to the light-emission driving section 83. The light-emission driving section 83 outputs a control pulse and an electric current to the light source 821 to light the light source 821 and causes the light modulating section 822 to draw an image. When the light source 821 includes a solid-state light source, the light-emission driving section 83 may perform PWM (Pulse Wave Modulation) control on the light source 821 and adjust the luminance of the light source 821.

Like the HMD 101 according to the second embodiment, the HMD 101A configured as explained above can perform the operation shown in FIG. 19. In the operation, in step ST113, the control section 140 of the HMD 101A drives the light source 821 and the light modulating section 822 with the light-emission driving section 83 to start projection of the pattern for position adjustment P. In steps ST115 to ST116, the control section 140 only has to detect an image of the pattern for position adjustment P from a picked-up image of the image pickup section 23 and calculate the positional relationship between the image pickup section 23 and the display section 3 on the basis of the shape and the size of the pattern for position adjustment P in the picked-up image.

Consequently, by performing AR display using the HMD 101A, it is possible to obtain effects same as the effects of the HMD 101. Since the pattern for position adjustment P is formed by the light modulating section 822, it is possible to easily obtain the pattern for position adjustment P without being affected by complexity of the pattern for position adjustment P.

Like the HMD 101 explained in the second embodiment, the HMD 101A stores, in advance, in the storing section 120, data concerning the pattern for position adjustment P projected by the projector 82 or a plane figure formed by an image of the pattern for position adjustment P reflected on the fixed plane S. The data is data for defining positions of feature points forming the pattern for position adjustment P as coordinates in a plane coordinate system set in advance. The HMD 101A stores data including camera parameters of the stereo camera 231 in the storing section 120. The camera parameters include, for example, a focal length, the position of a sensor (an image pickup device), and respective pixel densities in the horizontal and vertical directions of the sensor. The HMD 101A can detect, using these data, from the picked-up image of the fixed plane S, the plane figure, which is the image of the pattern for position adjustment P reflected on the fixed plane S, or the positions of the feature points forming the plane figure. As in the second embodiment, it is possible to derive, using the coordinates of the feature points, with the homography method, a parameter (a rotation matrix and a translation vector) representing rotation and translation of the image pickup section 23 with respect to the plane figure formed by the pattern for position adjustment P. The parameter is represented as the parameter PA1.

The HMD 101A acquires the parameter PA2 concerning rotation and translation of the display section 3 with respect to the plane figure. The HMD 101A can derive (correct) rotation and translation, that is, a relative positional relation of the image pickup section 23 with respect to the display section 3 using the parameters PA1 and PA2.

As a method of acquiring the parameter PA2 is, for example, as in the second embodiment, it is possible to acquire the parameter PA2 by urging the user US to stand in front of a plane (e.g., the fixed plane S shown in FIG. 21A), on which the plane figure is projected, such that the plane and the display section 3 are parallel to each other. In this case, the HMD 101A only has to instruct the user US to set the distance between the plane (e.g., the fixed plane S shown in FIG. 21A) and the display section 3 worn by the user US to a distance set in advance. Alternatively, the HMD 101A may calculate the distance between the fixed plane S and the display section 3 on the basis of a focal length of the projector 82. For example, the user US moves to a distance where the plane figure projected on the wall is focused and picks up an image when the plane figure is focused. For example, in this way, the HMD 101A can appropriately correct the calibration data 121.

Fourth Embodiment

Figure 23:
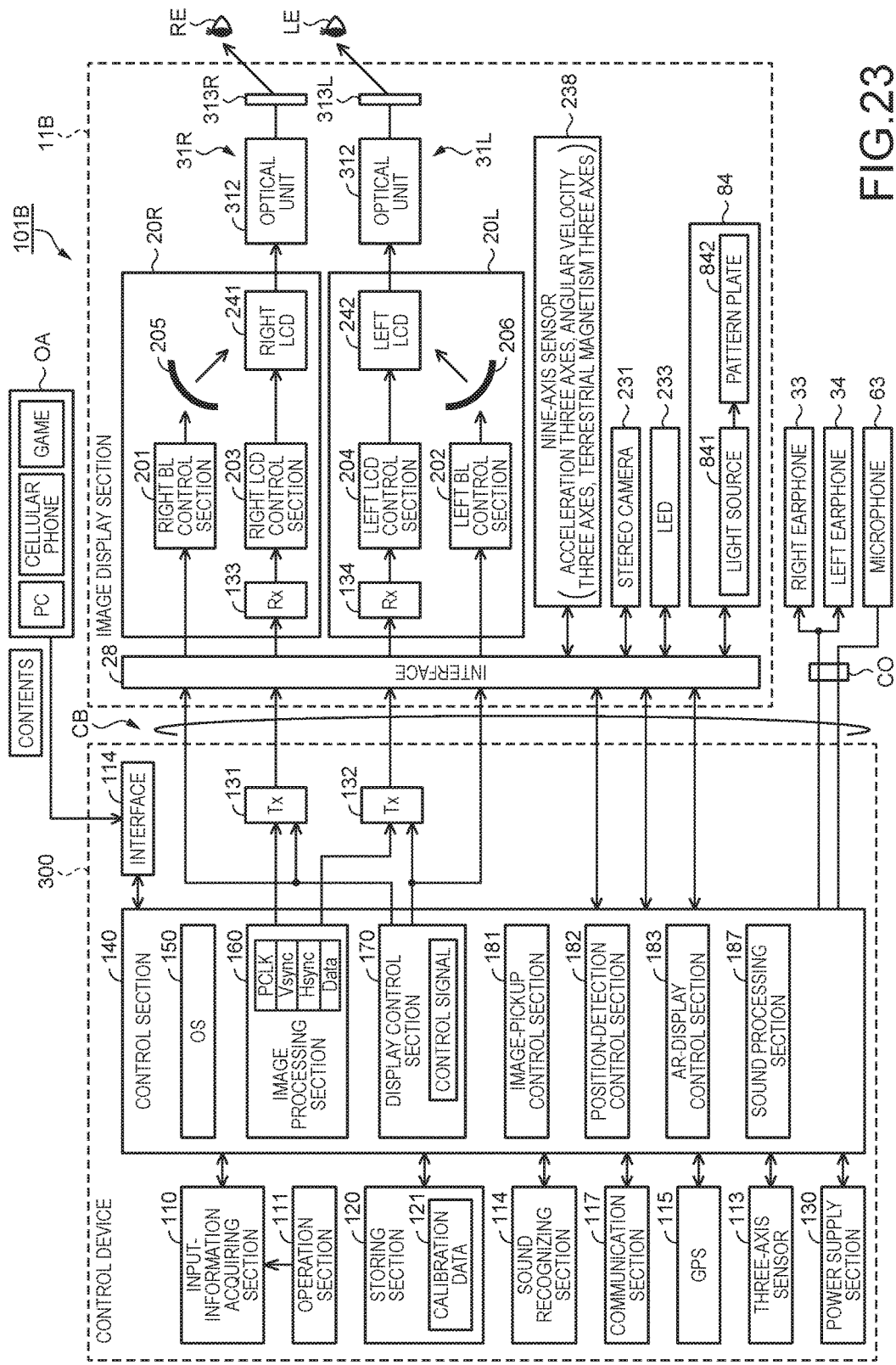
FIG. 23 is a functional block diagram of an HMD according to a fourth embodiment.

FIG. 23 is a functional block diagram of a virtual image display device 11B according to a fourth embodiment applied with the invention. The virtual image display device 11B according to the fourth embodiment includes configurations and functions common to the virtual image display devices 11 and 11A according to the second and third embodiments except a configuration related to a light emitting section 84 and the operation of the control section 140 explained below. Therefore, in the explanation of the fourth embodiment, sections having configurations same as the configurations in the second and third embodiments are denoted by the same reference numerals and signs. Explanation concerning the same configurations and the same operations is omitted.

The virtual image display device 11B includes the light emitting section 84 instead of the projector 82 and the light-emission driving section 83 included in the virtual image display device 11A explained in the third embodiment.

The light emitting section 84 is fixedly provided in the display section 3. For example, like the projector 82, the light emitting section 84 is embedded and set in the cover member 311 at the end portion on the right side of the display section 3.

The light emitting section 84 includes a light source 841 and a pattern plate 842 (a modulating section). The light source 841 includes, for example, a solid-state light source such as an LED, a laser diode, or an organic EL element or a lamp. The light source 841 radiates light toward the pattern plate 842. The pattern plate 842 is a tabular member that transmits, in the shape of the pattern for position adjustment P, the light emitted by the light source 841. By passing through the pattern plate 842, the light emitted by the light source 841 is modulated into light having the shape of a slit or a hole formed in the pattern plate 842 and radiated to the front of the display section 3.

Like the HMD 101 according to the second embodiment and the HMD 101A in the third embodiment, an HMD 101B can perform the operation shown in FIG. 19. In this operation, the control section 140 of the HMD 101B lights the light source 841 in step ST113 and causes the light source 841 to start projection of the pattern for position adjustment P. In steps ST115 to ST116, the control section 140 only has to detect, from a picked-up image of the image pickup section 23, an image of the pattern for position adjustment P formed by the light modulating section 822 and calculate the positional relationship between the image pickup section 23 and the display section 3 on the basis of the shape and the size of the pattern for position adjustment P in the picked-up image.

Consequently, it is possible to obtain effects same as the effects of the HMDs 101 and 101A by performing AR display using the HMD 101B. It is possible to easily form the pattern for position adjustment P with a simple configuration including the pattern plate 842. For example, compared with the light emitting sections 81 that form the pattern for position adjustment with the plurality of light sources, it is possible to obtain a relatively complicated pattern for position adjustment P.

Like the HMD 101A explained in the third embodiment, the HMD 101B stores, in advance, in the storing section 120, data concerning the pattern for position adjustment P projected by the light emitting section 84 or a plane figure formed by an image of the pattern for position adjustment P reflected on the fixed plane S. The data is data for defining positions of feature points forming the pattern for position adjustment P as coordinates in a plane coordinate system set in advance. The HMD 101B stores data including camera parameters of the stereo camera 231 in the storing section 120. The camera parameters include, for example, a focal length, the position of a sensor (an image pickup device), and respective pixel densities in the horizontal and vertical directions of the sensor. The HMD 101B can detect, using these data, from the picked-up image of the fixed plane S, the plane figure, which is the image of the pattern for position adjustment P reflected on the fixed plane S, or the positions of the feature points forming the plane figure. As in the second and third embodiments, it is possible to derive, using the coordinates of the feature points, with the homography method, a parameter (a rotation matrix and a translation vector) representing rotation and translation of the image pickup section 23 with respect to the plane figure formed by the pattern for position adjustment P. The parameter is represented as the parameter PA1.

The HMD 101B acquires the parameter PA2 concerning rotation and translation of the display section 3 with respect to the plane figure. The HMD 101B can derive (correct) rotation and translation, that is, a relative positional relation of the image pickup section 23 with respect to the display section 3 using the parameters PA1 and PA2.

As a method of acquiring the parameter PA2 is, for example, as in the second and third embodiments, it is possible to acquire the parameter PA2 by urging the user US to stand in front of a plane (e.g., the fixed plane S shown in FIG. 21A), on which the plane figure is projected, such that the plane and the display section 3 are parallel to each other. In this case, the HMD 101B only has to instruct the user US to set the distance between the plane (e.g., the fixed plane S shown in FIG. 21A) and the display section 3 worn by the user US to a distance set in advance. For example, in this way, the HMD 101B can appropriately correct the calibration data 121.

Fifth Embodiment

Figure 24:
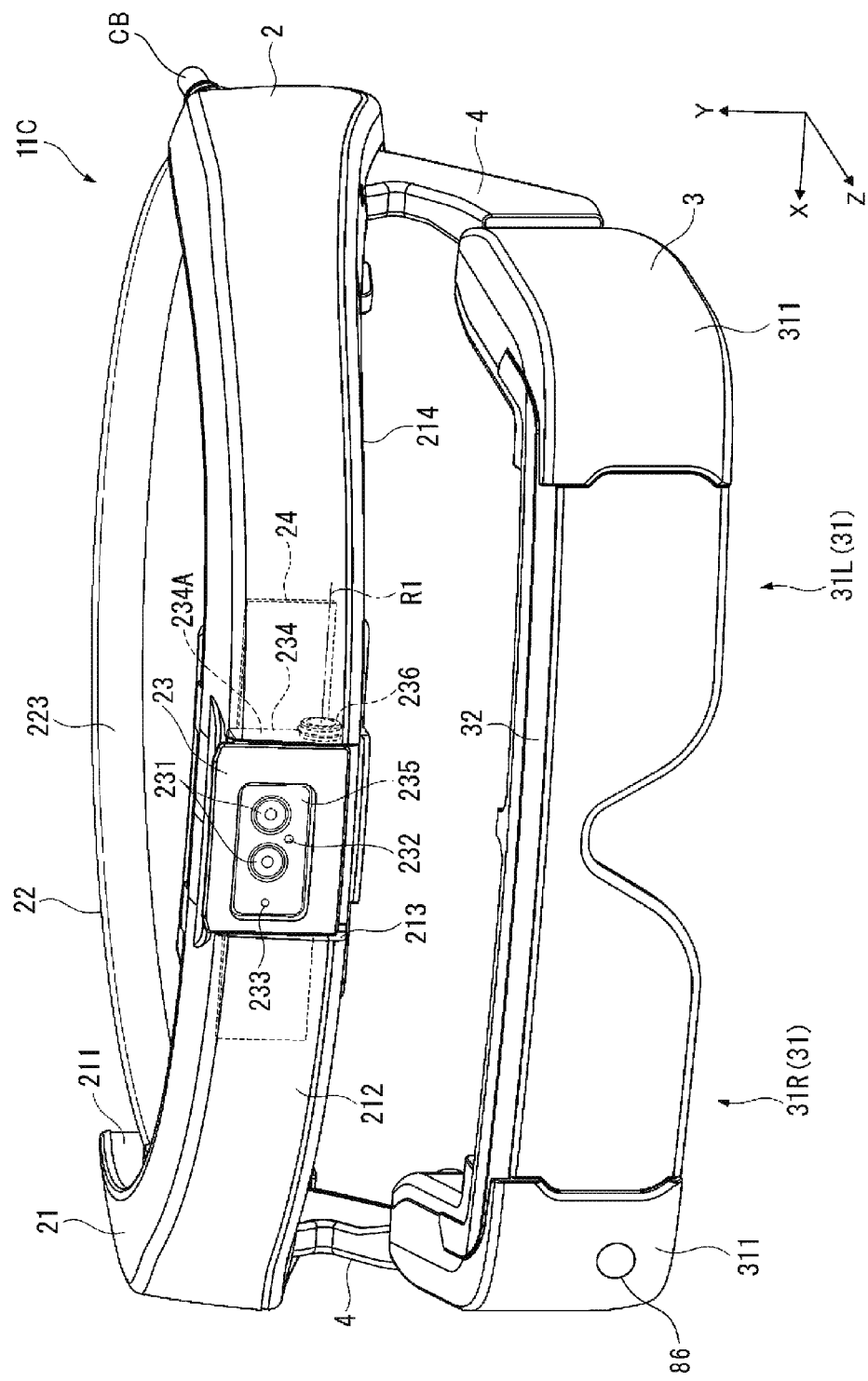
FIG. 24 is a perspective view of a virtual image display device in a fifth embodiment.
Figure 25:
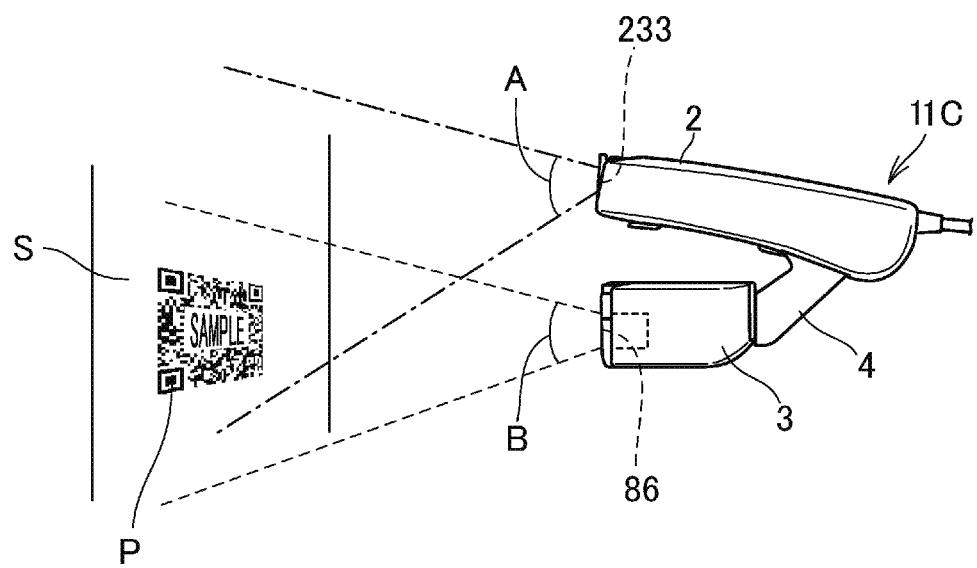
FIG. 25 is an explanatory diagram of the operation of an HMD according to the fifth embodiment.

FIG. 24 is a perspective view showing the configuration of a virtual image display device 11C according to a fifth embodiment applied with the invention. FIG. 25 is an explanatory diagram showing a state of position detection of an HMD 101C.

The virtual image display device 11C according to the fifth embodiment includes configurations and functions common to the virtual image display device 11 according to the second embodiment except a configuration related to a camera 86 and the operation of the control section 140 explained below. Therefore, in the explanation of the fifth embodiment, sections having configurations same as the configurations in the second embodiment are denoted by the same reference numerals and signs. Explanation concerning the same configurations and the same operations is omitted.

The virtual image display device 11C has a configuration in which the light emitting sections 81 included in the virtual image display device 11 explained in the second embodiment are removed and the camera 86 is provided. In this configuration, the stereo camera 231 (FIG. 2) of the image pickup section 23 is equivalent to the first image pickup section and the camera 86 is equivalent to the second image pickup section.

In FIGS. 24 and 25, the configuration of the virtual image display device 11C is shown. As shown in FIG. 24, the virtual image display device 11C includes the camera 86 in the display section 3. The camera 86 is fixedly provided in the display section 3. The camera 86 picks up an image in a direction of an outside scene visually recognized by the user US through the optical device 31.

As shown in FIG. 25, an image pickup range B of the camera 86 overlaps with the image pickup range A of the image pickup section 23. More specifically, the image pickup section 23 is attached to the headband section 2 via the turning shaft R1. The camera 86 is fixedly provided in the display section 3. The display section 3 and the headband section 2 are coupled and supported via the turning shafts R2 and the moving mechanisms 5, which are the movable sections. Therefore, positions of the image pickup range A and the image pickup range B relative to each other change according to movements in the movable sections. In at least a part of a range in which positions of the image pickup section 23 and the display section 3 relative to each other change according to the movements of the movable sections, the image pickup range A and the image pickup range B overlap with each other. In other words, the image pickup range A and the image pickup range B may not overlap with each other according to the movement of the movable sections. In this case, calibration cannot be executed. However, the control section 140 only has to inform, with, for example, display of the display section 3, the user US that the direction of the image pickup section 23 is not proper. More desirably, the image pickup range A and the image pickup range B overlap with each other at least in a part in most of the range in which the positions of the image pickup section 23 and the display section 3 relative to each other change according to the movements of the movable sections. Still more desirably, the image pickup range A and the image pickup range B overlap with each other at least in a part in an entire range in which the movable sections can be moved.

When performing the calibration, the user US wearing the virtual image display device 11C locates the virtual image display device 11C in front of the fixed plane S attached with the pattern for position adjustment P as shown in FIG. 25. The pattern for position adjustment P is attached to the fixed plane S by a method such as bonding or drawn on the fixed plane S. The fixed plane S may be a wall surface or may have a slight tilt with respect to the front surface of the virtual image display device 11C. The fixed plane S does not have to be a rigid plane and may be a curtain. The target object used for the calibration only has to include at least the pattern for position adjustment P, an image of which can be picked up by the image pickup section 23 and the camera 86. Desirably, the fixed plane S only has to support the pattern for position adjustment P in a state in which distortion does not occur. Therefore, the target object is not limited to a large plane such as the fixed plane S. For example, one side surface of a box-like target object can also be used in the same manner as the fixed plane S.

Figure 26:
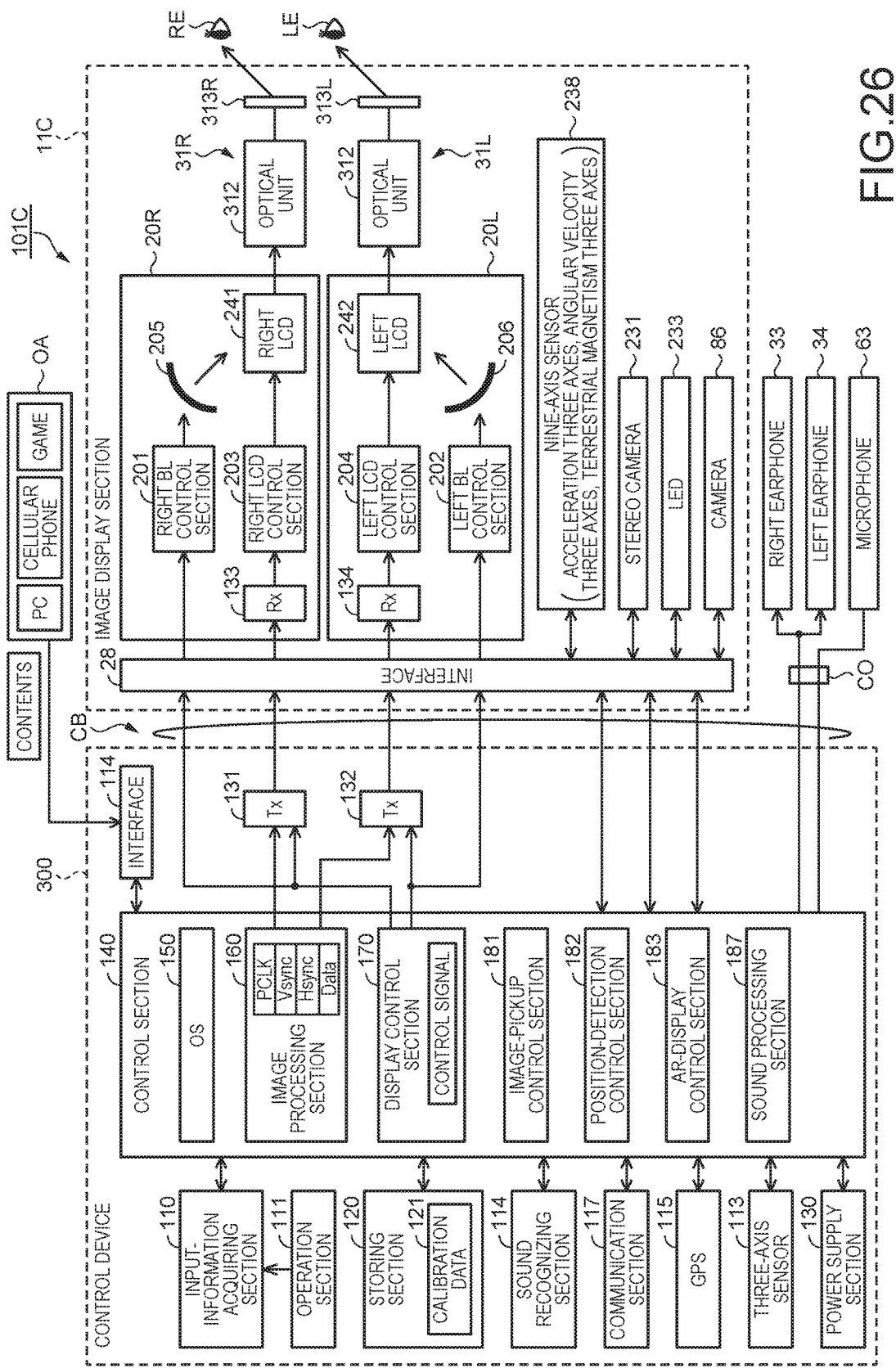
FIG. 26 is a functional block diagram of the HMD according to the fifth embodiment.

FIG. 26 is a functional block diagram of the HMD 101C.

The HMD 101C in the fifth embodiment has a configuration in which the virtual image display device 11 is replaced with the virtual image display device 11C in the HMD 101 according to the second embodiment. That is, the HMD 101C includes the camera 86 instead of the light emitting sections 81 included in the HMD 101.

The camera 86 is connected to the control section 140 via the interface 28. The camera 86 performs image pickup according to control by the control section 140 and outputs picked-up image data to the control section 140. The control section 140 is also capable of controlling the stereo camera 231 and the camera 86 to simultaneously execute the image pickup.

Figure 27:
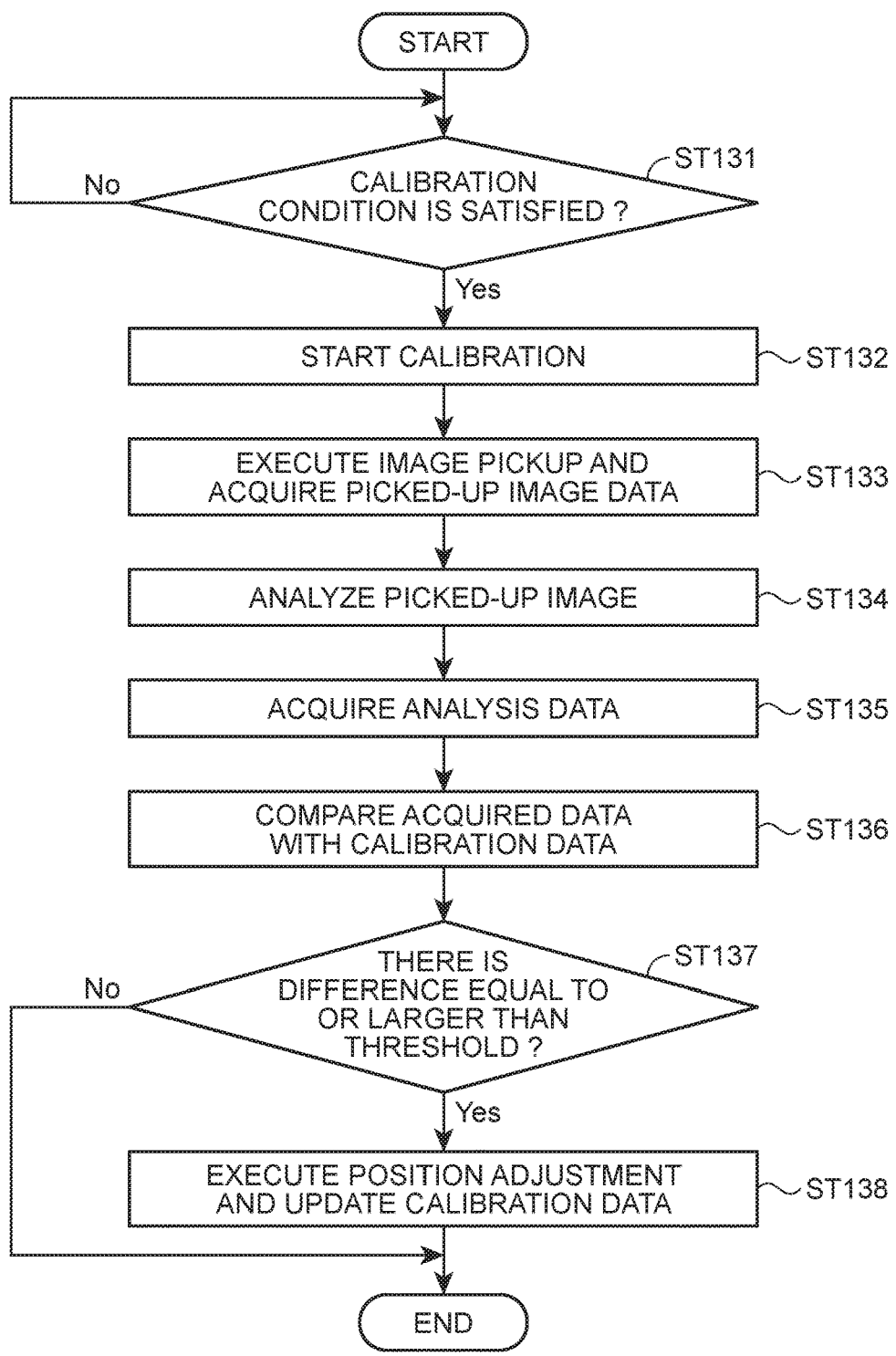
FIG. 27 is a flowchart for explaining the operation of the HMD according to the fifth embodiment.

FIG. 27 is a flowchart for explaining the operation of the HMD 101C. FIG. 27 shows an operation related to the calibration.

The control section 140 stands by for satisfaction of an execution condition for the calibration (step ST131). The execution condition for the calibration is as explained with reference to FIG. 19. The control section 140 stays on standby unless the execution condition for the calibration is satisfied while a power supply of the HMD 101C is on or while an AR image is displayed by the HMD 101C (step ST131; No).

If the execution condition is satisfied (Yes in step ST131), the control section 140 starts the calibration according to operation on the track pad 302 or the like (step ST132). The control section 140 causes the image pickup section 23 and the camera 86 to execute image pickup and acquires picked-up image data picked up by the image pickup section 23 and the camera 86 (step ST133).

As shown in FIG. 25, in the calibration of the HMD 101C, the user US sets the virtual image display device 11C to be right opposed to the fixed plane S (the target object). In order to realize a state shown in FIG. 25, when staring the calibration in step ST132, the control section 140 may cause the display control section 170 to display an image for guidance and may guide the virtual image display device 11C to be directed to the pattern for position adjustment P. In this case, the control section 140 only has to acquire picked-up image data picked up by the image pickup section 23 after determining according to operation on the control device 300 by the user US or on the basis of picked-up images of the image pickup section 23 and the camera 86 that images of the pattern for position adjustment P can be picked up by both of the image pickup section 23 and the camera 86.

The control section 140 detects an image of the pattern for position adjustment P from the picked-up images of the image pickup section 23 and the camera 86 and performs an analysis (step ST134) and acquires analysis data (step ST135). The analysis data includes at least one of a relative position and a relative tilt of the image pickup section 23 with respect to the display section 3.

The control section 140 compares the data acquired in step ST135 with the calibration data 121 already stored in the storing section 120 (step ST136). The control section 140 determines a result of the comparison (step ST137). If there is a difference equal to or larger than a threshold (Yes in step ST137), the control section 140 updates the calibration data 121. If there is a currently displayed image, the control section 140 adjusts a display position of the image (step ST138).

If a positional relation between the image pickup section 23 and the display section 3 indicated by the data acquired in step ST135 does not have a difference equal to or larger than the threshold from a positional relation indicated by the calibration data 121 already stored (No in step ST137), the control section 140 ends the processing.

Note that, after ending the processing, the control section 140 only has to monitor the satisfaction of the execution condition in step ST131 again.

As explained above, the HMD 101C according to the fifth embodiment includes the display section 3 that displays an image while enabling visual recognition of an outside scene and the image pickup section 23 (the first image pickup section) that picks up an image in the image pickup range that overlaps with the range visually recognized through the display section 3. In the HMD 101C, the image pickup section 23 is coupled to the display section 3 by the coupling section including at least one movable section. The HMD 101C includes the camera 86 (the second image pickup section) fixedly provided in the display section 3. Therefore, the control section 140 can detect, using picked-up images of the plurality of image pickup sections, a relative position, a relative direction, and the like of the image pickup section 23 with respect to the display section 3. In the HMD 101C, in at least a part of a range in which relative directions of an image pickup direction of the image pickup section 23 and an image pickup direction of the camera 86 are changed by the movable section, at least a part of the image pickup range A and the image pickup range B overlap.

The HMD 101C uses the image pickup section 23, which is the first image pickup section, for calculation of a display position where an image is displayed on the display section 3. That is, when detecting a target object of the AR display and displaying an AR image according to the position of the target object, the HMD 101C uses a picked-up image of the image pickup section 23. The HMD 101C uses the camera 86 in addition to the image pickup section 23 in order to calculate changes in the positional relationship between the image pickup section 23 and the display section 3 or the positional relationship. Therefore, it is possible to perform the calibration of the image pickup section 23 and the display section 3 using the image pickup section 23 for the AR display.

As in the second to fourth embodiments, the HMD 101C stores, in advance, in the storing section 120, data concerning the pattern for position adjustment P projected by the light emitting section 84 or a plane figure formed by an image of the pattern for position adjustment P reflected on the fixed plane S. The data is data for defining positions of feature points forming the pattern for position adjustment P as coordinates in a plane coordinate system set in advance. The HMD 101C stores data including camera parameters of the stereo camera 231 and/or the camera 86 in the storing section 120. The camera parameters include, for example, a focal length, the position of a sensor (an image pickup device), and respective pixel densities in the horizontal and vertical directions of the sensor. The HMD 101C can detect, using these data, from the picked-up image of the fixed plane S, the plane figure, which is the image of the pattern for position adjustment P reflected on the fixed plane S, or the positions of the feature points forming the plane figure. As in the second and third embodiments, it is possible to derive, using the coordinates of the feature points, with the homography method, a parameter (a rotation matrix and a translation vector) representing rotation and translation of the image pickup section 23 with respect to the plane figure formed by the pattern for position adjustment P. The parameter is represented as the parameter PA1.

The HMD 101C acquires the parameter PA2 concerning rotation and translation of the display section 3 with respect to the plane figure. The HMD 101C can derive (correct) rotation and translation, that is, a relative positional relation of the image pickup section 23 with respect to the display section 3 using the parameters PA1 and PA2.

As a method of acquiring the parameter PA2 is, for example, as in the second to fourth embodiments, it is possible to acquire the parameter PA2 by urging the user US to stand in front of a plane (e.g., the fixed plane S shown in FIG. 25), on which the plane figure is projected, such that the plane and the display section 3 are parallel to each other. In this case, the HMD 101C only has to instruct the user US to set the distance between the plane (e.g., the fixed plane S shown in FIG. 25) and the display section 3 worn by the user US to a distance set in advance.

The HMD 101C can calculate parameters concerning rotation and translation of the camera 86 with respect to the plane figure using a picked-up image of the camera 86. Further, states or positions of rotation and translation of the camera 86 with respect to the display section 3 of the HMD 101C are already known from the configuration of the HMD 101C. Therefore, the HMD 101C can calculate the parameter PA2 on the basis of the parameters concerning the rotation and the translation of the camera 86 with respect to the plane figure and the states or the positions of the rotation and the translation of the camera 86 with respect to the display section 3. For example, in this way, the HMD 101C can appropriately correct the calibration data 121.

Modifications of the Embodiments

The invention is not limited to the embodiments. Modifications, improvements, and the like in a range in which the object of the invention can be achieved are included in the invention.

In the embodiments described above, the control section 140 may start timing process to measure a predetermined time period continuously after the initial calibration has been done, and the control section 140 may start the process to derive or adjust the parameters representing the positional, or spatial, relationship between the image pickup section 23 and the display section 3 at every expiration point of the time period.

In the fifth embodiment, a separate or physical plane marker may be captured by the image pickup section 23 and the camera 86 to derive or adjust the parameters representing the spatial relationship between the image pickup section 23 and the display section 3. Instead, the fifth embodiment may be combined with one of the second, third and fourth embodiments. For instance, the images (dots) LPA, LPB, LPC and LPD in the second embodiment may be captured by the image pickup section 23 and the camera 86. In this case, the display section 3 is not necessarily required to be in parallel to the plane on which the four dots LPA, LPB, LPC and LPD are projected.

In the embodiments, the configuration including the pair of arm sections 4 that supports the display section 3 from both the sides in the X direction is illustrated. However, the invention is not limited to this. For example, a configuration including one arm section 4 may be adopted. In this case, the arm section 4 may be connected to substantially the center in the X direction of the display section 3 or may be connected to one end side in the X direction. In such a configuration, it is possible to reduce the number of components configuring the virtual image display devices 1, 11, 11A, 11B, and 11C and reduce weight. Note that, in the configuration in which the display section 3 is supported from both the sides by the pair of arm sections 4, it is possible to more stably support the display section 3 than supporting the display section 3 in one place.

In the embodiments, the configuration is illustrated in which the display section 3 includes the optical device for left eye 31L and the optical device for right eye 31R. The pair of optical devices 31 are integrally fixed by the frame section 32 and integrally turned by the pair of arm sections 4. However, the invention is not limited to this. The optical device for right eye 31R may be configured to be capable of being individually turned by the arm section 4 on the right side viewed from the user US. The optical device for left eye 31L may be configured to be capable of being individually turned by the arm section 4 on the left side viewed from the user US.

In the embodiments, the configuration is illustrated in which the display section 3 includes the optical device for left eye 31L and the optical device for right eye 31R. However, the invention is not limited to this. That is, a configuration including any one of the optical device for left eye 31L and the optical device for right eye 31R may be adopted. In this case, the display device 3 may be configured to be supported by only one arm section 4. For example, the optical device for left eye 31L may be configured to be supported by only the arm section 4 on the left side or may be configured to be supported by the pair of arm sections 4.

In the embodiments, the arm section 4 is configured to be capable of turning about the turning shaft R2 parallel to the X axis substantially orthogonal to the viewing direction of the visual recognition of the user US. However, the invention is not limited to this. That is, various configurations in which the arm section 4 is enabled to turn around a connecting part to the headband section 2 may be adopted.

For example, in the configuration in which the display section 3 is supported by one arm section 4 and the configuration in which the optical device for left eye 31L is individually supported by the arm section 4 on the left side and the optical device for right eye 31R is individually supported by the arm section 4 on the right side, the arm section 4 may be enabled to turn about a turning shaft parallel to the Y axis.

For example, the arm section 4 may be enabled to turn about a turning shaft extending along a ZX lane and crossing the viewing direction of the user US.

In the embodiments, the headband section 2 functioning as the main body section is formed in the substantially semicircular shape (the substantially U shape). However, the invention is not limited to this. That is, the headband section 2 only has to be configured to be capable of being disposed along the head of the user US (a part above a line that extends along the circumferential direction centering on the center axis of the head and passes both the eyes). For example, the headband section 2 may be configured to have, in at least a part thereof, an arcuate inner surface extending along to the head. For example, the headband section 2 may be configured such that a portion equivalent to the forehead and parts corresponding to the temporal regions are substantially orthogonal to each other. In this way, the external shape of the headband section 2 (the main body case 21) is not particularly limited as long as the headband section 2 can be disposed along the head by the band 22.

The headband section 2 includes the band 22 as the fixing section. However, the invention is not limited to this. That is, the configuration of the fixing section may be any configuration as long as the main body section can be fixed in a position where a virtual image displayed by the display section connected to the main body section via the arm sections is visually recognized by the user US. For example, the fixing section may have a shape and a configuration for covering at least a part of the head (specifically, an upper portion in the head) of the user US like a cap or a helmet.

Specifically, as the configuration of the fixing section, a configuration of a head cap type worn to cover a fixed part, a crossing band type in which a plurality of bands extending along the fixed part cross at the top of the head, or a belt type disposed to surround the periphery of the fixed part may be adopted. The fixing section may include two or more contact members set in contact with the fixed part to hold the fixed part from the front-back direction or the left-right direction of the user US and a coupling section that couples the contact member.

In the embodiments, the configuration is illustrated in which the arm section 4 is enabled to turn about the connecting part to the headband section 2 to make it possible to adjust the position of the display section 3. However, the invention is not limited to this. For example, a configuration may be adopted in which the arm section 4 includes the movable section and is capable of adjusting the position of the display section 3. The arm section 4 may be configured to be fixed to the headband section 2 and not to be enabled to turn and not to include the movable section, that is, the arm section 4 may be configured be set to a predetermined position and a predetermined angle of the display section 3 with respect to the headband section 2.

In the embodiments, as the moving mechanism 5, the configuration including the guiderail 51 provided on the display section 3 side and the slide member 52 provided on the arm section 4 side is illustrated. However, the invention is not limited to this. That is, the guiderail 51 may be provided on the arm section 4 side and the slide member 52 may be provided on the display section 3 side.

The moving mechanism 5 is not limited to the configuration for sliding the slide member 52 along the guiderail 51. The moving mechanism 5 only has to be a moving mechanism that can move the display section 3 close to and away from the headband section 2 by relatively moving the display section 3 and the arm section 4. For example, the arm section 4 connected to the display section 3 may be configured to be movable along the Y direction with respect to the headband section 2 functioning as the main body section.

In the first embodiment, the image pickup section 23 is configured to be turned about the turning shaft R1 parallel to the X direction to be capable of adjusting an image pickup direction in a YZ plane, that is, in the up-down direction in FIG. 1. The same applies in the other embodiments. However, the invention is not limited to this. The image pickup section 23 may be configured to be capable of adjusting the image pickup direction in a direction other than the up-down direction, for example, the left-right direction or may be configured to be capable of adjusting the image pickup direction in the up-down direction and the left-right direction. The image pickup direction of the image pickup section 23 may be fixed. The image pickup section 23 may not be provided.

In the embodiments, the light guide members 313L and 313R are respectively fixed. However, the invention is not limited to this. For example, the light guide members 313L and 313R may be configured to be capable of turning about a turning shaft extending along the X direction independently from each other or in association with each other to the opposite side of the user US. In this case, by configuring the turning shaft to be located on the Y direction side or the opposite side of the Y direction in the light guide members 313, it is possible to turn the light guide members 313 to retract from the viewing direction of the user US.

In the embodiments, the configuration is illustrated in which the control board 24 is provided in the headband section 2. However, the invention is not limited to this. For example, the control board 24 may be provided in the display section 3 or the arm section 4.

In the embodiments, the configuration is illustrated in which the cable CB is drawn around on the inside of the headband section 2 and the cable CR is drawn around on the inside of the arm section 4 and thereafter drawn around on the inside the headband section 2 and connected to the control board 24. However, the invention is not limited to this. For example, a configuration may be adopted in which the cables CB and CR are drawn around on the outer side of the headband section 2 and the arm section 4.

In the embodiments, the controller that receives various kinds of input operation by the user US is connected to the virtual image display devices 1, 11, 11A, 11B, and 11C. The virtual image display devices 1, 11, 11A, 11B, and 11C are controlled by the control board 24 according to an input from the controller. However, the invention is not limited to this.

For example, in the configuration in which the controller is connected to the virtual image display device 1, one of the virtual image display device 1 (an image display device) and the controller may be configured to have at least one of a function of acquiring operation information corresponding to operation by the user US, a function of acquiring image information and driving the display section 3 according to the image information, and a function of supplying electric power and the other may be configured to have the remaining functions.

The virtual image display device 1 (the image display device) may be connected to an image supply device (a PC, etc.) via the controller or may be directly connected to the image supply device not via the controller. In such a configuration, the virtual image display device 1 is used as an image display portion in the image supply device. The various operations of the virtual image display device 1 may be configured to be controlled by the image supply device. Note that, in this case, the image supply device may supply electric power for driving the virtual image display device 1. The same applies to the virtual image display devices 11, 11A, 11B, and 11C.

A battery and a control device such as an image processing device may be disposed in the virtual image display devices 1, 11, 11A, 11B, and 11C (e.g., the headband section 2 and the display section 3). Further, a slot for a memory card or the like may be provided in the virtual image display devices 1, 11, 11A, 11B, and 11C. Further, an operation section that receives operation by the user US may be provided in the virtual image display device 1 or a component capable of detecting tap operation may be provided in the virtual image display device 1. That is, the controller does not have to be provided.

In the embodiments, the see-through type virtual image display 1, 11, 11A, 11B, and 11C are illustrated as the virtual image display device. However, the invention is not limited to this. That is, the invention can also be applied to a non-transmissive virtual image display device with which an outside scene cannot be observed and a video see-through type virtual image display device that displays a picked-up image picked up by an image pickup device that picks up an image of an outside world.

In the embodiments, the virtual image display 1, 11, 11A, 11B, and 11C may include, as components that generate image light, an organic EL display and an organic EL control section. As components that generate image light, an LCOS (Liquid crystal on silicon; LCoS is a registered trademark), a digital micro mirror device, and the like can also be used. For example, the invention can also be applied to a head mounted display of a laser retinal projection type. That is, a configuration may be adopted in which an image generating section includes a laser light source and an optical system for guiding laser light to the eyes of the user US, makes the laser light incident on the eyes of the user US to scan the retinas, and forms an image on the retinas to thereby cause the user US to visually recognize the image.

The invention is not limited to the configuration for modulating light with an LCD and generating image light. For example, the invention can also be applied to a display device that adopts a scanning optical system including a MEMS (Micro Electro Mechanical System) mirror and makes use of a MEMS display technique. That is, the image generating section 20 may include, as image display elements, a signal-light forming section, a scanning optical system including a MEMS mirror that scans light emitted by the signal-light forming section, and an optical member on which a virtual image is formed by the light scanned by the scanning optical system. In this configuration, the light emitted by the signal-light forming section is reflected by the MEMS mirror, made incident on the optical member, and guided in the optical member to reach a virtual-image forming surface. The MEMS mirror scans the light, whereby a virtual image is formed on a virtual image forming surface. The user US catches the virtual image with the eyes to recognize an image.

At least a part of the functional blocks shown in FIGS. 9, 17, 22, 23, and 26 may be realized by hardware or may be realized by cooperation of the hardware and software. The invention is not limited to the configuration in which the independent hardware resources are disposed as shown in the block diagrams. The computer program executed by the control section 140 may be stored in the storing section 120 or a storage device in the control device 300. The control section 140 may be configured to acquire the computer program stored in an external device via the communication section 117 or the interface 125 and execute the computer program. Among the components formed in the control device 300, only the operation section 111 may be formed as an independent user interface (UI). The components formed in the control device 300 may be redundantly formed in the virtual image display device 1. For example, the control section 140 shown in the block diagrams may be formed in both of the control device 300 and the virtual image display devices 1, 11, 11A, 11B, and 11C. The functions performed by the control section 140 formed in the control device 300 and the CPUs formed in the virtual image display devices 1, 11, 11A, 11B, and 11C may be separated.

The entire disclosures of Japanese Patent Applications No. 2015-084809 filed on Apr. 17, 2016, and No. 2015-095603 filed on May 8, 2015, are expressly incorporated by reference herein.

What is claimed is:

1. A display device comprising:
   a display configured to electrically display an image for display while enabling visual recognition of real world outside scenery;
   a camera configured to capture an image in an image pickup range of the camera that overlaps with at least a range visually recognized through the display;
   a coupling structure that includes at least one movable portion and that is configured to couple the camera to the display;
   a plurality of light emitting elements fixedly provided in the display, wherein
      the plurality of light emitting elements include two light emitting elements at opposite ends of the display, and
      the two light emitting elements radiate light toward the width direction center of the display so that the respective light paths of the two light emitting elements cross within the image pickup range of the camera;
   a memory that stores calibration data including a positional relationship between the camera and the display; and
   a processor configured to:
      detect, from the captured image captured by the camera, a crossing point of the light paths on an object;
      derive a position of the crossing point in the captured image; and
      derive another positional relationship between the camera and the display or a change in the positional relationship between the camera and the display, based at least on the derived position of the crossing point in the captured image, so as to update the calibration data stored in the memory.

2. The display device according to claim 1, wherein the processor is further configured to calculate the change in the derived another positional relationship between the camera and the display or the derived another positional relationship between the camera and the display based at least on the derived position of the crossing point in the captured image and a distance between the camera and the target object.

3. The display device according to claim 2, wherein the processor is further configured to calculate the distance between the camera and the object at least based on the captured image, which is an image of the object.

4. The display device according to claim 1, wherein the processor is further configured to:
   cause the two light emitting elements to emit light rays,
   cause the camera to capture the captured image, which is an image of the crossing point of the light paths on the object, and
   after causing the two light emitting elements to emit the light rays, and after causing the camera to capture the captured image:
      detect, from the captured image captured by the camera, the crossing point of the light paths on the object,
      derive the position of the crossing point in the captured image, and
      generate adjustment data related to adjustment of a display position of the display image for display on the display at least based on the derived position of the crossing point of the lights paths on the object in the captured image.

5. The display device according to claim 1, wherein the at least one movable portion of the coupling structure includes a plurality of movable portions.

6. The display device according to claim 1, wherein the two light emitting elements sources are two solid-state light sources.

7. A display device comprising:
a display configured to electrically display an image for display while enabling visual recognition of real world outside scenery;
a first camera configured to capture an image, as a first captured image, that is in an image pickup range of the camera that overlaps with at least a range visually recognized through the display;
a coupling structure that includes at least one movable portion and that is configured to couple the first camera to the display;
a second camera fixedly provided in the display, and that is configured to capture an image as a second captured image;
a plurality of light emitting elements or a projector fixedly provided in the display, wherein the plurality of light emitting elements or the projector radiate light representing a figure having at least four feature points;
a memory that stores calibration data including a positional relationship between the first camera and the display; and
a processor configured to:
detect, from each of the first captured image and the second captured image, the at least four feature points of the figure formed on a plane by the light from the light emitting elements or the projector; and
derive another positional relationship between the first camera and the display or a change in the positional relationship between the first camera and the display, based at least on the detected four feature points in the first captured image and the detected four feature points in the second captured image, so as to update the calibration data stored in the memory.

8. A control method for a display device, the control method comprising:
controlling a display device, wherein
the display device comprises:
a display configured to electrically display an image for display while enabling visual recognition of a real world outside scene,
a camera configured to capture an image in an image pickup range of the camera that overlaps with a range visually recognized through the display,
a coupling structure that includes at least one movable portion and that is configured to couple the camera to the display,
a plurality of light emitting elements fixedly provided in the display, the plurality of light emitting elements including two light emitting elements at opposite ends of the display, and the two light emitting elements radiating light toward the width direction center of the display so that the respective light paths of the two light emitting elements cross within the image pickup range of the camera, and
a memory that stores calibration data including a positional relationship between the camera and the display, and
the controlling of the display device includes:
detecting, from the captured image captured by the camera, a crossing point of the light paths on an object;
deriving a position of the crossing point in the captured image; and
deriving another positional relationship between the camera and the display or a change in the positional relationship between the camera and the display, based at least on the derived position of the crossing point in the captured image, so as to update the calibration data stored in the memory.

* * * * *